(12) United States Patent
Huang et al.

(10) Patent No.: US 12,177,023 B2
(45) Date of Patent: Dec. 24, 2024

(54) COMMUNICATION APPARATUS AND COMMUNICATION METHOD FOR HYBRID AUTOMATIC REPEAT REQUEST OPERATION

(71) Applicant: Panasonic Intellectual Property Corporation of America, Torrance, CA (US)

(72) Inventors: Lei Huang, Singapore (SG); Yoshio Urabe, Nara (JP); Rojan Chitrakar, Singapore (SG)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 340 days.

(21) Appl. No.: 17/637,776

(22) PCT Filed: Jun. 27, 2020

(86) PCT No.: PCT/SG2020/050374
§ 371 (c)(1),
(2) Date: Feb. 23, 2022

(87) PCT Pub. No.: WO2021/050001
PCT Pub. Date: Mar. 18, 2021

(65) Prior Publication Data
US 2022/0376833 A1 Nov. 24, 2022

(30) Foreign Application Priority Data
Sep. 13, 2019 (SG) .......................... 10201908525W

(51) Int. Cl.
*H04L 1/1812* (2023.01)
*H04W 74/0816* (2024.01)

(52) U.S. Cl.
CPC ....... *H04L 1/1812* (2013.01); *H04W 74/0816* (2013.01)

(58) Field of Classification Search
None
See application file for complete search history.

(56) References Cited

U.S. PATENT DOCUMENTS 11,290,223 B1 * 3/2022 Zhang .................. H04L 5/0055
2017/0359159 A1 12/2017 Kim et al.
(Continued)

FOREIGN PATENT DOCUMENTS

EP 3 780 447 A1 2/2021
WO 2008/066284 A1 6/2008
(Continued)

OTHER PUBLICATIONS

Hart et al., "Recommended Direction for EHT," IEEE 802.11-18/1549r0, Cisco Systems, Sep. 2018. (19 pages).
(Continued)

*Primary Examiner* — Marcus Smith
(74) *Attorney, Agent, or Firm* — Seed IP Law Group LLP

(57) ABSTRACT

Present disclosure provides a communication apparatus comprising circuitry, which, in operation, generates a first trigger frame that includes one or more user information fields, and a transmitter, which, in operation, transmits the generated trigger frame; wherein each of the one or more user information fields indicates one of more than one hybrid automatic repeat request (HARQ) feedback types.

2 Claims, 46 Drawing Sheets

(56) References Cited

U.S. PATENT DOCUMENTS

| | | | |
|---|---|---|---|
| 2020/0052832 A1* | 2/2020 | Tian | H04L 1/1614 |
| 2020/0136753 A1 | 4/2020 | Zhang et al. | |
| 2021/0409165 A1* | 12/2021 | Wang | H04L 1/1822 |
| 2022/0360376 A1* | 11/2022 | Baron | H04L 1/1896 |

FOREIGN PATENT DOCUMENTS

| | | |
|---|---|---|
| WO | 2018140187 A1 | 8/2018 |
| WO | 2019/132981 A1 | 7/2019 |
| WO | 2019/205803 A1 | 10/2019 |

OTHER PUBLICATIONS

International Search Report, mailed Oct. 1, 2020, for International Application No. PCT/SG2020/050374. (4 pages).
Oteri et al., "Technology Features for 802.11 EHT," IEEE 802.11-18/1547r0, InterDigital, Inc., Sep. 2018. (10 pages).
Shilo et al., "HARQ for EHT," IEEE 802.11-18/1587r1, Huawei, Sep. 2018. (15 pages).
Zhang et al., "HARQ Feasibility for EHT," IEEE 802.11-18/1992r1, Marvell, Jan. 2019. (31 pages).
Kandala et al., "Recommended Normative Text for Burst Ack," IEEE 802.11-02/135r1, Jan. 23, 2002. (10 pages).
Partial Supplementary European Search Report, dated Oct. 10, 2022, for European Patent Application No. 20862835.4. (16 pages).
English Translation of Chinese Search Report dated Sep. 11, 2023, for the corresponding Chinese Patent Application No. 202080060352.X, 3 pages.

* cited by examiner

| CBW (MHz) | L | |
|---|---|---|
| | 1 | 2 |
| 20 | 1 | N.A. |
| 40 | 2 | 1 |
| 80 | 2 | 2 |
| 80+80, 160 | 2 | 2 |
| 160+160, 320 | 2 | 2 |

0
COMMUNICATION APPARATUS AND COMMUNICATION METHOD FOR HYBRID AUTOMATIC REPEAT REQUEST OPERATION

TECHNICAL FIELD

The present disclosure relates to communication apparatuses and methods for hybrid automatic repeat request (HARQ) operation, and more particularly to communication apparatuses and methods for HARQ operation in Extremely High Throughput (EHT) Wireless Local Area Network (WLAN).

BACKGROUND

In the standardization of next generation wireless local area network (WLAN), a new radio access technology having backward compatibilities with IEEE 802.11 a/b/g/n/ac/ax technologies has been discussed in the IEEE 802.11 Working Group and is named Extremely High Throughput (EHT) WLAN.

In EHT WLAN, in order to provide better link adaptation and higher throughput over 802.11ax high efficiency (HE) WLAN, it is desired to increase the maximum channel bandwidth from 160 MHz to 320 MHz, increase the maximum number of space-time streams from 8 to 16, support multi-link operation and hybrid automatic repeat request (HARQ) operation.

However, there has been little discussion on communication apparatuses and methods for HARQ operation in the context of EHT WLAN.

There is thus a need for communication apparatuses and methods that provide feasible technical solutions for HARQ operation in the context of EHT WLAN, in order to provide better link adaptation and higher throughput over 11 ax HE WLAN. Furthermore, other desirable features and characteristics will become apparent from the subsequent detailed description and the appended claims, taken in conjunction with the accompanying drawings and this background of the disclosure.

SUMMARY

Non-limiting and exemplary embodiments facilitate providing communication apparatuses and communication methods for HARQ operation in context of EHT WLAN.

According to an embodiment of the present disclosure, there is provided a communication apparatus comprising: circuitry, which, in operation, generates a first trigger frame that includes one or more user information fields; and a transmitter, which, in operation, transmit the generated trigger frame; wherein each of the one or more user information fields indicates one of more than one hybrid automatic repeat request (HARQ) feedback types.

According to yet another embodiment of the present disclosure, there is provided a communication apparatus comprising: a receiver, which in operation, receives a first trigger frame that includes one or more user information fields; circuitry, which, in operation, generates a trigger-based PPDU (physical layer protocol data unit) based on information of the received first trigger frame; and a transmitter, which, in operation, transmits the generated trigger-based PPDU; wherein each of the one or more user information fields indicates one of more than one HARQ feedback types.

According to another embodiment of the present disclosure, there is provided a communication method comprising: generating a first trigger frame that includes one or more user information fields; and transmitting the generated trigger frame; wherein each of the one or more user information fields indicates one of more than one HARQ feedback types.

It should be noted that general or specific embodiments may be implemented as an apparatus, a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

Embodiments of the disclosure will be better understood and readily apparent to one of ordinary skilled in the art from the following written description, by way of example only, and in conjunction with the drawings, in which.

DETAILED DESCRIPTION

Figure 1A:
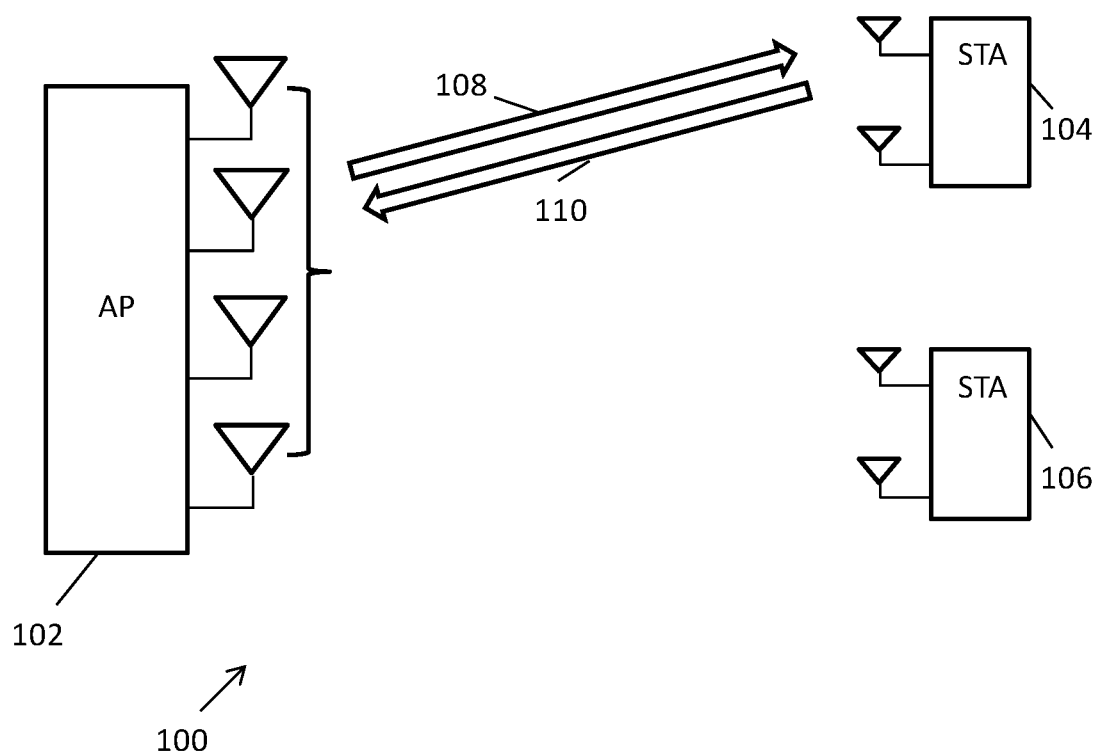
FIG. 1A depicts a schematic diagram of uplink and downlink single-user (SU) multiple input multiple output (MIMO) communications between an access point (AP) and a station (STA) in a MIMO wireless network.

Some embodiments of the present disclosure will be described, by way of example only, with reference to the drawings. Like reference numerals and characters in the drawings refer to like elements or equivalents.

In the following paragraphs, certain exemplifying embodiments are explained with reference to an access point (AP) and a station (STA) for hybrid automatic repeat request (HARQ) operation, especially in a multiple-input multiple-output (MIMO) wireless network.

In the context of IEEE 802.11 (Wi-Fi) technologies, a station, which is interchangeably referred to as a STA, is a communication apparatus that has the capability to use the 802.11 protocol. Based on the IEEE 802.11-2016 definition, a STA can be any device that contains an IEEE 802.11-conformant media access control (MAC) and physical layer (PHY) interface to the wireless medium (WM).

For example, a STA may be a laptop, a desktop personal computer (PC), a personal digital assistant (PDA), an access point or a Wi-Fi phone in a wireless local area network (WLAN) environment. The STA may be fixed or mobile. In the WLAN environment, the terms "STA", "wireless client", "user", "user device", and "node" are often used interchangeably.

Likewise, an AP, which may be interchangeably referred to as a wireless access point (WAP) in the context of IEEE 802.11 (Wi-Fi) technologies, is a communication apparatus that allows STAs in a WLAN to connect to a wired network. The AP usually connects to a router (via a wired network) as a standalone device, but it can also be integrated with or employed in the router.

As mentioned above, a STA in a WLAN may work as an AP at a different occasion, and vice versa. This is because communication apparatuses in the context of IEEE 802.11 (Wi-Fi) technologies may include both STA hardware components and AP hardware components. In this manner, the communication apparatuses may switch between a STA mode and an AP mode, based on actual WLAN conditions and/or requirements.

In a MIMO wireless network, "multiple" refers to multiple antennas used simultaneously for transmission and multiple antennas used simultaneously for reception, over a radio channel. In this regard, "multiple-input" refers to multiple transmitter antennas, which input a radio signal into the channel, and "multiple-output" refers to multiple receiver antennas, which receive the radio signal from the channel and into the receiver. For example, in an N×M MIMO network system, N is the number of transmitter antennas, M is the number of receiver antennas, and N may or may not be equal to M. For the sake of simplicity, the respective numbers of transmitter antennas and receiver antennas are not discussed further in the present disclosure.

In a MIMO wireless network, single-user (SU) communications and multi-user (MU) communications can be deployed for communications between communication apparatuses such as APs and STAs. MIMO wireless network has benefits like spatial multiplexing and spatial diversity, which enable higher data rates and robustness through the use of multiple spatial streams. According to various embodiments, the term "spatial stream" may be used interchangeably with the term "space-time stream" (or STS).

FIG. 1A depicts a schematic diagram of SU-MIMO communications 100 between an AP 102 and a STA 104 in a MIMO wireless network. As shown, the MIMO wireless network may include one or more STAs (e.g. STA 104, STA 106, etc.). In the SU-MIMO communications 100, the AP 102 transmits multiple space-time streams using multiple antennas (e.g. four antennas as shown in FIG. 1A) with all the space-time streams directed to a single communication apparatus, i.e. the STA 104. For the sake of simplicity, the multiple space-time streams directed to the STA 104 are illustrated as a grouped data transmission arrow 108 directed to the STA 104.

The SU-MIMO communications 100 can be configured for bi-directional transmissions. As shown in FIG. 1A, in the SU-MIMO communications 100, the STA 104 may transmit multiple space-time streams using multiple antennas (e.g. two antennas as shown in FIG. 1A) with all the space-time streams directed to the AP 102. For the sake of simplicity, the multiple space-time streams directed to the AP 102 are illustrated as a grouped data transmission arrow 110 directed to the AP 102.

As such, the SU-MIMO communications 100 depicted in FIG. 1A enables both uplink and downlink SU transmissions in a MIMO wireless network.

Figure 1B:
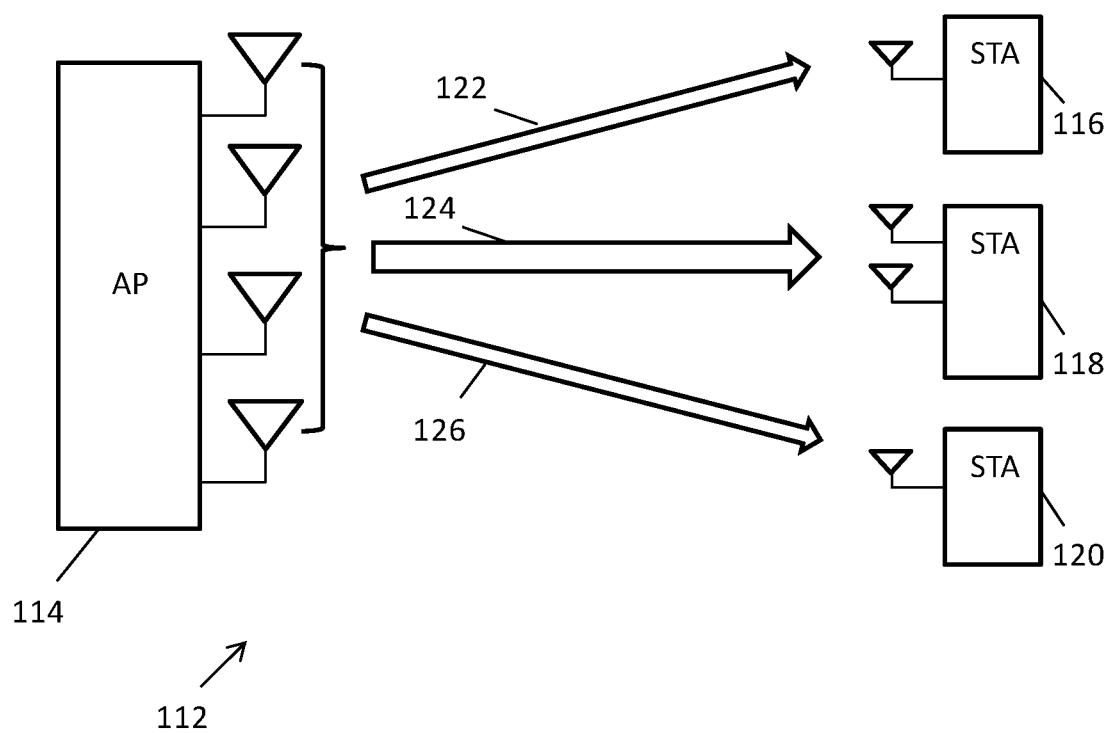
FIG. 1B depicts a schematic diagram of downlink multi-user MIMO (MU-MIMO) communications between an AP and multiple STAs in a MIMO wireless network.

FIG. 1B depicts a schematic diagram of downlink MU-MIMO communications 112 between an AP 114 and multiple STAs 116, 118, 120 in a MIMO wireless network. The MIMO wireless network may include one or more STAs (e.g. STA 116, STA 118, STA 120, etc.). In the downlink MU-MIMO communications 112, the AP 114 transmits multiple streams simultaneously to the STAs 116, 118, 120 in the network using multiple antennas via spatial mapping or precoding techniques. For example, two space-time streams may be directed to the STA 118, another space-time stream may be directed to the STA 116, and yet another space-time stream may be directed to the STA 120. For the sake of simplicity, the two space-time streams directed to the STA 118 are illustrated as a grouped data transmission arrow 124, the space-time stream directed to the STA 116 is illustrated as a data transmission arrow 122, and the space-time stream directed to the STA 120 is illustrated as a data transmission arrow 126.

Figure 1C:
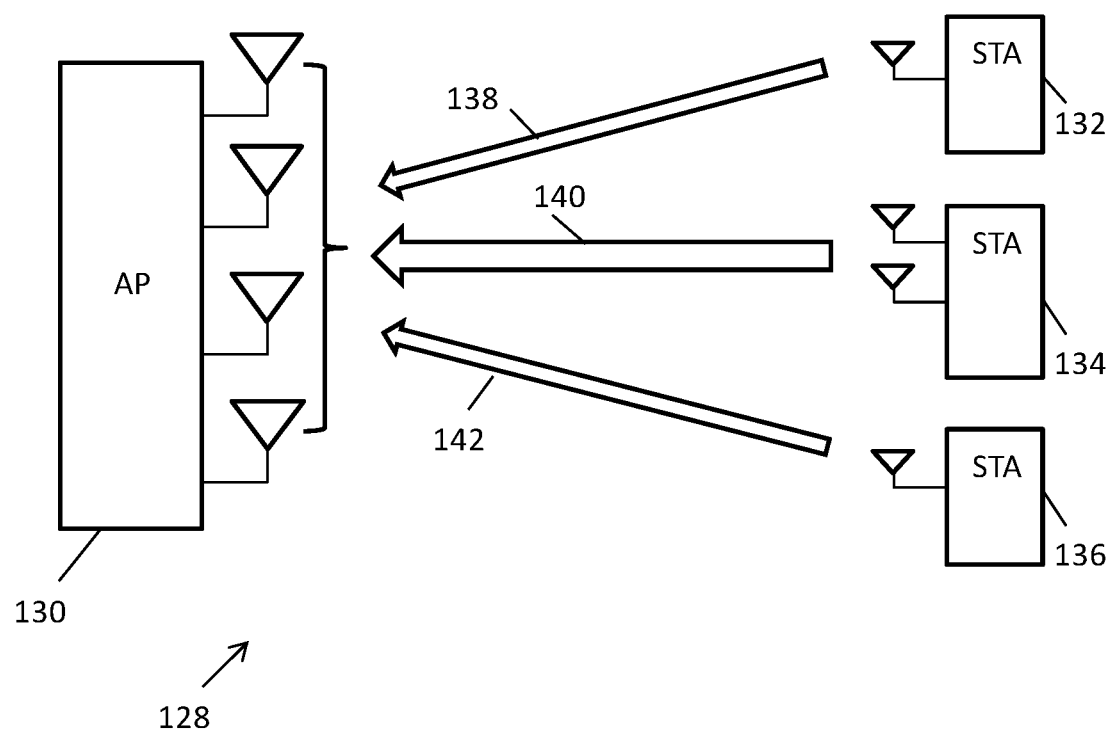
FIG. 1C depicts a schematic diagram of uplink MU-MIMO communications between an AP and multiple STAs in a MIMO wireless network

FIG. 1C depicts a schematic diagram of uplink MU-MIMO communications 128 between an AP 130 and multiple STAs 132, 134, 136 in a MIMO wireless network. The MIMO wireless network may include one or more STAs (e.g. STA 132, STA 134, STA 136, etc.). In the uplink MU-MIMO communications 128, the STAs 132, 134, 136 transmits respective streams simultaneously to the AP 130 in the network using respective antennas via spatial mapping or precoding techniques. For example, two space-time streams may be directed to the AP 130 from STA 134, another space-time stream may be directed to the AP 130 from STA 132, and yet another space-time stream may be directed to the AP 130 from STA 136. For the sake of simplicity, the two space-time streams directed to the AP 130 from STA 134 are illustrated as a grouped data transmission arrow 140, the space-time stream directed to the AP 130 from STA 132 is illustrated as a data transmission arrow 138, and the space-time stream directed to the AP 130 from STA 136 is illustrated as a data transmission arrow 142.

Due to packet/PPDU (physical layer protocol data unit) based transmission and distributed MAC scheme in 802.11 WLAN, time scheduling (e.g. TDMA (time division multiple access)-like periodic time slot assignment for data transmission) does not exist in 802.11 WLAN. Frequency and spatial resource scheduling is performed on a packet basis. In other words, resource allocation information is on a PPDU basis.

Figure 1D:
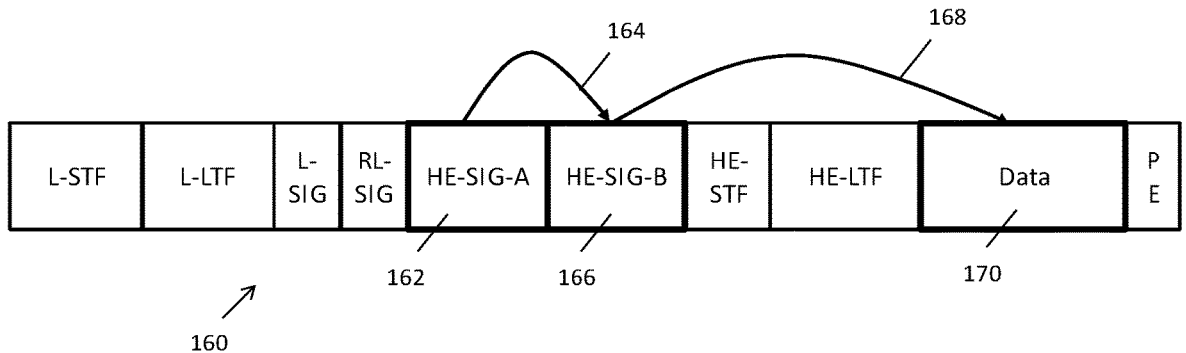
FIG. 1D shows a format of PPDU (physical layer protocol data unit) used for downlink MU (multi-user) communications between an AP and multiple STAs in an HE WLAN.

FIG. 1D shows a format of a PPDU 160 used for downlink MU communications between an AP and multiple STAs in a HE WLAN, e.g. OFDMA (Orthogonal Frequency Division Multiple Access) transmission including MU-MIMO transmission in a single RU (resource unit) and full-bandwidth MU-MIMO transmission. Such a PPDU 160 is referred to as an HE MU PPDU 160. The HE MU PPDU 160 may include a non-High Throughput Short Training Field (L-STF), a non-High Throughput Long Training Field (L-LTF), a non-High Throughput SIGNAL (L-SIG) field, a Repeated L-SIG (RL-SIG) field, a HE SIGNAL A (HE-SIG-A) field 162, a HE SIGNAL B (HE-SIG-B) field 166, a HE Short Training Field (HE-STF), a HE Long Training Field (HE-LTF), a Data field 170 and a Packet Extension (PE) field. In the HE MU PPDU 160, the HE-SIG-B field 166 provides the OFDMA and MU-MIMO resource allocation information to allow STAs to look up the corresponding resources to be used in the Data field 160, like indicated by an arrow 168. The HE-SIG-A field 162 contains the necessary information for decoding the HE-SIG-B field 166, e.g. modulation and coding scheme (MCS) for HE-SIG-B, number of HE-SIG-B symbols, like indicated by an arrow 164.

Figure 1E:
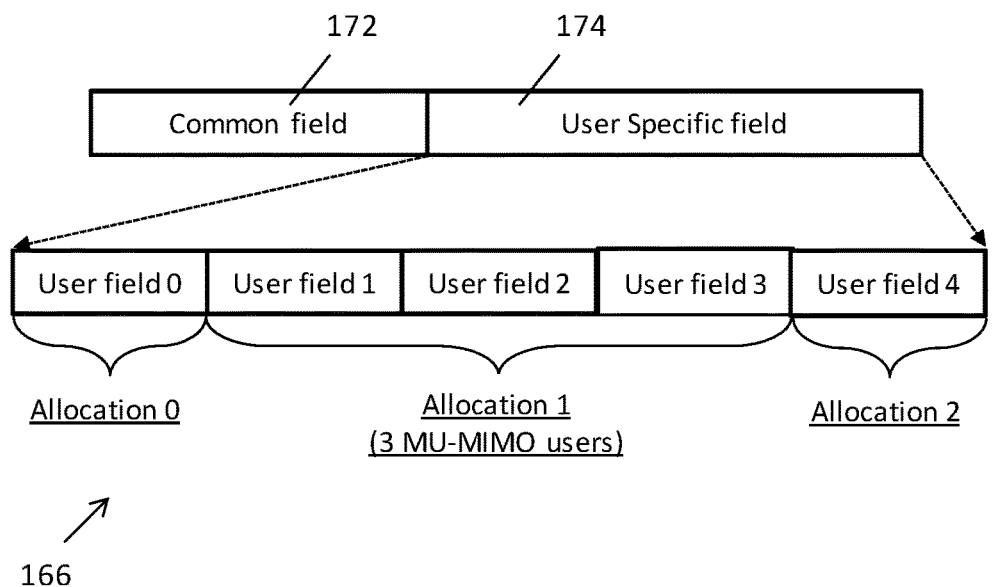
FIG. 1E depicts the HE-SIG-B (HE Signal B) field in more detail.

FIG. 1E depicts the HE-SIG-B field 166 in more detail. The HE-SIG-B field 166 includes (or consists of) a Common field 172, if present, followed by a User Specific field 174 which together are referred to as the HE-SIG-B content channel. The HE-SIG-B field 166 contains a RU Allocation subfield which indicates the RU information for each of the allocations. The RU information includes a RU position in the frequency domain, an indication of the RU allocated for a non-MU-MIMO or MU-MIMO allocation, and the number of users in the MU-MIMO allocation. The Common field 172 is not present in the case of a full-bandwidth MU-MIMO transmission. In this case, the RU information (e.g. the number of users in the MU-MIMO allocation) is signalled in the HE-SIG-A field 162.

The User Specific field 174 includes (or consists of) one or more User field(s) for non-MU-MIMO allocation(s) and/or MU-MIMO allocation(s). A User field contains user information indicating a user-specific allocation (i.e. user-specific allocation information). In the example shown in FIG. 1F, the User Specific field 174 includes five user fields (User field 0, . . . , User field 4), wherein user-specific allocation information for an allocation (Allocation 0) is provided by User field 0, user-specific allocation information for a further allocation (Allocation 1 with 3 MU-MIMO users) is provided by User field 1, User field 2, and User field 3, and user-specific allocation information for yet a further allocation (Allocation 2) is provided by User field 4.

Figure 1F:
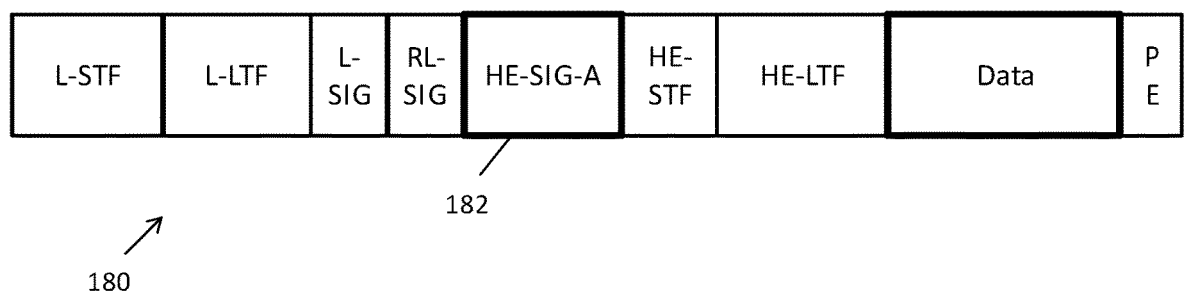
FIG. 1F shows a format of PPDU used for uplink MU communications between an AP and multiple STAs in an HE WLAN.

FIG. 1F shows a format of a PPDU 180 used for uplink MU communications between an AP and multiple STAs in a HE WLAN. Such a PPDU 180 is referred to as an HE TB (trigger based) PPDU 180. The HE TB PPDU 180 may include a L-STF, a L-LTF, a L-SIG field, a RL-SIG field, a HE-SIG-A field 182, a HE-STF, a HE-LTF, a Data field and a PE field. The HE-STF of HE TB PPDU 180 has a duration of 8 µs. The HE TB PPDU 180 is used for uplink MU transmission that is in response to a frame carrying trigger information. Instead of using the HE-SIG-B field, the information required for the uplink MU transmission from one or more STAs is carried by the frame that solicits this transmission. In a typical transmission of the HE TB PPDU 180, HE-SIG-A related information is copied from the previous frame carrying trigger information into the HE-SIG-A field 182 of the HE TB PPDU 180.

Figure 1G:
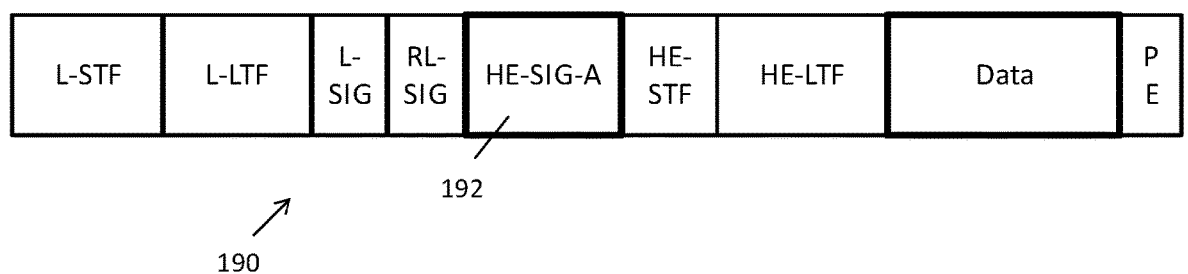
FIG. 1G shows a format of PPDU used for uplink and downlink SU (single-user) MIMO communications between an AP and a STA in an HE WLAN.

FIG. 1G shows a format of a PPDU 190 used for uplink and downlink SU communications between an AP and a STA like in FIG. 1A. The HE SU PPDU 190 may include a L-STF, a L-LTF, a L-SIG field, a RL-SIG field, a HE-SIG-A field 192, a HE-STF, a HE-LTF, a Data field and a PE field. The HE-STF of HE SU PPDU 190 has a duration of 4 μs. The HE-SIG-A field 192 contains necessary control information for decoding the Data field, such as uplink/downlink, MCS and bandwidth.

Figure 2A:
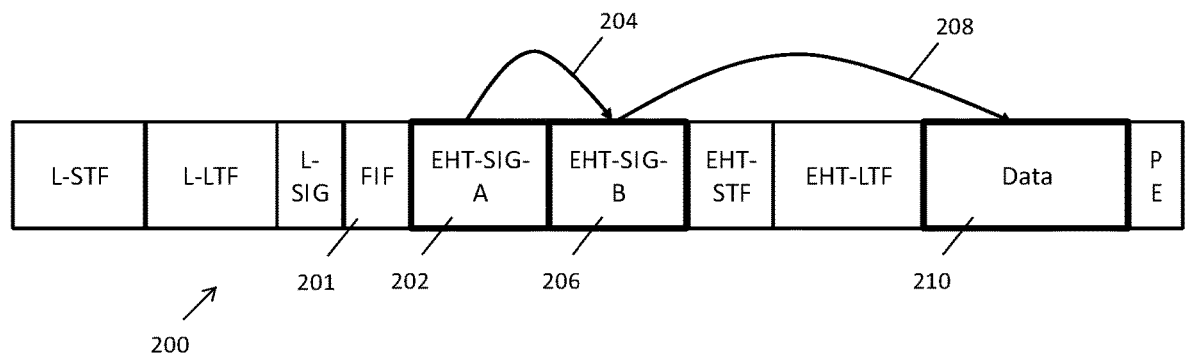
FIG. 2A depicts an example format of EHT MU PPDU.
Figures 2B, 2C:
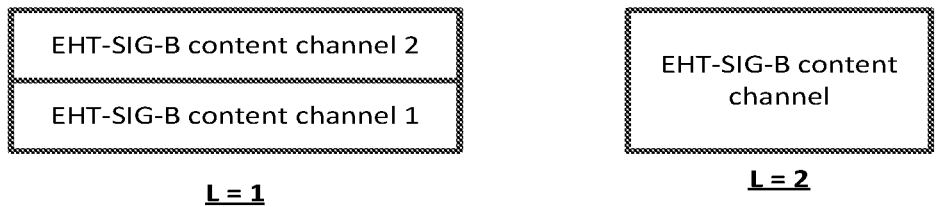
FIG. 2B shows a table of how the number of EHT-SIG-B (EHT Signal B) content channels depends on the bandwidth and the value of L according to various embodiments.
FIG. 2C shows a diagram of mapping of the one or two EHT-SIG-B contentchannels in a 40 MHz EHT MU PPDU.

If the MIMO wireless network is with an extremely high throughput, such as an EHT WLAN, the MU PPDU used for downlink MU transmission may be referred to as EHT MU PPDU 200 like illustrated in FIG. 2A; the MU PPDU used for uplink MU transmission may be referred to as EHT TB PPDU like illustrated in FIG. 2B; and the SU PPDU used for uplink and downlink SU transmission may be referred to as EHT SU PPDU like illustrated in FIG. 2C.

FIG. 2A depicts an example format of an EHT MU PPDU 200. The EHT MU PPDU 200 may include a L-STF, a L-LTF, a L-SIG field, a Format Identification field (FIF) 201, an EHT SIGNAL A (EHT-SIG-A) field 202, an EHT SIGNAL B (EHT-SIG-B) field 206, an EHT-STF, an EHT-LTF, a Data field 210 and a PE field. It is appreciable that if the IEEE 802.11 Working Group may use a new name instead of "EHT WLAN" for the next generation WLAN with an extremely high throughput, the prefix "EHT" in the above fields may change accordingly. The FIF 201 is mainly used for identifying the format of an EHT PPDU. The EHT-SIG-A field 202 contains the necessary information for decoding the EHT-SIG-B field 206, e.g. MCS for EHT-SIG-B, number of EHT-SIG-B symbols, like indicated by an arrow 204. The EHT-SIG-B field 206 provides the OFDMA and MU-MIMO resource allocation information to allow STAs to look up the corresponding resources to be used in the Data field 210, like indicated by an arrow 208. Like FIG. 1E, the EHT-SIG-B field 206 includes (or consists of) a Common field, if present, followed by a User Specific field which together are referred to as the EHT-SIG-B content channel.

According to various embodiments, the EHT-SIG-B field of the EHT MU PPDU 200 is separately encoded on each L×20 MHz subchannel, where L=1 or 2. In instances where the bandwidth is more than 20 MHz, compared with the EHT-SIG-B field with L=2, the EHT-SIG-B field with L=1 may have better EHT-SIG-B decoding performance. This is because channel estimation used for decoding the EHT-SIG-B field is based on the L-LTF, which is transmitted with 20 MHz bandwidth. Channel estimation with interpolation is necessary for decoding the EHT-SIG-B field with L=2, which may degrade performance of decoding the EHT-SIG-B field with L=2. On the other hand, compared with the EHT-SIG-B field with L=1, the EHT-SIG-B field with L=2 may have less EHT-SIG-B overhead, especially for larger bandwidth. In addition, if the intended STAs of the EHT MU PPDU 200 include at least one 20 MHz operating STA, the EHT-SIG-B field with L=2 shall not be used, since the EHT-SIG-B field with L=2 cannot be decoded by 20 MHz operating STAs. As a result, it is advantageous that the AP may determine the value of L at its discretion and a signalling may be included in the EHT-SIG-A field of the EHT MU PPDU 200 to indicate if L takes on the value of 1 or 2.

FIG. 2B shows a table of how the number of EHT-SIG-B content channels depends on the bandwidth and the value of L according to various embodiments. As shown in FIG. 2B, in the event that the bandwidth is 20 MHz, L can only be 1 because the EHT-SIG-B field is encoded on a per-20 MHz basis and there will be only one EHT-SIG-B content channel. In the embodiment where the bandwidth is 40 MHz, L may be assigned by the AP the value of 1 or 2. If L is set to "1", there will be two EHT-SIG-B content channels. If L is set to "2", there will be only one EHT-SIG-B content channel. In the embodiment where the bandwidth is 80 MHz, 80+80 MHz, 160 MHz, 160+160 MHz or 320 MHz, there will be two EHT-SIG-B content channels regardless of the value of L. More details will be provided below.

FIG. 2C shows a diagram of mapping of the one or two EHT-SIG-B content channels in a 40 MHz EHT MU PPDU. The number of EHT-SIG-B content channels depends on the bandwidth and the value of L as shown in FIG. 2B. A 40 MHz channel comprises two 20 MHz subchannels. When L=1, there will be two EHT-SIG-B content channels (namely, EHT-SIG-B content channel 1 and EHT-SIG-B content channel 2) which are transmitted in the $1^{st}$ and $2^{nd}$ 20 MHz subchannels, respectively. When L=2, there will be only one EHT-SIG-B content channel.

Figure 2D:
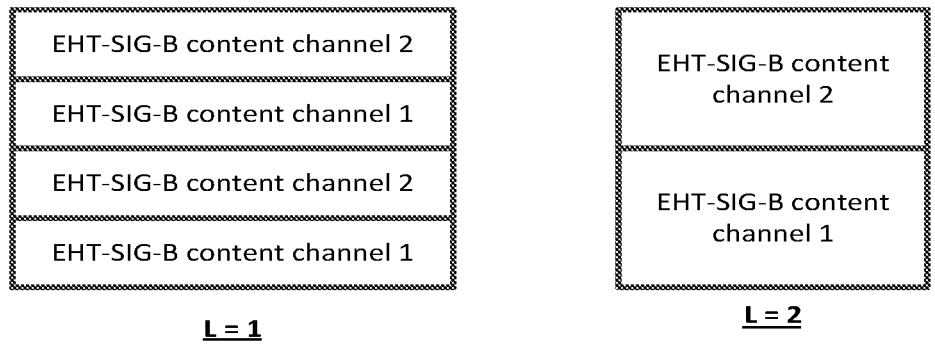
FIG. 2D shows a diagram of mapping of the two EHT-SIG-B content channels in an 80 MHz EHT MU PPDU.

FIG. 2D shows a diagram of mapping of the two EHT-SIG-B content channels (namely EHT-SIG-B content channel 1 and EHT-SIG-B content channel 2) in an 80 MHz EHT MU PPDU. When L=1, in an 80 MHz channel comprising four 20 MHz subchannels, EHT-SIG-B content channel 1 is duplicated and transmitted in the $1^{st}$ and $3^{rd}$ 20 MHz subchannels while EHT-SIG-B content channel 2 is duplicated and transmitted in the $2^{nd}$ and $4^{th}$ 20 MHz subchannels. When L=2, in an 80 MHz channel comprising two 40 MHz subchannels, EHT-SIG-B content channel 1 is transmitted in the $1^{st}$ 40 MHz subchannel while EHT-SIG-B content channel 2 is transmitted in the $2^{nd}$ 40 MHz subchannel.

Figure 2E:
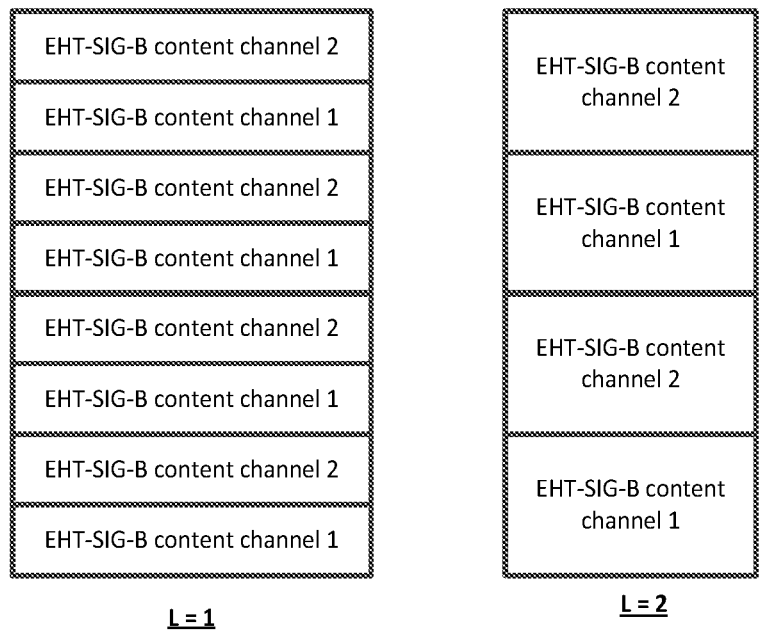
FIG. 2E shows a diagram of mapping of the two EHT-SIG-B content channels in an 80+80 MHz or 160 MHz EHT MU PPDU.

FIG. 2E shows a diagram of mapping of the two EHT-SIG-B content channels in an 80+80 MHz or 160 MHz EHT MU PPDU. When L=1, in an 80+80 MHz or 160 MHz channel comprising eight 20 MHz subchannels, EHT-SIG-B content channel 1 is duplicated and transmitted in the $1^{st}$, $3^{rd}$, $5^{th}$ and $7^{th}$ 20 MHz subchannels while EHT-SIG-B content channel 2 is duplicated and transmitted in the $2^{nd}$ $4^{th}$, $6^{th}$ and $8^{th}$ 20 MHz subchannels. When L=2, in an 80+80 MHz or 160 MHz channel comprising four 40 MHz subchannels, EHT-SIG-B content channel 1 is duplicated and transmitted in the $1^{st}$ and $3^{rd}$ 40 MHz subchannels while EHT-SIG-B content channel 2 is duplicated and transmitted in the $2^{nd}$ and $4^{th}$ 40 MHz subchannels.

Figure 2F:
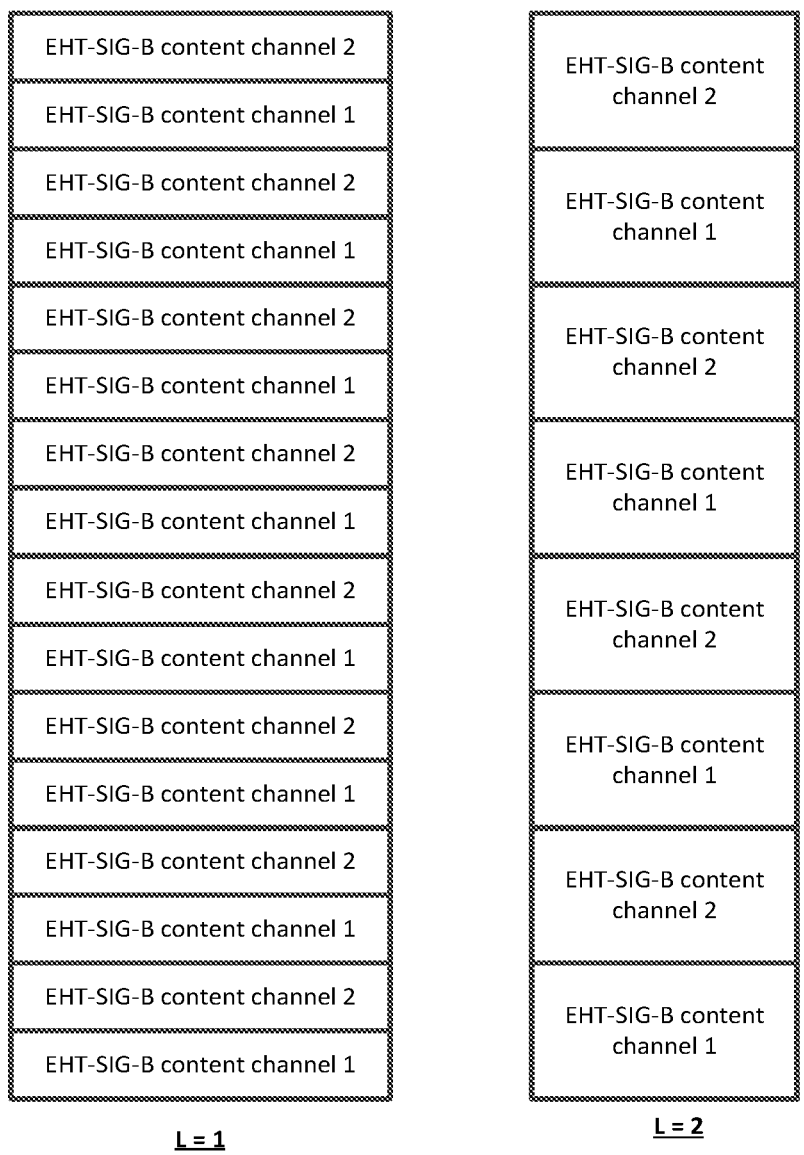
FIG. 2F shows a diagram of mapping of the two EHT-SIG-B content channels in a 160+160 MHz or 320 MHz EHT MU PPDU.

FIG. 2F shows a diagram of mapping of the two EHT-SIG-B content channels in a 160+160 MHz or 320 MHz EHT MU PPDU. When L=1, in a 160+160 MHz or 320 MHz channel comprising sixteen 20 MHz subchannels, EHT-SIG-B content channel 1 is duplicated and transmitted in the $1^{st}$, $3^{rd}$, $5^{th}$, $7^{th}$, $9^{th}$, $11^{th}$, $13^{th}$ and $15^{th}$ 20 MHz subchannels while EHT-SIG-B content channel 2 is duplicated and transmitted in the $2^{nd}$, $4^{th}$ $6^{th}$ $8^{th}$, $10^{th}$, $12^{th}$, $14^{th}$ and $16^{th}$ 20 MHz subchannels. When L=2, in a 160+160 MHz or 320 MHz channel comprising eight 40 MHz subchannels, EHT-SIG-B content channel 1 is duplicated and transmitted in the $1^{st}$, $3^{rd}$, $5^{th}$ and $7^{th}$ 40 MHz subchannels while EHT-SIG-B content channel 2 is duplicated and transmitted in the $2^{nd}$, $4^{th}$, $6^{th}$ and $8^{th}$ 40 MHz subchannels.

Figure 2G:
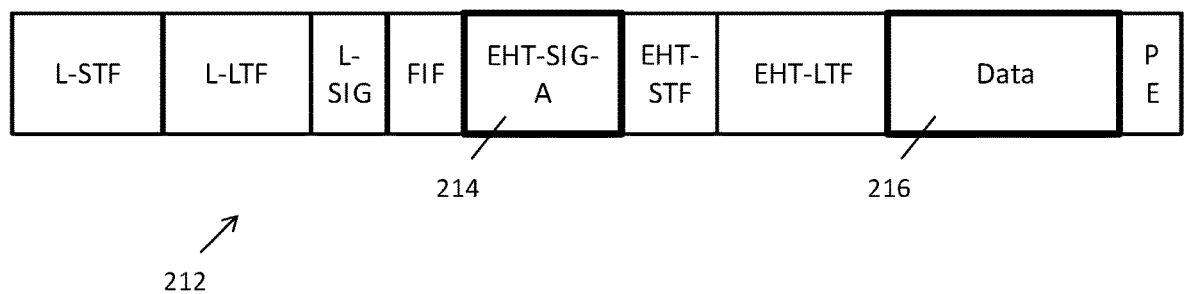
FIG. 2G depicts an example format of EHT TB (trigger based) PPDU.

FIG. 2G shows an example format of an EHT TB PPDU 212. The EHT TB PPDU 212 may include a L-STF, a L-LTF, a L-SIG field, a FIF, an EHT-SIG-A field 214, an EHT-STF, an EHT-LTF, a Data field 216 and a PE field. The EHT-STF of EHT TB PPDU 212 has a duration of 8 µs. The EHT TB PPDU 212 is used in an EHT WLAN for uplink MU transmission that is in response to a frame carrying trigger information. Instead of using the EHT-SIG-B field, the information required for the uplink MU transmission from one or more STAs is carried by the frame that solicits this transmission. In a typical transmission of the EHT TB PPDU 212, EHT-SIG-A related information is copied from the previous frame carrying trigger information into the EHT-SIG-A field 214 of the EHT TB PPDU 212.

Figure 2H:
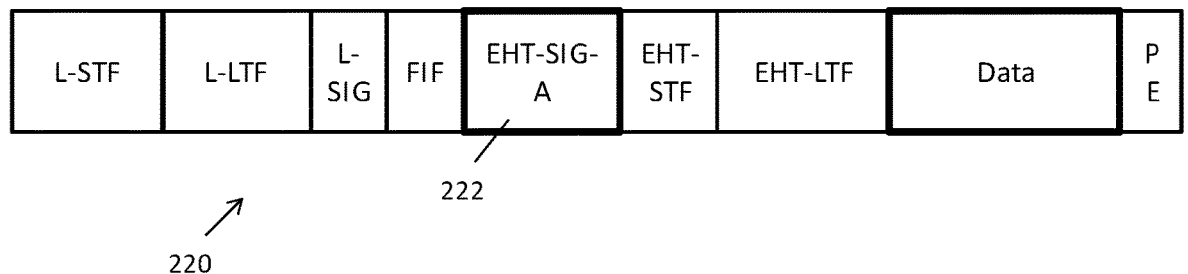
FIG. 2H depicts an example format of EHT SU PPDU.

FIG. 2H shows an example format of an EHT SU PPDU 220. The EHT SU PPDU 220 may include a L-STF, a L-LTF, a L-SIG field, a FIF 221, an EHT-SIG-A field 222, an EHT-STF, an EHT-LTF, a Data field and a PE field. The EHT-STF of EHT SU PPDU 220 has a duration of 4 µs. The EHT-SIG-A field 222 contains necessary control information for decoding the Data field, such as uplink/downlink, MCS and bandwidth. The EHT SU PPDU 220 is used in both uplink and downlink SU communications such as between an AP and a STA like in FIG. 1A.

According to various embodiments, EHT WLAN supports hybrid automatic repeat request (HARQ) operation as well. HARQ operation provides a flexible mechanism for recovering from transmission errors, reduces the number of retransmission and provides a more efficient data flow result. In other words, HARQ operations in EHT WLAN can provide a better link adaptation and higher throughput.

Figure 3:
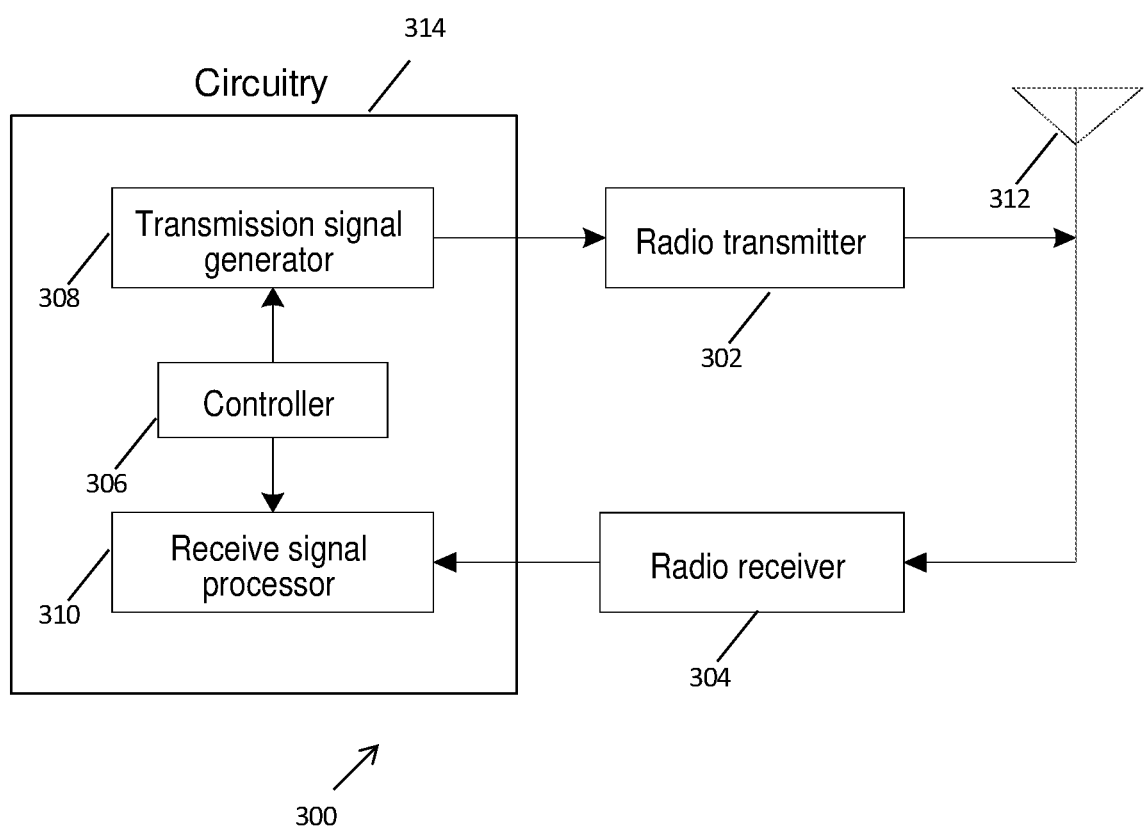
FIG. 3 shows a schematic example of communication apparatus in accordance with various embodiments. The communication apparatus may be implemented as an AP or a STA and configured for hybrid automatic repeat request (HARQ) operation in accordance with various embodiments of the present disclosure.

FIG. 3 shows a schematic, partially sectioned view of a communication apparatus 300 according to various embodiments. The communication apparatus 300 may be implemented as an AP or a STA according to various embodiments. As shown in FIG. 3, the communication apparatus 300 may include circuitry comprising at least one transmission signal generator, at least one radio transmitter, at least one radio receiver and at least one antenna 312 (for the sake of simplicity, only one antenna is depicted in FIG. 3 for illustration purposes). The at least one transmission signal generator may generate a transmission signal that include a signal field and a data field. In a MIMO communication, the transmission signal may comprise a plurality of user-specific allocations in the data field. In an embodiment, an aggregate MAC protocol data unit (A-MPDU) transmitted in a user-specific allocation is segmented into one or more code blocks. The at least one radio transmitter transmits the generated transmission signal to one or more other communication apparatuses. The at least one radio receiver receives a transmission signal generated from one or more other communication apparatus. The circuitry 314 may furthermore include at least one receive signal processor 310. The circuitry 314 may also include at least one controller 306 for use in software and hardware aided execution of tasks that the at least one controller 306 is designed to perform, including control of communications with one or more other communication apparatuses in a MIMO wireless network. The at least one controller 306 may control the receive signal processor 310 and the transmission signal generator 308. The at least one controller 306 may control the at least one transmission signal generator 308 for generating PPDUs (for example, MU HARQ Feedback NDPs (null data packets), PPDUs containing EHT Basic Trigger frames or Multi-STA HARQ BlockAck frames if the communication apparatus 300 is an AP; and, for example, EHT TB PPDUs if the communication apparatus 300 is a STA) to be sent through the at least one radio transmitter 302 to one or more other communication apparatuses and the at least one receive signal processor 310 for processing PPDUs (for example EHT TB PPDUs if the communication apparatus 300 is an AP; and, for example MU HARQ Feedback NDPs, PPDUs containing EHT Basic Trigger frames or Multi-STA HARQ BlockAck frames if the communication apparatus 300 is a STA) received through the at least one radio receiver 304 from the one or more other communication apparatuses under the control of the at least one controller 306. The at least one transmission signal generator 308 and the at least one receive signal processor 310 may be stand-alone modules of the communication apparatus 300 that communicate with the at least one controller 306 for the above-mentioned functions, as shown in FIG. 3. Alternatively, the at least one transmission signal generator 308 and the at least one receive signal processor 310 may be included in the at least one controller 306. It is appreciable to those skilled in the art that the arrangement of these functional modules is flexible and may vary depending on the practical needs and/or requirements. The data processing, storage and other relevant control apparatus can be provided on an appropriate circuit board and/or in chipsets. In various embodiments, when in operation, the at least one radio transmitter 302, at least one radio receiver 304, and at least one antenna 312 may be controlled by the at least one controller 306.

The communication apparatus 300, when in operation, provides functions required for HARQ operation in uplink MU communications. For example, the communication apparatus 300 may be an AP, and the at least one transmission signal generator 308 of the circuitry 314, may, in operation, generate a first trigger frame that includes one or more user information fields; and the at least one radio transmitter 302 may, in operation, transmit the generated trigger frame; wherein each of the one or more user information fields indicates one of more than one HARQ feedback types.

For example, the communication apparatus 300 may be a STA, and the at least one radio receiver 304, may, in operation, receive a first trigger frame that includes one or more user information fields; and the at least one transmission signal generator 308 of the circuitry 314 may, in operation, generate an EHT TB PPDU based on information of the received trigger frame; and the at least one radio transmitter 302 may, in operation, transmits the generated EHT TB PPDU; wherein each of the one or more user information fields indicates one of more than one HARQ feedback types.

It is appreciated by one with ordinary skill in the art that the term "user information" may be used interchangeably with the term "user info", for example, a user info field may refer to a user information field, vice versa.

According to the present disclosure, an A-MPDU carried in a user-specific allocation in the data field of an EHT MU PPDU is segmented into one or more code blocks. Three different types of code block segmentation (type 1, 2, and 3) are discussed. For the sake of simplicity, only a user-specific allocation in the data field of an EHT MU PPDU is illustrated in the three different types of code block segmentation (type 1, 2, and 3), and it is appreciable to those skilled in the art that the three different types of code block segmentation may also apply to an A-MPDU carried in the data field of an EHT SU PPDU or an EHT TB PPDU.

Figure 4A:
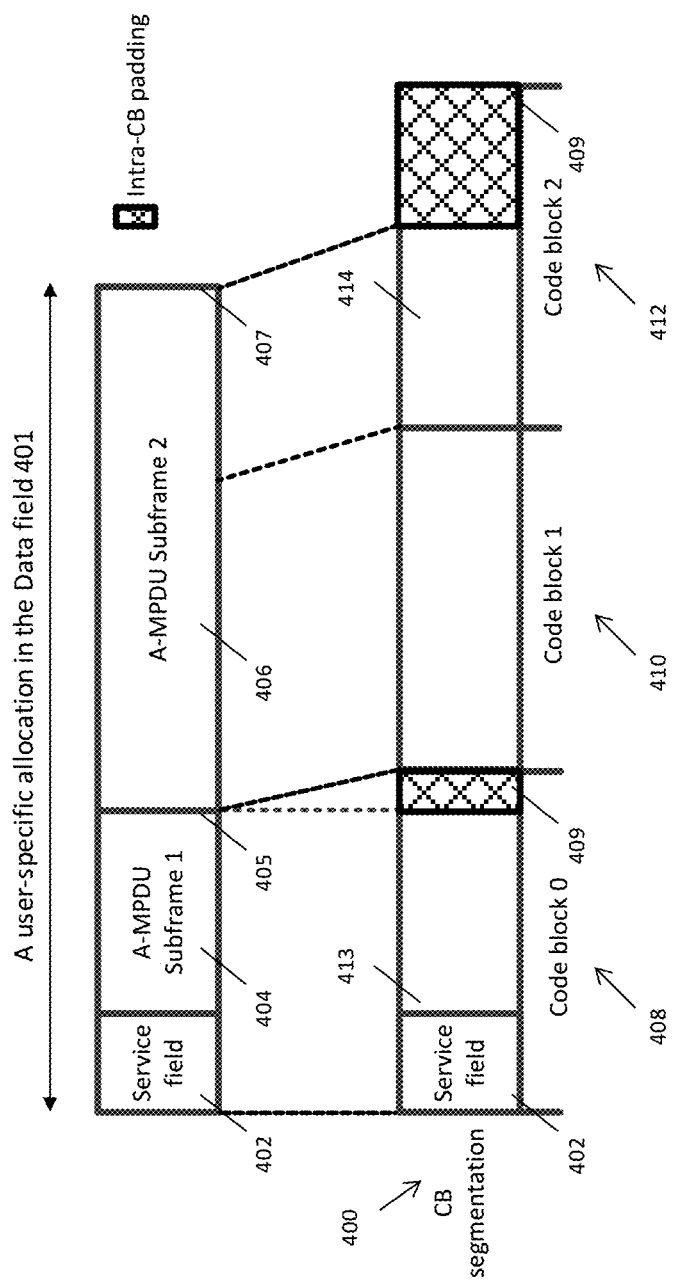
FIG. 4A shows an example type 1 code block segmentation of a data field.

Regarding type 1 code block segmentation, in an A-MPDU, an A-MPDU subframe may be segmented and correspond to one or more code blocks but no more than one A-MPDU subframes correspond to a single code block. FIG. 4A shows an example type 1 code block segmentation 400. A user-specific allocation in the data field of an EHT MU PPDU 401 may include a Service field 402 and an A-MPDU comprising one or more A-MPDU subframes 404, 406. An A-MPDU subframe includes at most one MPDU. The A-MPDU subframes 404, 406 are segmented into one or more code blocks 408, 410, 412. Each code block 408, 410, 412 has a same code block size, and may contain whole or part of a single A-MPDU subframe. The first code block 408 may further contain the Service field 402. The code block 410 may contain only part of the A-MPDU subframe 406. The code blocks 408, 412 align with A-MPDU subframe boundaries 405, 407, respectively. Intra code block (CB) padding bits 409 may be appended to blocks of segmented A-MPDU subframe 413, 414 in the code blocks 408, 412 to fill up the code blocks 408, 412 to the code block size. For the type 1 code block segmentation 400, the existing MPDU based acknowledge mechanism can be reused for HARQ feedback. However, the type 1 code block segmentation 400 is inefficient for transmission of large MPDU (a maximum size of 11454 octets) as the whole MPDU with negative acknowledgement (NACK) needs to be retransmitted.

Figure 4B:
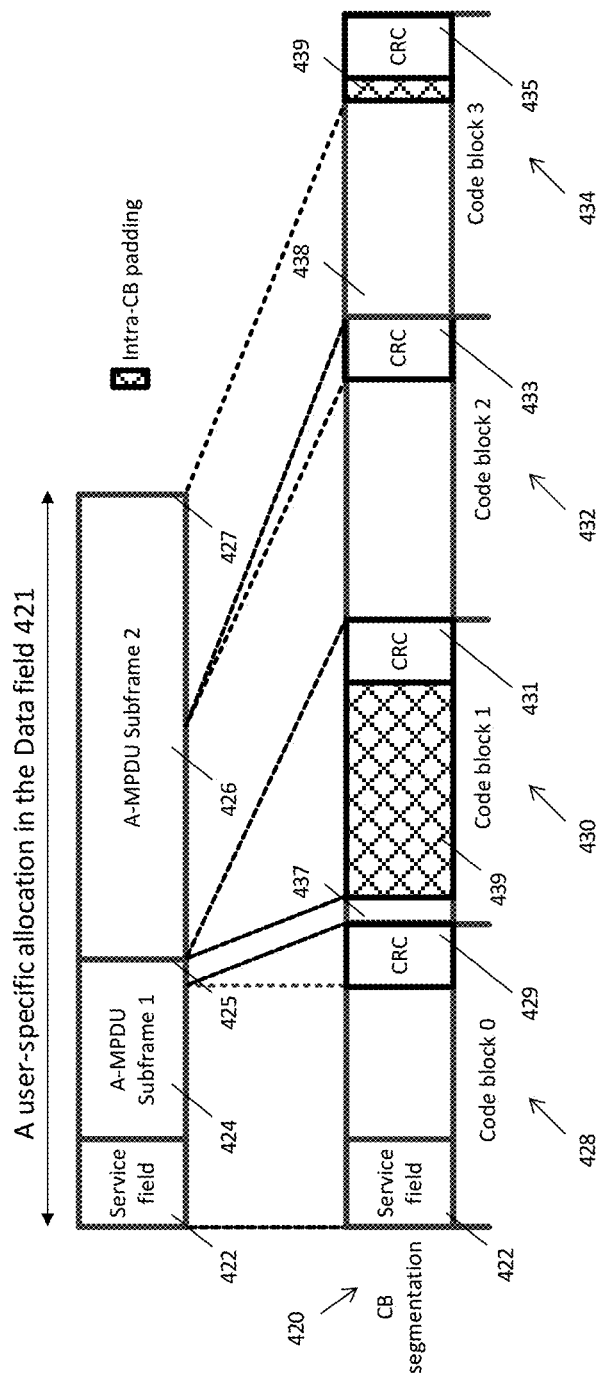
FIG. 4B shows an example type 2 code block segmentation of a data field.

Regarding type 2 code block segmentation, in an A-MPDU, an A-MPDU subframe may be segmented and correspond to one or more code blocks, but no more than one A-MPDU subframes correspond to a single code block, and each code block is attached a CRC (cyclic redundancy check). FIG. 4B shows an example type 2 code block segmentation 420. A user-specific allocation in the data field of an EHT MU PPDU 421 may include a Service field 422 and an A-MPDU comprising one or more A-MPDU subframes 424, 426. The A-MPDU subframes 424, 426 is segmented into one or more code blocks 428, 430, 432, 434. Each code block 428, 430, 432, 434 has a same code block size and is attached with a CRC 429, 431, 433, 435 at the end of each code block that can be used for error detecting the corresponding code blocks 428, 430, 432, 434. Each code block may contain whole or part of a single A-MPDU subframe. The first code block 428 may further contain the Service field 422. The code block 430 aligns with A-MPDU subframe boundaries 425. Intra code block padding bits 439 may be filled between a block of segmented A-MPDU subframes 437, 438 and the CRCs 431, 435 in the code blocks 430, 434 to fill up the code blocks 430, 434 to the code block size. The type 2 code block segmentation 420 is efficient for transmission of large MPDU because only part of the code blocks with NACK corresponding to the MPDU needs to be retransmitted. However, a code block based HARQ feedback mechanism may be required.

Figure 4C:
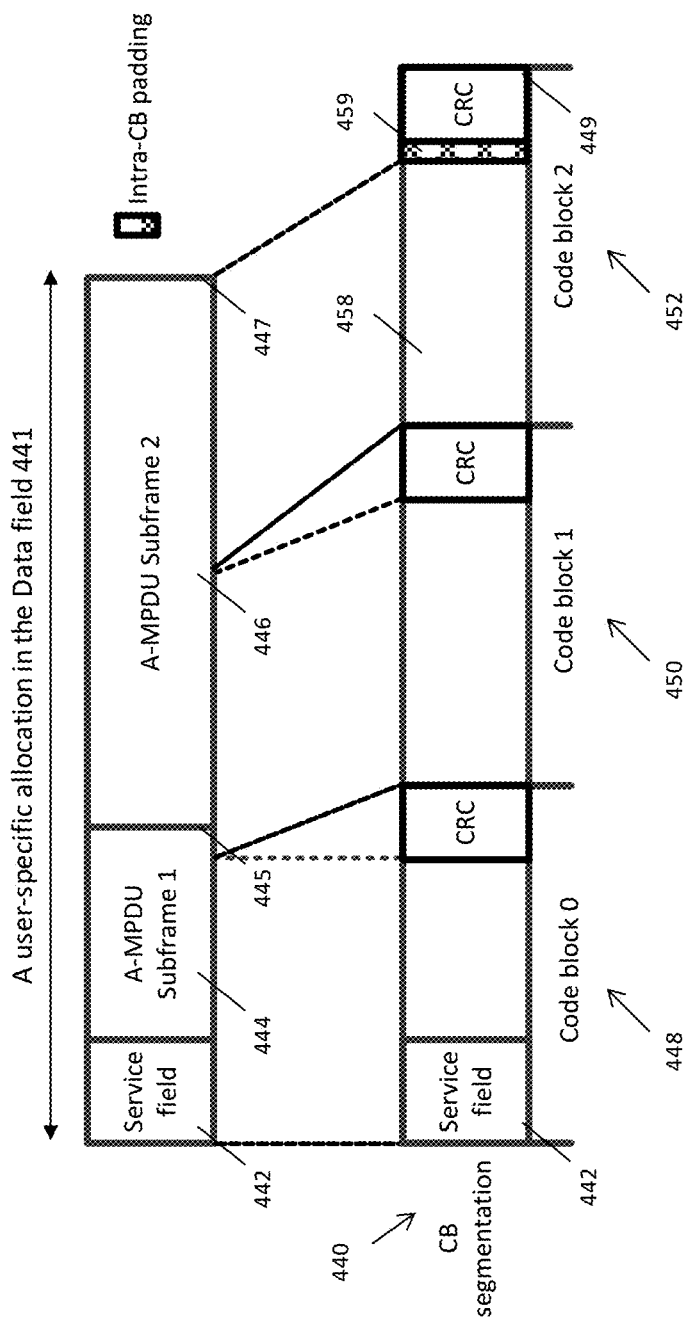
FIG. 4C shows an example type 3 code block segmentation of a data field.

Regarding type 3 code block segmentation, in an A-MPDU, an A-MPDU subframe may be segmented and correspond to one or more code blocks, more than one A-MPDU subframes may correspond to a single code block, and each code block is attached a CRC. FIG. 4C shows an example type 3 code block segmentation 440. A user-specific allocation in the data field of an EHT MU PPDU 441 may include a Service field 442 and an A-MPDU comprising one or more A-MPDU subframes 444, 446. The A-MPDU subframes 444, 446 is segmented into one or more code blocks 448, 450, 452. Each code block 448, 450, 452 has a same code block size and may contain whole or part of a single A-MPDU subframe. The first code block 448 may further contain the Service field 442. The code blocks 448, 450, 452 do not align with A-MPDU subframe boundaries 445, 447, respectively. Intra code block padding bits 459 may be added to the last segmented block of the last A-MPDU subframe 446 in the code block 452 before appending CRC 449 to fill up the code block 452 to the code block size, as depicted in FIG. 4C. The type 3 code block segmentation 440 uses less intra code block padding bits and generates a reduced number of code blocks, therefore is more efficient than the type 2 code block segmentation 420. Similarly, a code block based HARQ feedback mechanism may be required.

Different types of code block segmentation have their respective advantages and disadvantages. Generally, AP or STA can determine the code block segmentation type at its discretion depending on A-MPDU size and MCS.

In the following paragraphs, certain exemplifying embodiments are explained with reference to an AP and multiple STAs for HARQ operation in uplink MU communications.

Figure 5A:
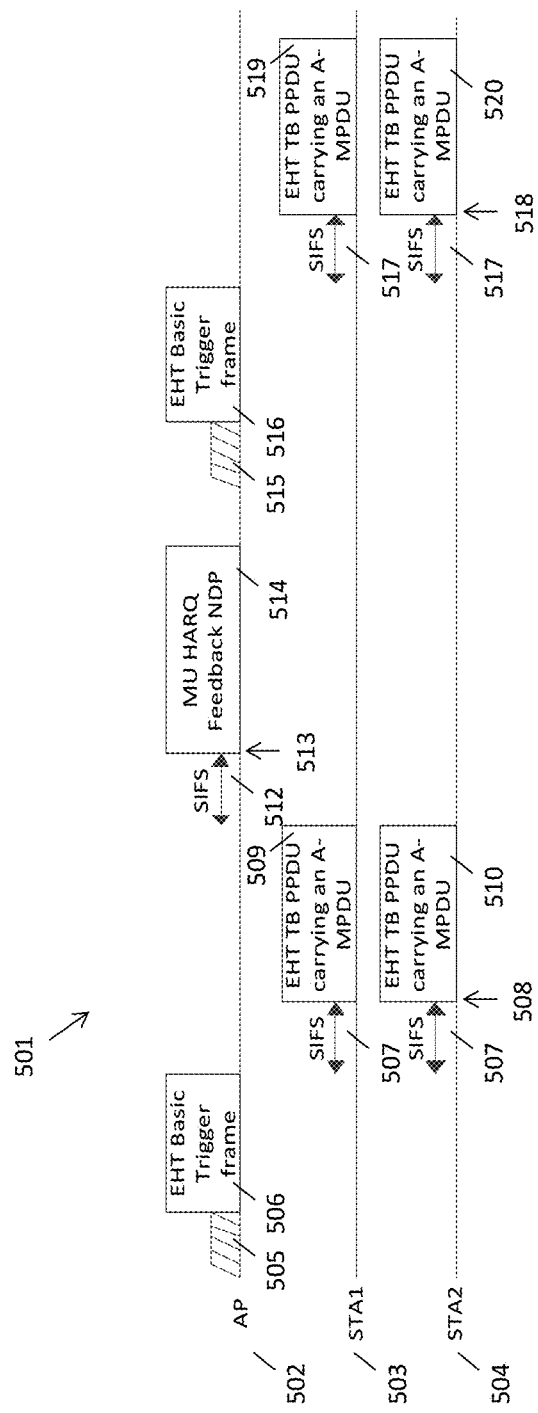
FIG. 5A depicts a flow chart illustrating uplink MU communications between an AP and multiple STAs where type 1 HARQ feedback is enabled.
Figure 10A:
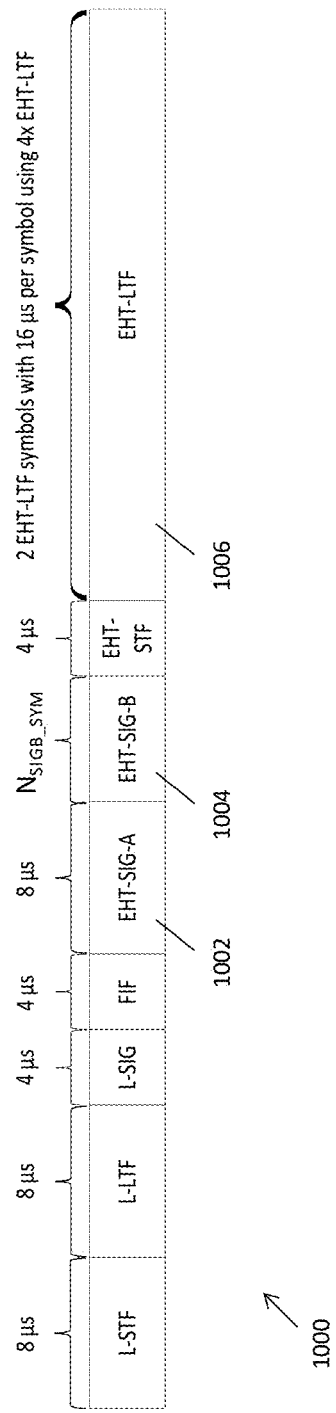
FIG. 10A depicts a first example format of MU HARQ Feedback NDP.
Figure 13A:
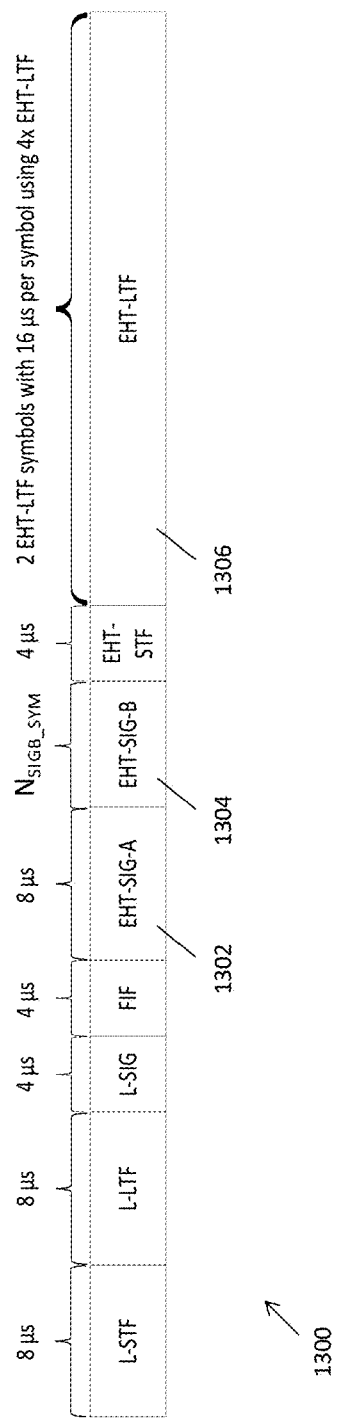
FIG. 13A depicts a second example format of MU HARQ Feedback NDP.
Figure 15A:
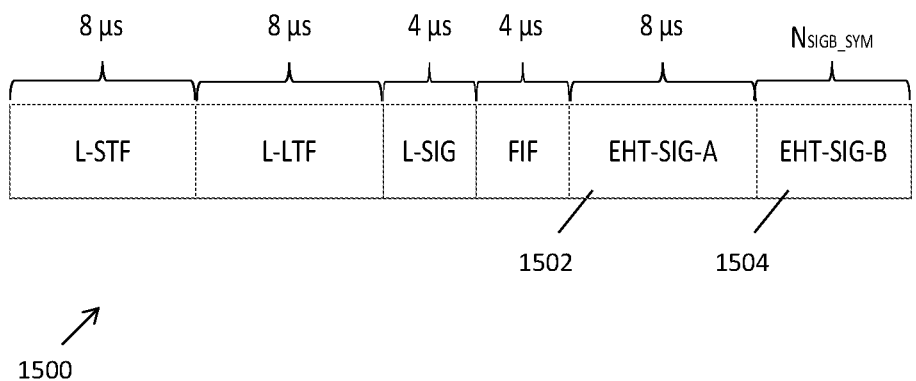
FIG. 15A depicts a third example format of MU HARQ Feedback NDP.

According to the present disclosure, there are four different types of HARQ feedback in uplink MU communications. Regarding Type 1 HARQ feedback, HARQ feedback information is carried in a NDP, for example MU HARQ Feedback NDP as illustrated in FIGS. 10A, 13A and 15A. Type 1 HARQ feedback may advantageously require smaller channel overhead due to the absence of a data field. FIG. 5A depicts a flow chart 501 illustrating uplink MU communications between an AP 502 and multiple STAs 503, 504, where Type 1 HARQ feedback is enabled. Contention based channel access procedure, e.g. Enhanced Distributed Channel Access (EDCA) procedure, is illustrated by block 505 and Short Interframe Spacing (SIFS) 507, 512 is illustrated. An AP 502 may generate a first trigger frame (e.g. EHT Basic Trigger frame) 506 carrying control information for soliciting HARQ initial transmissions of uplink communications for STAs 503, 504. Examples of the trigger frame 506 for soliciting the HARQ initial transmissions can be found in FIG. 6A to 6D, FIG. 7A to 7B, and FIG. 8A to 8C. The control information may comprise user-specific resource allocation information necessary for HARQ initial transmission. For example, the user-specific resource allocation information may include STA identifiers (IDs) or association identifiers (AIDs), RU allocation, MCS, starting spatial stream, number of spatial streams, HARQ scheme, code block size and code block segmentation type for the STAs 503, 504. The user-specific resource allocation information may also contain HARQ feedback type information to indicate Type 1 HARQ feedback for the STAs 503, 504. The radio transmitter of the AP 502 may transmit the generated trigger frame 506 to the STAs 503, 504.

In IEEE 802.11 networks, a SIFS is the time spacing prior to transmission of an immediate response by a STA. After the last symbol of the first trigger frame 506 is transmitted, and the STAs 503, 504 receive the first trigger frame 506 and store the respective information for uplink communications (i.e. the user-specific resource allocation information), a SIFS 507 may take effect, and at 508, the STAs 503, 504 may generate respective EHT TB PPDUs 509, 510, each of which carries an A-MPDU in a data field. The EHT TB PPDUs 509, 510 may be in the same format as EHT TB PPDU 220 illustrated in FIG. 2G. The A-MPDUs in the data fields of the EHT TB PPDUs 509, 510 are segmented into one or more code blocks, respectively. Subsequently, the radio transmitters of the STAs 503, 504 may transmit their respective EHT TB PPDUs 509, 510 to the AP 502. The AP 502 may receive the EHT TB PPDUs 509, 510 and then generate a MU HARQ Feedback NDP 514 carrying HARQ feedback information for the one or more code blocks for the STAs 503, 504. In an embodiment, the MU HARQ Feedback NDP 514 includes an EHT-SIG-B field and an EHT-LTF, the EHT-SIG-B field comprising a plurality of User fields and the EHT-LTF comprising a plurality of tone sets, in which HARQ feedback information is carried. In another embodiment, the MU HARQ Feedback NDP 514 includes an EHT-SIG-B field but does not include an EHT-LTF, and HARQ feedback information is carried in the EHT-SIG-B field of the MU HARQ Feedback NDP 514. In an embodiment, the EHT-SIG-B field of the MU HARQ Feedback NDP 514 may comprise a HARQ codebook size, which indicates the maximum number of code blocks for which HARQ feedback information can be provided. In an embodiment, the EHT-SIG-A field of the MU HARQ Feedback NDP 514 may comprise a HARQ codebook size. In an embodiment, a User field of the EHT-SIG-B field of the MU HARD Feedback NDP 514 may comprise a RU tone set index, which indicates one or more of the plurality of tone sets carrying HARQ feedback information in the EHT-LTF of the MU HARQ Feedback NDP 514 for the intended STA. In an embodiment, a User field of the EHT-SIG-B field of the MU HARQ Feedback NDP 514 may comprise a starting STS number, which indicates the starting space-time stream number for the intended STA. The RU tone set index and starting STS number are then used to multiplex the HARQ feedback information for the STAs 503, 504 in different RU tone sets and/or different space-time streams of the EHT-LTF of the MU HARQ Feedback NDP 514. In an embodiment, the HARQ feedback information for each of the one or more code blocks may be either "ACK" or "NACK". In another embodiment, the HARQ feedback information for each of the one or more code blocks may be one of "ACK", "Type 1 NACK" and "Type 2 NACK".

Thereafter, in a subsequent transmission opportunity (TXOP), the AP 502 may transmit a second trigger frame (e.g. EHT Basic Trigger frame) 516 to the STAs 503, 504 which may be used for soliciting HARQ retransmissions for one or more code blocks with NACK. Contention based channel access procedure, e.g. EDCA procedure, is illustrated by block 515. Examples of the trigger frame 516 soliciting the HARQ retransmissions can be found in FIGS. 6A to 6C, 6E, 7A, 7C, and 8A to 8C. The second trigger frame 516 may carry control information for the uplink communications for the STAs 503, 504 such as user-specific resource allocation information necessary for HARQ retransmission. For example, the user-specific resource allocation information may include STA IDs or AIDs, RU allocation, starting spatial stream and HARQ transmission pattern for the STAs 503, 504. Subsequently, the AP 502 may transmit the generated second trigger frame 516 to the STAs 503, 504. After the last symbol of the second trigger frame 516 is transmitted, and the STAs 503, 504 receive the second trigger frame 516, a SIFS 517 may take effect, and at 518, the radio transmitters of the STAs 503, 504 may generate respective EHT TB PPDUs 519, 520, each of which carries an A-MPDU in a data field comprising the HARQ retransmissions for the one or more code blocks with NACK to the AP 502, respectively.

Figure 5B:
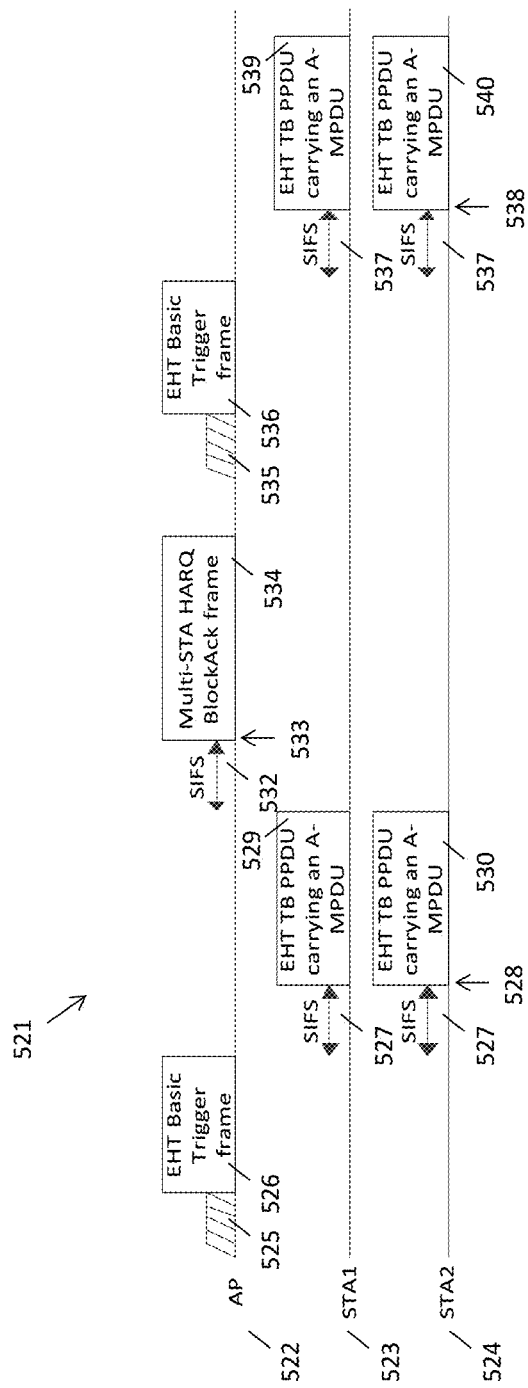
FIG. 5B depicts a flow chart illustrating uplink MU communications between an AP and multiple STAs where type 2 HARQ feedback is enabled.
Figure 17A:
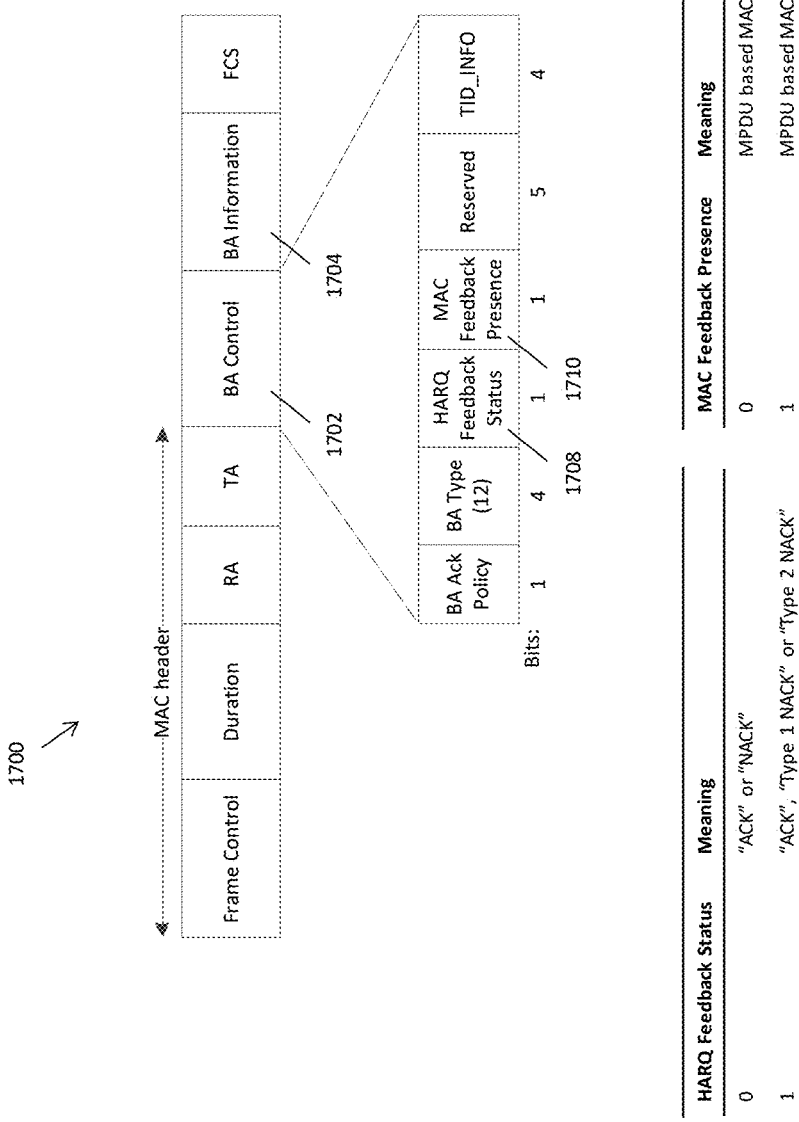
FIG. 17A depicts an example format of Multi-STA HARQ BlockAck (BA) frame.

Regarding Type 2 HARQ feedback, HARQ feedback information is carried in a MAC frame, for example Multi-STA HARQ BlockAck frame illustrated in FIG. 17A. Type 2 HARQ feedback can advantageously support a large number of code blocks per STA. FIG. 5B depicts a flow chart 521 illustrating uplink MU communications between an AP 522 and multiple STAs 523, 524, where Type 2 HARQ feedback is enabled. Contention based channel access procedure, e.g. EDCA, is illustrated by block 525, and SIFS 527, 532 is illustrated. An AP 522 may generate a first trigger frame (e.g. EHT Basic Trigger frame) 526 carrying control information for soliciting HARQ initial transmissions of uplink communications for STAs 523, 524. Examples of the trigger frame 526 soliciting the HARQ initial transmissions can be found in FIG. 6A to 6D, FIG. 7A to 7B, and FIG. 8A to 8C. The control information may comprise user-specific resource allocation information necessary for HARQ initial transmission. For example, the user-specific resource allocation information may include STA IDs or AIDs, RU allocation, starting spatial stream, number of spatial streams, MCS, HARQ scheme, code block size and code block segmentation type for the STAs 523, 524. The user-specific resource allocation information may also contain HARQ feedback type information to indicate Type 2 HARQ feedback for the STAs 523, 524. The radio transmitter of the AP 522 may transmit the generated trigger frame 526 to the STAs 523, 524.

After the last symbol of the first trigger frame 526 is transmitted, and the STAs 523, 524 receive the first trigger frame 526 and store the respective information for uplink communications (i.e. the user-specific resource allocation information), a SIFS 527 may take effect, and at 528, the STAs 523, 524 may generate respective EHT TB PPDUs 529, 530, each of which carries an A-MPDU in a data field. The EHT TB PPDUs 529, 530 may be in the same format as EHT TB PPDU 220 illustrated in FIG. 2G. The A-MPDUs in the data fields of the EHT TB PPDUs 529, 530 are segmented into one or more code blocks, respectively. Subsequently, the radio transmitters of the STAs 523, 524 may transmit their respective EHT TB PPDUs 529, 530 to the AP 522. The AP 522 may receive the EHT TB PPDUs 529, 530 and then generate a Multi-STA HARQ BlockAck frame 534 carrying HARQ feedback information for the one or more code blocks for the STAs 523, 524. In an embodiment, the HARQ feedback information for each of the one or more code blocks may be either "ACK" or "NACK". In another embodiment, the HARQ feedback information for each of the one or more code blocks may be one of "ACK", "Type 1 NACK" and "Type 2 NACK".

Thereafter, in a subsequent TXOP, the AP 522 may transmit a second trigger frame (e.g. EHT Basic Trigger frame) 536 to the STAs 523, 524 which may be used for soliciting HARQ retransmissions for one or more code blocks with NACK. Contention based channel access procedure, e.g. EDCA procedure, is illustrated by block 535. Examples of the trigger frame 536 soliciting the HARQ retransmissions can be found in FIGS. 6A to 6C, 6E, 7A, 7C, and 8A to 8C. The second trigger frame 536 may carry control information for the uplink communications for the STAs 523, 524 such as user-specific resource allocation information necessary for HARQ retransmission. For example, the user-specific resource allocation information may include STA IDs or AIDs, RU allocation, starting spatial stream and HARQ transmission pattern for the STAs 523, 524. Subsequently, the AP 522 may transmit the generated second trigger frame 536 to the STAs 523, 524. After the last symbol of the second trigger frame 536 is transmitted, and the STAs 523, 524 receive the second trigger frame 536, a SIFS 537 may take effect, and at 538, the radio transmitters of STAs 503, 504 may generate respective EHT TB PPDUs 539, 540, each of which carries an A-MPDU in a data field comprising the HARQ retransmissions for the one or more code blocks with NACK to the AP 522, respectively.

Figure 5C:
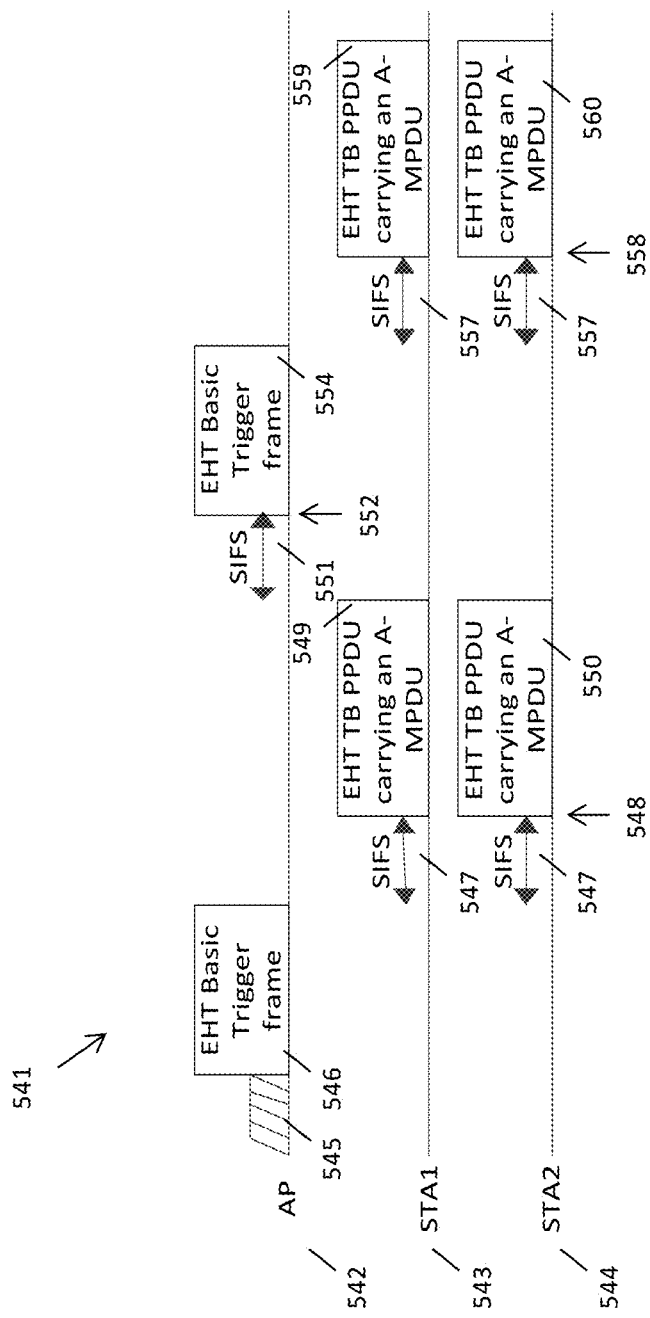
FIG. 5C depicts a flow chart illustrating uplink MU communications between an AP and multiple STAs where type 3a HARQ feedback is enabled.
Figure 5D:
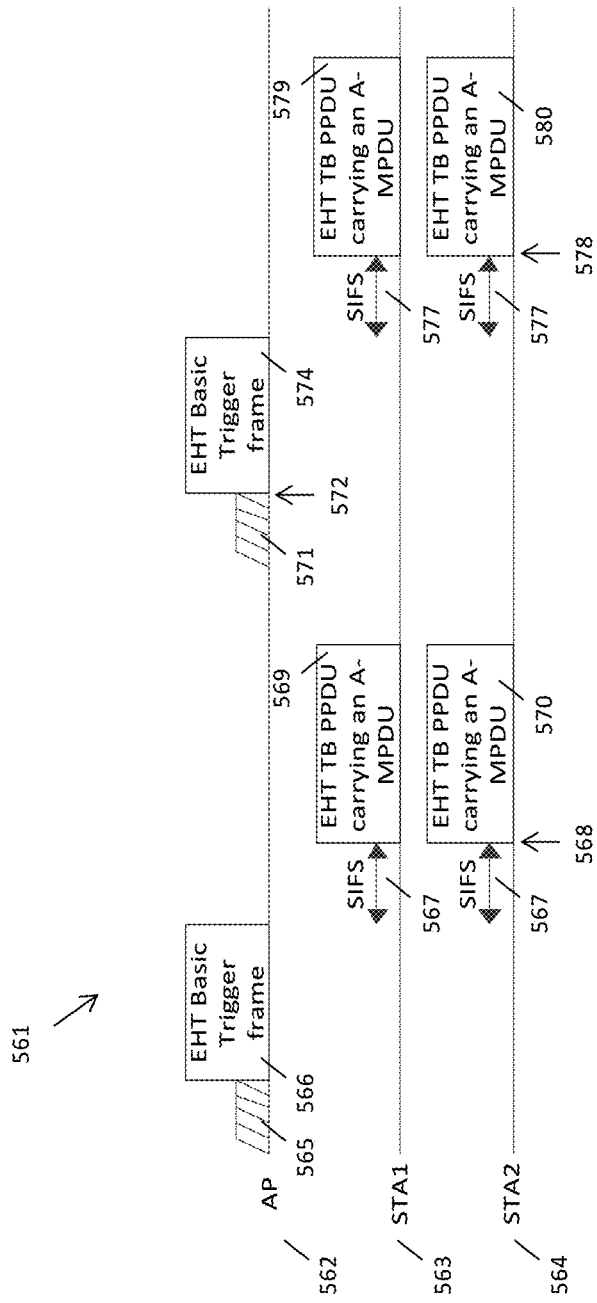
FIG. 5D depicts a flow chart illustrating uplink MU communications between an AP and multiple STAs where type 3b HARQ feedback is enabled.

Regarding type 3a HARQ feedback, HARQ feedback for an initial transmission is carried in a trigger frame soliciting a retransmission which occurred in a same TXOP as the initial transmission. Type 3a HARQ Feedback may advantageously require much smaller channel overhead than type 1 and Type 2 HARQ feedbacks because there is no dedicated NDP or MAC frame is required for carrying the HARQ feedback. Due to a limited TXOP duration, type 3a HARQ feedback is preferable for transmission of an A-MPDU with a smaller size. FIG. 5C depicts a flow chart 541 illustrating uplink MU communications between an AP 542 and multiple STAs 543, 544, where type 3a HARQ feedback is enabled. Contention based channel access procedure, e.g. EDCA, is illustrated by blocks 545, and SIFS 547, 551 is illustrated. An AP 542 may generate a first trigger frame (e.g. EHT Basic Trigger frame) 546 carrying control information for soliciting HARQ initial transmissions of uplink communications for STAs 543, 544. Examples of the trigger frame 546 soliciting the HARQ initial transmissions can be found in FIG. 6A to 6D, FIG. 7A to 7B, and FIG. 8A to 8C. The control information may comprise user-specific resource allocation information necessary for HARQ initial transmission. For example, the user-specific resource allocation information may include STA IDs or AIDs, RU allocation, starting spatial stream, number of spatial streams, MCS, HARQ scheme, code block size and code block segmentation type for the STAs 543, 544. The user-specific resource allocation information may also contain HARQ feedback type information to indicate Type 3a HARQ feedback for the STAs 543, 544. The radio transmitter of the AP 542 may transmit the generated trigger frame 546 to the STAs 543, 544.

After the last symbol of the first trigger frame 546 is transmitted, and the STAs 543, 544 receive the first trigger frame 546 and store the respective information for uplink communications (i.e. the user-specific resource allocation information), a SIFS 547 may take effect, and at 548, the STAs 543, 544 may generate respective EHT TB PPDUs 549, 550, each of which carries an A-MPDU in the data field. The EHT TB PPDUs 549, 550 may be in the same format as EHT TB PPDU 220 illustrated in FIG. 2G. The A-MPDUs in the data fields of the ETH TB PPDUs 549, 550 are segmented into one or more code blocks, respectively. Subsequently, the radio transmitters of STAs 543, 544 may transmit their respective EHT TB PPDUs 549, 550 to AP 542. After the AP 542 has received the EHT TB PPDUs 549, 550, a SIFS 551 may take effect, and at 552, the AP 522 may transmit a second trigger frame (e.g. EHT Basic Trigger frame) 554 within the same TXOP of the initial transmissions, and the second trigger frame 554 may include HARQ feedback information for soliciting HARQ retransmissions for one or more code blocks with NACK. Examples of the trigger frame 554 soliciting the HARQ retransmissions can be found in FIGS. 6A to 6C, 6E, 7A, 7C, and 8A to 8C. The second frame 554 may carry control information for the uplink communications for the STAs 543, 544 such as user-specific resource allocation information necessary for HARQ retransmission. For example, the user-specific resource allocation information may include STA IDs or AIDs, RU allocation, starting spatial stream and HARQ transmission pattern for the STAs 543, 544. The user-specific resource allocation information may comprise HARQ feedback information for the one or more code blocks for STAs 543, 544. The HARQ feedback information for each of the one or more code blocks may be either "ACK" or "NACK". In another embodiment, the HARQ feedback information for each of the one or more code blocks may be one of "ACK", "Type 1 NACK" and "Type 2 NACK". Subsequently, the AP 542 may transmit the generated trigger frame 554 to the STAs 543, 544. After the last symbol of the second trigger frame 554 is transmitted, and the STAs 543, 544 receive the second trigger frame 554, a SIFS 557 may take effect, and at 558, the radio transmitters of the STAs 543, 544 may generate respective EHT TB PPDUs 559, 560, each of which carries an A-MPDU in a data field comprising the HARQ retransmissions for the one or more code blocks with NACK to the AP 542, respectively.

Regarding Type 3b HARQ feedback, HARQ feedback for an initial transmission is carried in a trigger frame soliciting a retransmission which occurred in a different TXOP as the initial transmission. Type 3b HARQ Feedback may advantageously require much smaller channel overhead than Type 1 and Type 2 HARQ feedbacks because there is no dedicated NDP or MAC frame is required for carrying HARQ feedback. In contrast to Type 3a HARQ feedback, Type 3b HARQ feedback is not limited by the duration of a single TXOP and therefore is preferable for transmission of an A-MPDU with a larger size. FIG. 5C depicts a flow chart 561 illustrating uplink MU communications between an AP 562 and multiple STAs 563, 564, where Type 3b HARQ feedback is enabled. Contention based channel access procedure, e.g. EDCA, is illustrated by blocks 565, and SIFS 567 is illustrated. An AP 562 may generate a first trigger frame (e.g. EHT Basic Trigger frame) 566 carrying control information for soliciting HARQ initial transmissions of uplink communications for STAs 563, 564. Examples of the trigger frame 566 soliciting the HARQ initial transmissions can be found in FIG. 6A to 6D, FIG. 7A to 7B, and FIG. 8A to 8C. The control information may comprise user-specific resource allocation information necessary for HARQ initial transmission. For example, the user-specific resource allocation information may include STA IDs or AIDs, RU allocation, starting spatial stream, number of spatial streams, MCS, HARQ scheme, code block size and code block segmentation type for the STAs 563, 564. The user-specific resource allocation information may also contain HARQ feedback type information to indicate Type 3b HARQ feedback for the STAs 563, 564. The radio transmitter of the AP 562 may transmit the generated trigger frame 566 to the STAs 563, 564.

After the last symbol of the first trigger frame 566 is transmitted, and the STAs 563, 564 receive the first trigger frame 566 and store the respective information for uplink communications (i.e. the user-specific resource allocation information), a SIFS 567 may take effect, and at 568, the STAs 563, 564 may generate respective EHT TB PPDUs 569, 570, each of which carries an A-MPDU in the data field. The EHT TB PPDUs 569, 570 may be in the same format as EHT TB PPDU 220 illustrated in FIG. 2G. The A-MPDUs in the data fields of the ETH TB PPDUs 569, 570 are segmented into one or more code blocks, respectively. Subsequently, the radio transmitters of the STAs 563, 564 may transmit their respective EHT TB PPDUs 569, 570 to the AP 562. Thereafter, in the subsequent TXOP, the AP 562 may transmit a second trigger frame (e.g. EHT Basic Trigger frame) 574 which may be used to include HARQ feedback information and solicit HARQ retransmission for one or more code blocks with NACK. Examples of the trigger frame 574 soliciting the HARQ retransmissions can be found in FIGS. 6A to 6C, 6E, 7A, 7C, and 8A to 8C. The second frame 574 may carry control information for the uplink communications for the STAs 563, 564 such as user-specific resource allocation information necessary for HARQ retransmission. For example, the user-specific resource allocation information may include STA IDs or AIDs, RU allocation, starting spatial stream and HARQ transmission pattern for the STAs 563, 564. The user-specific resource allocation information may comprise HARQ feedback information for the one or more code blocks for STAs 563, 564. The HARQ feedback information for each of one or more code blocks may be either "ACK" or "NACK". In another embodiment, the HARQ feedback information for each of one or more code blocks may be one of "ACK", "Type 1 NACK" and "Type 2 NACK". Subsequently, the AP 562 may transmit the generated trigger frame 574 to the STAs 563, 564. After the last symbol of the second trigger frame 574 is transmitted, and the STAs 563, 564 receive the second trigger frame 574, a SIFS 577 may take effect, and at 578, the radio transmitters of the STAs 563, 564 may generate respective EHT TB PPDUs 579, 580, each of which carries an A-MPDU in a data field comprising the HARQ retransmissions for the one or more code blocks with NACK to the AP 562, respectively.

Figure 6A:
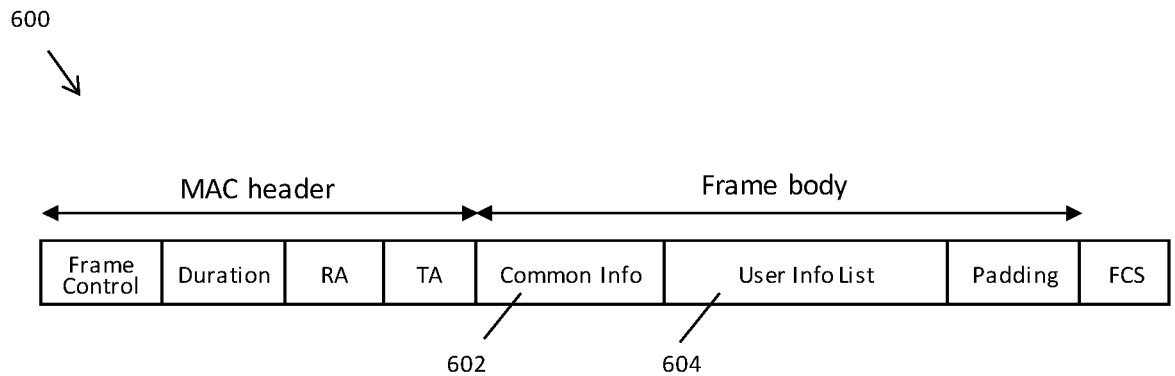
FIG. 6A depicts a first example format of EHT Basic Trigger frame.

FIG. 6A depicts a first example format of EHT Basic Trigger frame 600. The EHT Basic Trigger frame 600 can be used to solicit a HARQ mixed transmission, a HARQ initial transmission, a HARQ retransmission or a transmission with HARQ disabled. The EHT Basic Trigger frame 600 is a variant of the existing Trigger frame and may be used as the first trigger frame 506, 526, 546, 566 and/or the second trigger frame 516, 536, 554, 574 in FIGS. 5A to 5D. The EHT Basic Trigger frame 600 may include a Frame Control field, a Duration field, a RA (recipient STA address) field, a TA (transmitting STA address) field, a Common Info field 602, a User Info List field 604 which contains one or more User Info fields, a padding field and a FCS (frame check sequence) field. The Frame Control field, the Duration field, the RA field and the TA field may be grouped in a MAC header of the EHT Basic Trigger frame 600. The Common Info field 602, the User Info List field 604 and the padding field may be grouped in a frame body of the EHT Basic Trigger frame 600.

Figure 6B:
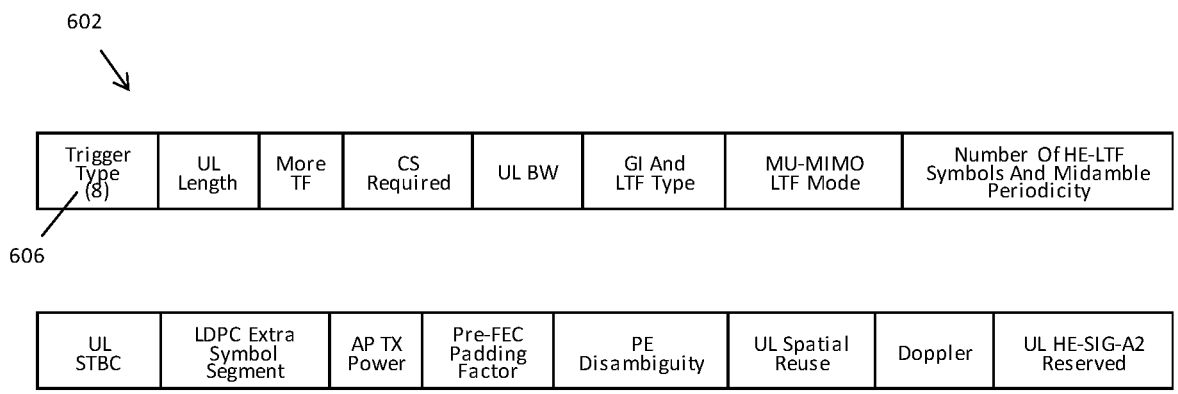
FIG. 6B depicts the Common Info field in more detail.

FIG. 6B depicts the Common Info field 602 in more detail. The Common Info field 602 contains common parameters for all STAs that are engaged in the uplink communications solicited by the EHT Basic Trigger frame 600. The Common Info field 602 includes (or consists of) a Trigger Type subfield 606, a UL (uplink) Length subfield, a More TF (trigger frame) subfield, a CS (carrier sense) subfield, an UL BW (bandwidth) subfield, a GI (guard interval) and LTF Type subfield, a MU-MIMO LTF Mode subfield, a Number of HE-LTF Symbols And Midamble Periodicity subfield, UL STBC (space-time block code) subfield, a LDPC (low-density parity-check) Extra Symbol Segment subfield, a AP TX (transmission) Power subfield, a Pre-FEC (forward error correction) Padding Factor subfield, a PE Disambiguity subfield, a UL Spatial Reuse subfield, a Doppler subfield and a UL HE-SIG-A2 Reserved subfield. The Trigger Type subfield 606, for example has a value of 8, indicates an EHT basic variant of the Trigger frame.

FIG. 6C to 6F depicts the User Info field in more detail according to various embodiments. The User Info List field 604 may contain one or more User Info field, each of the one or more User Info field like 604a may include an AID12 subfield, a RU Allocation subfield, a UL FEC Coding Type subfield, a UL MCS subfield, a UL DCM (dual carrier modulation) subfield, a Starting Spatial Stream subfield, a Number of Spatial Stream subfield, a UL Target RSSI (received signal strength indicator) subfield and a Trigger Dependent User Info subfield 608 which further comprises a HARQ Transmission Type field 610. The HARQ Transmission Type field 610 in the Trigger Dependent User Info subfield 608 is used to indicate four different types of HARQ transmissions: (i) mixed HARQ transmission which includes retransmitted code blocks and initially transmitted code blocks, (ii) HARQ initial transmission which includes initially transmitted code blocks only, (iii) HARQ retransmission which includes retransmitted code blocks only, or (iv) transmission with HARQ disabled. A HARQ mixed transmission is equivalent to an initial transmission for initially transmitted code blocks and a retransmission for retransmitted code blocks.

Figure 6C:
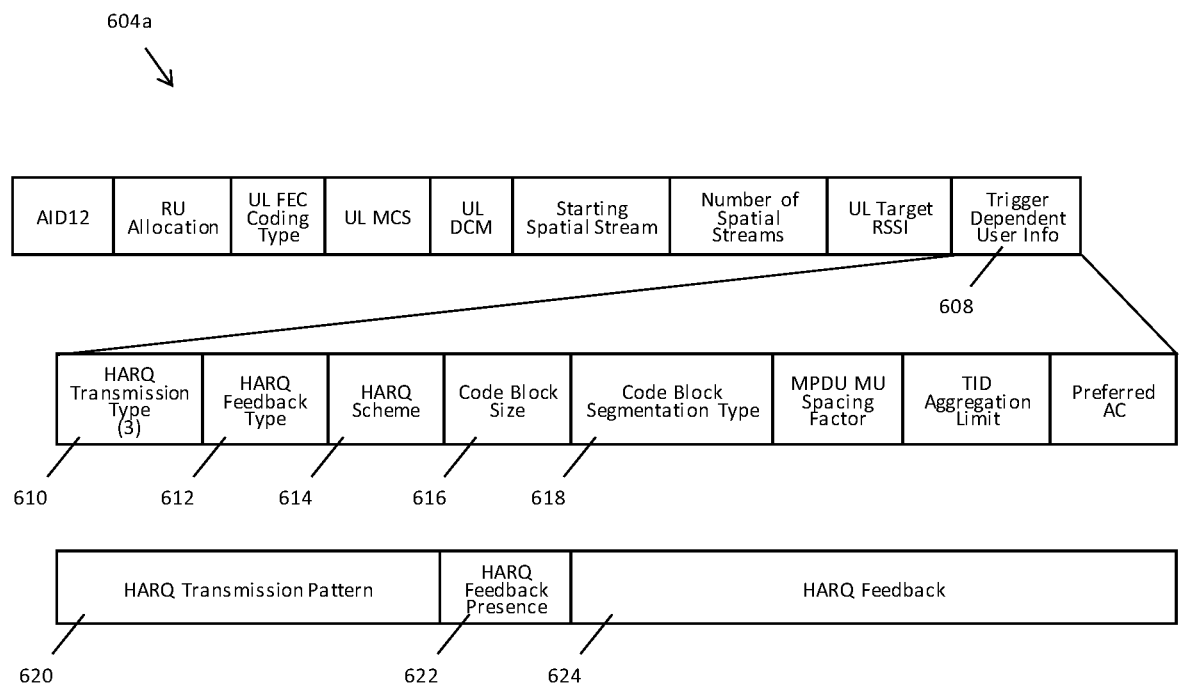
FIG. 6C to 6F depict the User Info field in more detail according to various embodiments.

According to an embodiment, a Trigger Dependent User Info subfield 608 in a User Info field 604a may comprise a HARQ Transmission Type field 610, a HARQ Feedback type field 612, a HARQ Scheme field 614, a Code Block Size field 616, a Code Block Segmentation Type field 618, a MPDU MU Spacing Factor field, a TID Aggregation Limit field, a Preferred AC field, a HARQ Transmission Pattern field 620, a HARQ Feedback Presence field 622 and a HARQ Feedback field 624, as depicted in FIG. 6C. The HARQ Transmission Type field 620 may be set to "0" to indicate a HARQ initial transmission, set to "1" to indicate a HARQ retransmission, set to "2" to indicate a transmission with disabled HARQ operation, or set to "3" to indicate a HARQ mixed transmission. The HARQ Feedback Type field 612 may be set to "0" to indicate HARQ feedback type 1 where HARQ feedback is carried in a NDP such as MU HARQ Feedback NDP, set to "1" to indicate HARQ feedback type 2 where HARQ feedback is carried in a MAC frame such as Multi-STA HARQ BlockAck frame, set to "2" to indicate HARQ feedback Type 3a where HARQ feedback for an initial transmission is carried in a Trigger frame soliciting a retransmission which occurred in a same TXOP as the initial transmission, or set to "3" to indicate HARQ feedback Type 3b where HARQ feedback for an initial transmission is carried in a Trigger frame soliciting a retransmission which occurred in a different TXOP as the initial transmission. The HARQ Scheme field 614 indicates a HARQ type such as HARQ CC (chase combining) or HARQ IR (incremental redundancy) if the field is set to "0" or "1", respectively. The HARQ Transmission Pattern field 620 indicates the puncturing pattern in case of HARQ CC and redundancy version in case of HARQ IR. The HARQ Feedback Presence field 622 may be set to "1" to indicate a presence of HARQ feedback information or set to "0" to indicate otherwise; and if HARQ feedback information is present (HARQ Feedback Presence field 632=1), the HARQ Feedback field 624 may indicate the code blocks to be retransmitted, or the field 624 will be otherwise reserved. According to the present disclosure, in the User Info field 604a of the EHT Basic Trigger frame used for HARQ operations in uplink communications, as depicted in FIG. 6C, the control signalling for soliciting a HARQ initial transmission for initially transmitted code blocks is indicated in the HARQ Feedback Type field 612, the HARQ Scheme field 614, the Code Block Size field 616 and the Code Block Segmentation Type field 618; whereas the control signalling for soliciting a HARQ retransmission for retransmitted code blocks is indicated in the HARQ Transmission Pattern field 620, the HARQ Feedback Presence field 622 and the HARQ Feedback field 624.

A User Info field 604a has a fixed length, the format of which depends on the value of the HARQ Transmission Type field 610. FIG. 6C depicts an example User Info field 604a when a HARQ mixed transmission is solicited by the EHT Basic Trigger frame 600 (HARQ Transmission Type field 610=3). In a HARQ mixed transmission, both HARQ initial transmissions and HARQ retransmissions are enabled and solicited. The Trigger Dependent User Info subfield 608 in the User Info field 604a may comprise fields related to HARQ initial transmissions such as a HARQ Feedback Type field 612, a HARQ Scheme field 614, a Code Block Size field 616 and a Code Block Segmentation Type field 618 to indicate control signalling for the initially transmitted code blocks; and fields related to HARQ retransmissions such as a HARQ Transmission Pattern field 620, a HARQ Feedback Presence field 622 and a HARQ Feedback field 624 to indicate control signalling for the retransmitted code blocks.

Figure 6D:
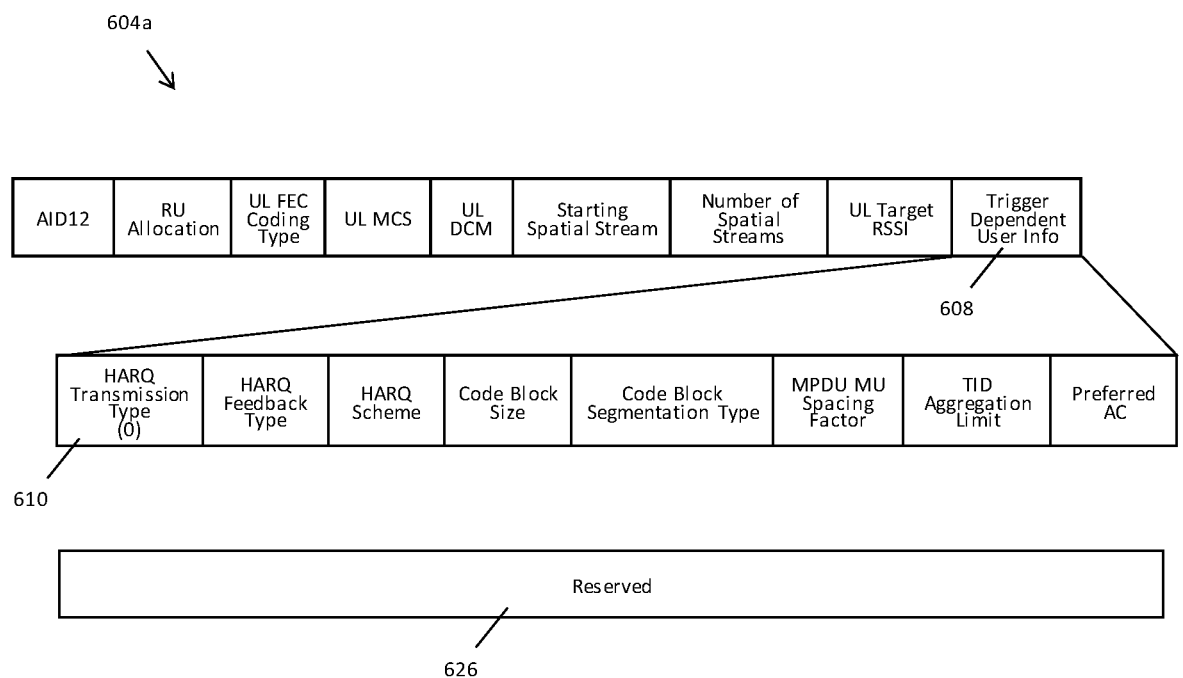

FIG. 6D depicts an example User Info field 604*a* when a HARQ initial transmission for initially code blocks is solicited by the EHT Basic Trigger frame 600 (HARQ Transmission Type field 610=0). The Trigger Dependent User Info subfield 608 in the User Info field 604*a* may comprise a HARQ Feedback type field 626, a HARQ Scheme field 624, a Code Block Size field 626 and a Code Block Segmentation Type field 628 to indicate control signalling for the initially transmitted code blocks, appended with a MPDU MU Spacing Factor field, a TID Aggregation Limit field and a Preferred AC field. A HARQ retransmission is not solicited, so the fields which contain control signalling for the HARQ retransmission (e.g. HARQ Transmission Pattern field, HARQ Feedback Presence field and HARQ Feedback field) may be reserved in the User Info field 604, as indicated by 626. In case of HARQ IR (HARQ Scheme field is set to "1"), a determined redundancy version is used for the HARQ initial transmission.

Figure 6E:
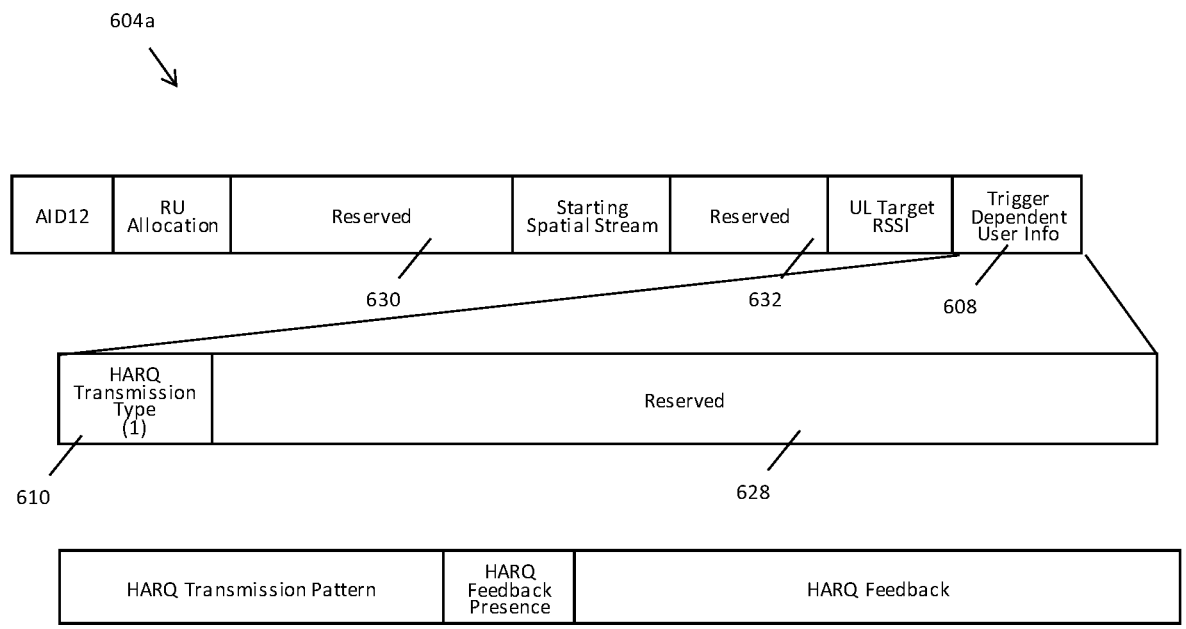

Similarly, FIG. 6E depicts an example User Info field 604*a* when a HARQ retransmission for retransmitted code blocks is solicited by the EHT Basic Trigger frame 600 (HARQ Transmission Type field 610=1). The Trigger Dependent User Info subfield 608 in the User Info field 604*a* may comprise a HARQ Transmission Pattern field, a HARQ Feedback Presence field and a HARQ Feedback field to indicate information for the retransmitted code blocks. A HARQ initial transmission is not solicited; the fields which contain control signalling for the HARQ initial transmission (e.g. HARQ Feedback Type field, HARQ Scheme field, Code Block Size and Code Block Segmentation Type field, MPDU MU Spacing Factor, TID Aggregation Limit, Preferred AC) may be reserved in the User Info field 604, as indicated by 628. Additionally, a STA shall capture and store information from the previous trigger frame soliciting HARQ initial transmission such as UL FEC Coding Type subfield, UL MCS subfield and UL DCM subfield therefore these fields may also be reserved in the User Info field 604*a*, as indicated by 630, 632. A STA shall still indicate a RU Allocation subfield 614 and a Starting Spatial Stream 616 subfield for a HARQ retransmission, as the RU allocation and the starting spatial stream of the HARQ retransmission may vary from those of a HARQ initial transmission thus cannot be captured or stored from the previous trigger frame.

Figure 6F:
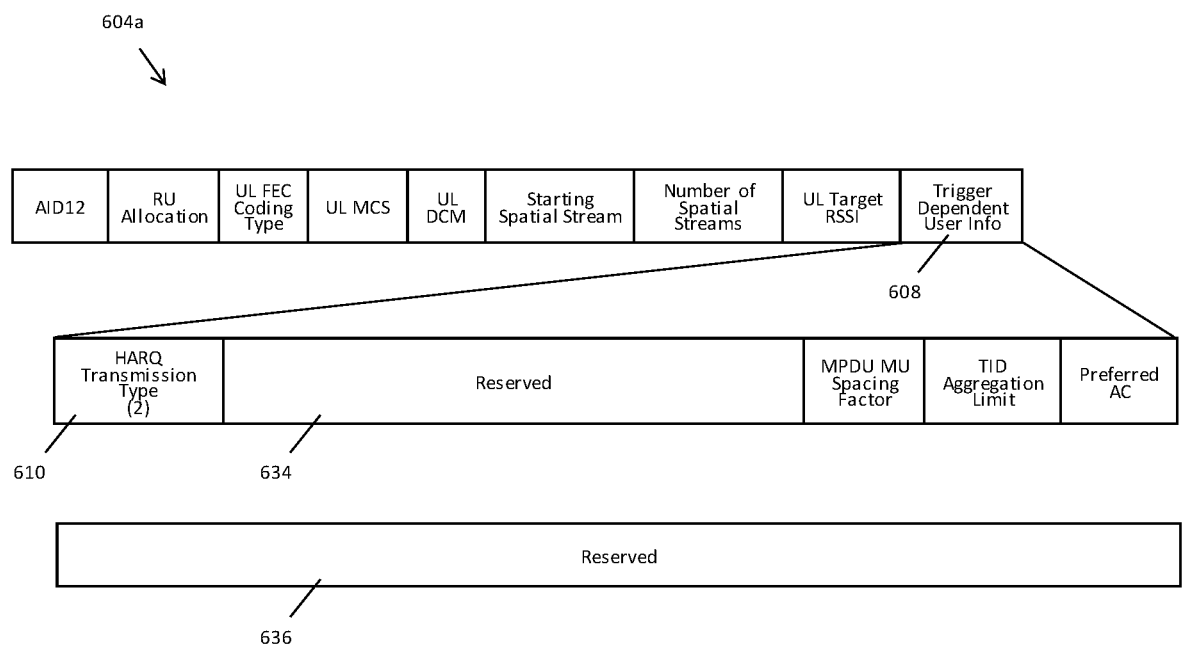

FIG. 6F depicts an example User Info field 604*a* when a transmission with disabled HARQ operation is solicited by the EHT Basic Trigger frame 600 (HARQ Transmission Type field 610=2). The Trigger Dependent User Info subfield 608 in the User Info field 604*a* may comprise fields for non-HARQ operation such as the MPDU MU Spacing Factor field, the TID Aggregation Limit field and the Preferred AC field, whereas all HARQ operation related fields (e.g. HARQ Feedback Type, HARQ Scheme, Code Block, Code Block Segmentation Type and HARQ Feedback fields) are reserved in the User Info field 604*a*, as indicated by 634, 636.

Figure 7A:
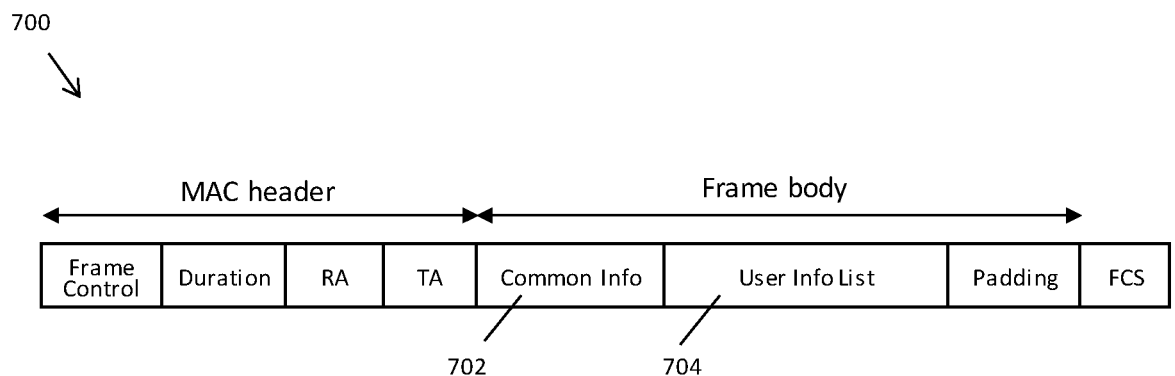
FIG. 7A depicts a second example format of EHT Basic Trigger frame.

FIG. 7A depict a second example format of EHT Basic Trigger frame 700. The EHT Basic Trigger frame 700 can be used to solicit a HARQ initial transmission, a HARQ retransmission or a transmission with HARQ disabled. The EHT Basic Trigger frame 700 is similar to the EHT Basic Trigger frame 600 in the first example format in FIG. 6A, with a different User Info field format and size. The EHT Basic Trigger frame can also be used as the first trigger frame 506, 526, 546, 566 and/or the second trigger frame 516, 536, 554, 574 in FIGS. 5A to 5D. Similarly, the EHT Basic Trigger frame 700 may include a Frame Control field, a Duration field, a RA field, a TA field, a Common Info field 702, a User Info List field 704 which contains one or more User Info fields, a padding field and a FCS field. The Frame Control field, the Duration field, the RA field and the TA field may be grouped in a MAC header of the EHT Basic Trigger frame 700. The Common Info field 702, the User Info List field 704 and the padding field may be grouped in a frame body of the EHT Basic Trigger frame 700.

Unlike the first example format, the EHT Basic Trigger frame 700 does not solicit a HARQ mixed transmission, therefore the fields that contain control signalling for a HARQ initial transmission and the fields that contain control signalling for a HARQ retransmission do not co-exist in the one or more User Info field of the User Info List field 704. Such EHT Basic Trigger frame 700 may advantageously be used to solicit any transmission (except HARQ mixed transmission) with a shorter trigger size or length. The Common Info field 702 of the EHT Basic Trigger frame 700 has a same format as the first example Common Info field 602 depicted in FIG. 6B.

Figure 7B:
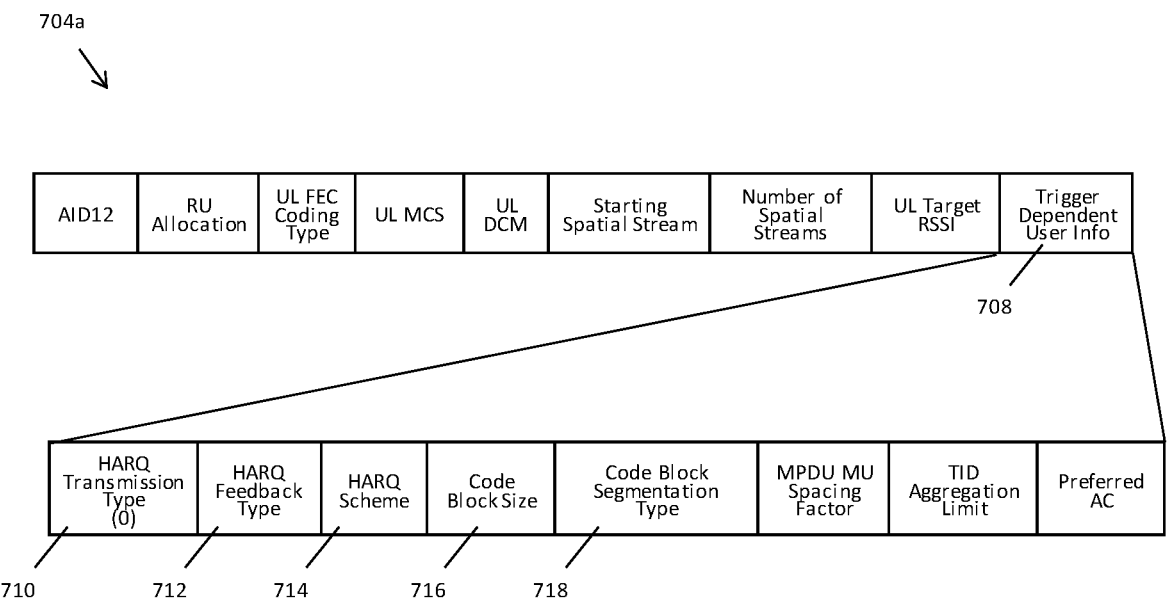
FIG. 7B to 7D depict various formats of User Info fields in more details.
Figure 7C:
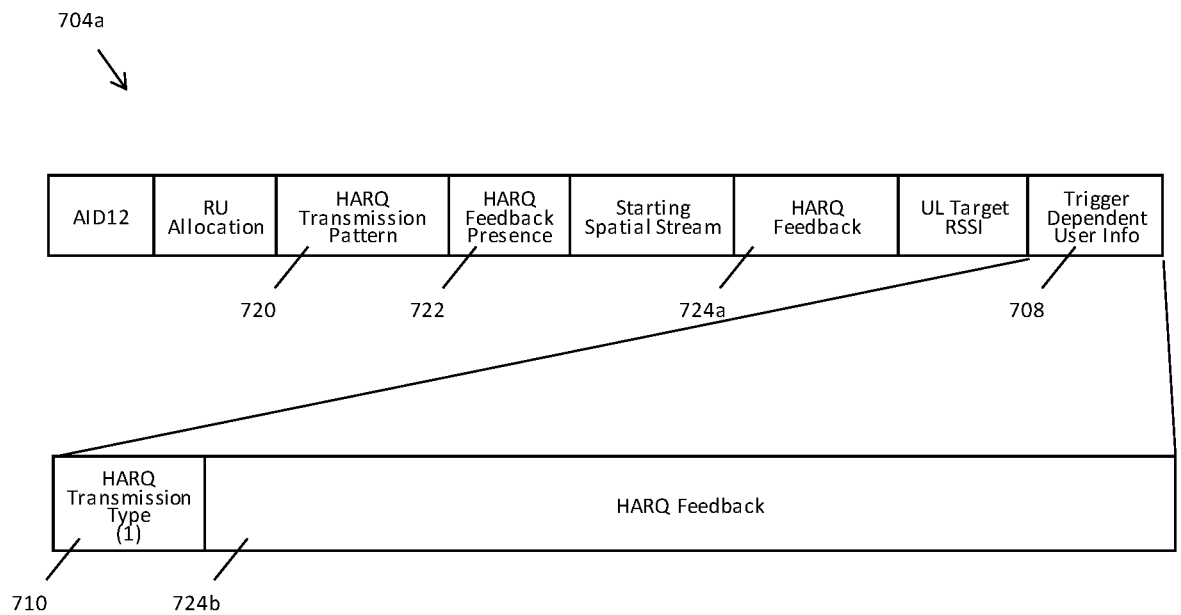
Figure 7D:
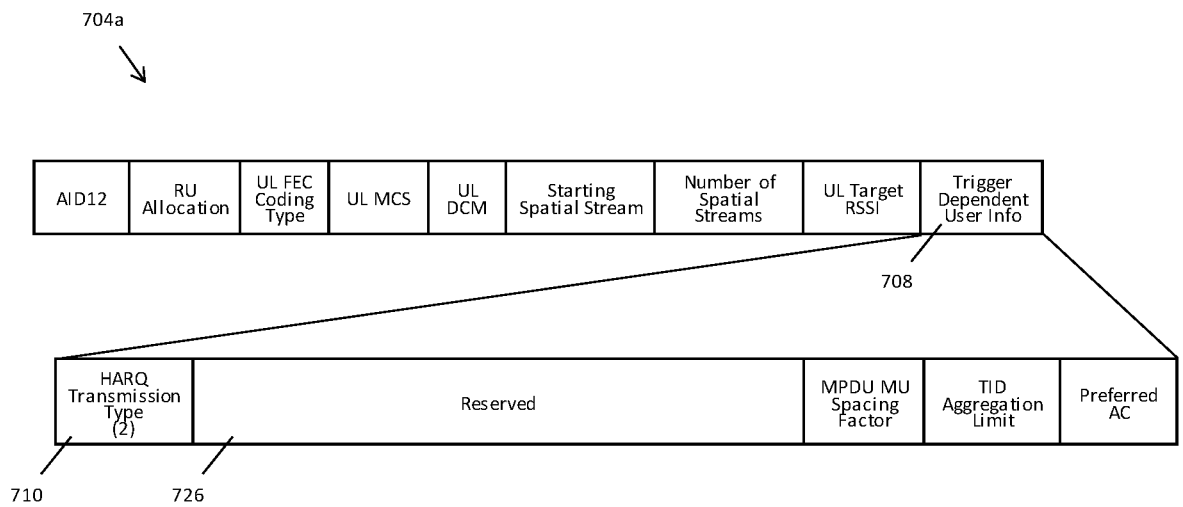

FIG. 7B to 7D depict various formats of User Info fields in more details. The User Info List field 704 may contain one or more User Info field, each of the one or more User Info field like 704*a* may include an AID12 subfield, a RU Allocation subfield, a UL FEC Coding Type subfield, a UL MCS subfield, a UL DCM subfield, a Starting Spatial Stream subfield, a Number of Spatial Stream subfield, a UL Target RSSI subfield and a Trigger Dependent User Info subfield 708 which further comprises a HARQ Transmission Type field 710. In an embodiment, the HARQ Transmission Type field 710 may be set to "0" to indicate a HARQ initial transmission, set to "1" to indicate a HARQ retransmission, or set to "2" to indicate a disabled HARQ operation. The User Info field has a fixed length and the format of the User Info field depends on the value of the HARQ Transmission Type field 710.

FIG. 7B depicts an example format of the User Info field 704*a* of the EHT Basic Trigger frame 700 which can be used to solicit a HARQ initial transmission (HARQ Transmission Type field 710=0). For soliciting a HARQ initial transmission for initially transmitted code blocks, the User Info field 704*a* may comprise a HARQ Feedback Type field 712, a HARQ Scheme field 714, a Code Block Size field 716, a Code Block Segmentation Type field 718. In this embodiment, the HARQ initial transmission related fields are included in the Trigger Dependent User Info field 708 of the User Info field 704*a* and appended with a MPDU MU Spacing Factor field, a TID Aggregation Limit field and a Preferred AC field.

FIG. 7C depicts an example format of a User Info field 704*a* of an EHT Basic Trigger frame 700 which can be used to solicit a HARQ retransmission (HARQ Transmission Type field 710=1). The information fields that contain control signaling for HARQ initial transmission (e.g. the HARQ Feedback Type, HARQ Scheme, Code Block Size, Code Block Segmentation Type, MPDU MU Spacing Factor, TID Aggregation Limit, Preferred AC, UL FEC Coding Type, UL MCS, UL DCM and Number of Spatial Streams fields) as shown in FIG. 7B can be reused as the information fields that contain control signaling for HARQ retransmission (e.g. HARQ Transmission Pattern field 720, HARQ Feedback Presence field 722 and HARQ Feedback field 724*a*, 724*b*). In an embodiment, the UL FEC Coding Type, UL MCS, UL DCM and Number of Spatial Stream fields may be replaced with HARQ retransmission related fields such as the HARQ Transmission Pattern field 720, the HARQ Feedback Presence field 722 and/or a part of the HARQ Feedback field like 724a, and the HARQ Feedback Type, HARQ Scheme, Code Block Size, Code Block Segmentation Type, MPDU MU Spacing Factor, TID Aggregation Limit and Preferred AC fields of the Trigger Dependent User Info field are replaced with another part of the HARQ Feedback field like 724b, as depicted in FIG. 7C.

FIG. 7D depicts an example format of a User Info field 704a of an EHT Basic Trigger frame 700 which can be used to solicit a transmission with HARQ disabled (HARQ Transmission Type 710=2). For soliciting a transmission with HARQ disabled, the User Info field 704a may comprise a MPDU MU Spacing Factor field, a TID Aggregation Limit field and a Preferred AC field in the Trigger User Dependent Info field 708. As a result, the User Info field 704 may be absent from all HARQ operation related fields, and an unused portion of the Trigger User Dependent Info field 708 in the User Info field 704a may be reserved, as indicated by 726.

Figure 8A:
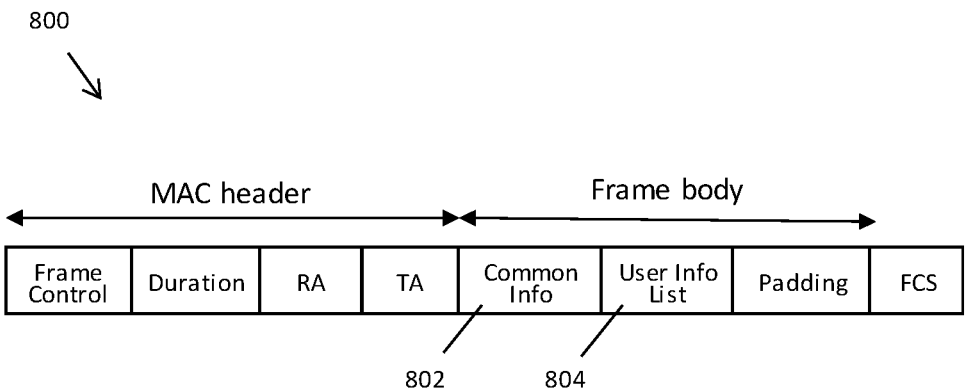
FIG. 8A depicts a third example format of EHT Basic Trigger frame.

FIG. 8A depicts a third example format of EHT Basic Trigger Frame 800. The EHT Basic Trigger frame 800 is a new EHT Trigger frame which can be used to solicit a HARQ mixed transmission, a HARQ initial transmission, a HARQ retransmission or a transmission with HARQ disable. The EHT Basic Trigger frame 800 may be used as the first trigger frame 506, 526, 546, 566 and/or the second trigger frame 516, 536, 554, 574 in FIGS. 5A to 5D. The EHT Basic Trigger frame 800 may include a Frame Control field with a Type subfield set to "01" and a Subtype subfield set to a specific value (e.g. "0001") to indicate an EHT Trigger frame. The EHT Basic Trigger frame 800 may further include a Duration field, a RA field, a TA field, a Common Info field 802, a User Info List field 804 which contains one or more User Info fields, a padding field and a FCS field. The Frame Control field, Duration field, RA field and TA field may be grouped in a MAC header of the EHT Basic Trigger frame 800. The Common Info field 802, User Info List field 804 and padding field may be grouped in a frame body of the EHT Basic Trigger frame 800.

Figure 8B:
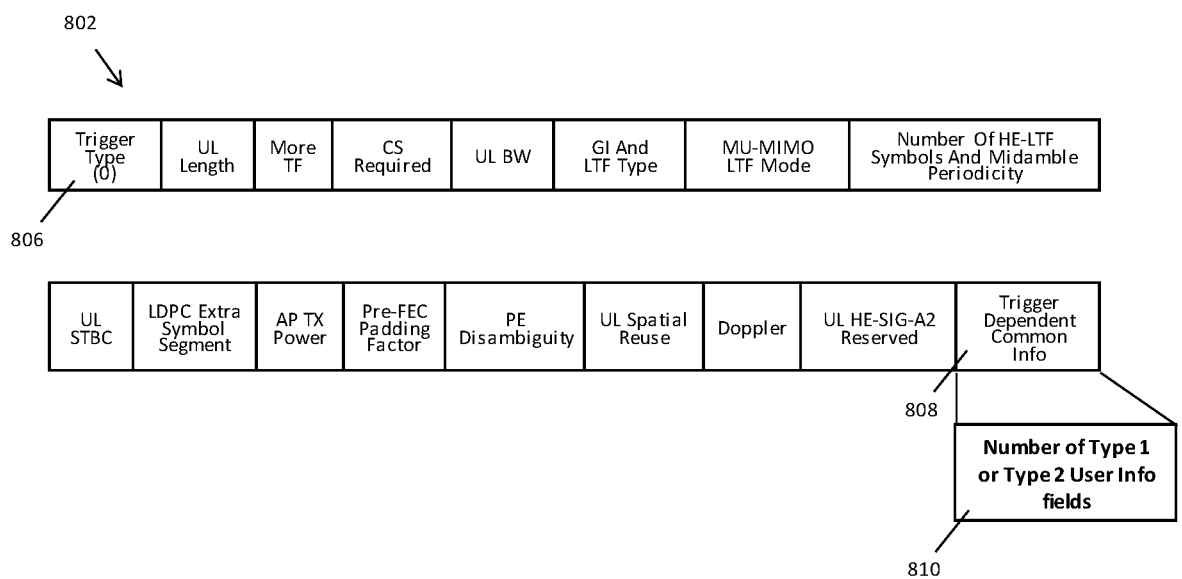
FIG. 8B depicts the Common Info field in more detail.

FIG. 8B depicts the Common Info field 802 in more detail. The Common Info field 802 contains common parameters for all STAs that are engaged in the uplink communications solicited by the EHT Basic Trigger frame 800. The Common Info field 802 includes (or consists of) a Trigger Type subfield 806, a UL Length subfield, a More TF subfield, a CS subfield, an UL BW subfield, a GI and LTF Type subfield, a MU-MIMO LTF Mode subfield, a Number of HE-LTF Symbols And Midamble Periodicity subfield, UL STBC subfield, a LDPC Extra Symbol Segment subfield, a AP TX Power subfield, a Pre-FEC Padding Factor subfield, a PE Disambiguity subfield, a UL Spatial Reuse subfield, a Doppler subfield, a UL HE-SIG-A2 Reserved subfield and a Trigger Dependent Common Info field 808 which further comprises a Number of Type 1 (or Type 2) User Info field 810. The Trigger Type subfield 806, for example, has a value of 0, indicates a basic variant of EHT Trigger frame.

The User Info List field 804 comprises one or more User Info field. Each of the one or more User Info field can be classified into two types: (i) Type 1 User Info field which is used to solicit a HARQ mixed transmission; and (ii) Type 2 User Info field which is used to solicit a HARQ initial transmission, a HARQ retransmission, or a transmission with HARQ disabled. In particular, Type 1 User Info field comprises control signalling for a HARQ mixed transmission, i.e. a HARQ initial transmission plus a HARQ retransmission, whereas Type 2 User Info field comprises control signalling for soliciting a HARQ initial transmission, a HARQ retransmission, or a transmission with HARQ disabled, each of which has the same format as the second example User Info field depicted in FIG. 7B to 7D, respectively. Type 2 User Info field has a shorter frame size or length than that of Type 1 User Info field. Therefore, in contrast to the User Info field 604, 704 of the first and second example EHT Basic Trigger frame 600, 700 which exhibits a fixed length regardless of HARQ transmission type, the User Info field 804 of this example format EHT Basic Trigger frame 800 has a length that may vary depending on the HARQ transmission type. As such, the EHT Basic Trigger frame 800 with the User Info List field 804 may advantageously be used to solicit any transmission with shorter trigger size or length. In an embodiment, Type 1 User Info fields are placed before Type 2 User Info fields in the User Info List field 804 of the frame body field, the Number of Type 1 User Info field 812 in Common Info field 802 indicates the number of Type 1 User Info fields in the User Info List field 804, which can be used by STA to determine the type of each of the one or more User Info fields in the User Info List field 804. In another embodiment, Type 2 User Info fields are placed before Type 1 User Info fields in the User Info List field 804 of the frame body field, the Number of Type 2 User Info field 812 in Common Info field 802 is used to indicate the number of Type 2 User Info fields in the User Info List field 804.

Figure 8C:
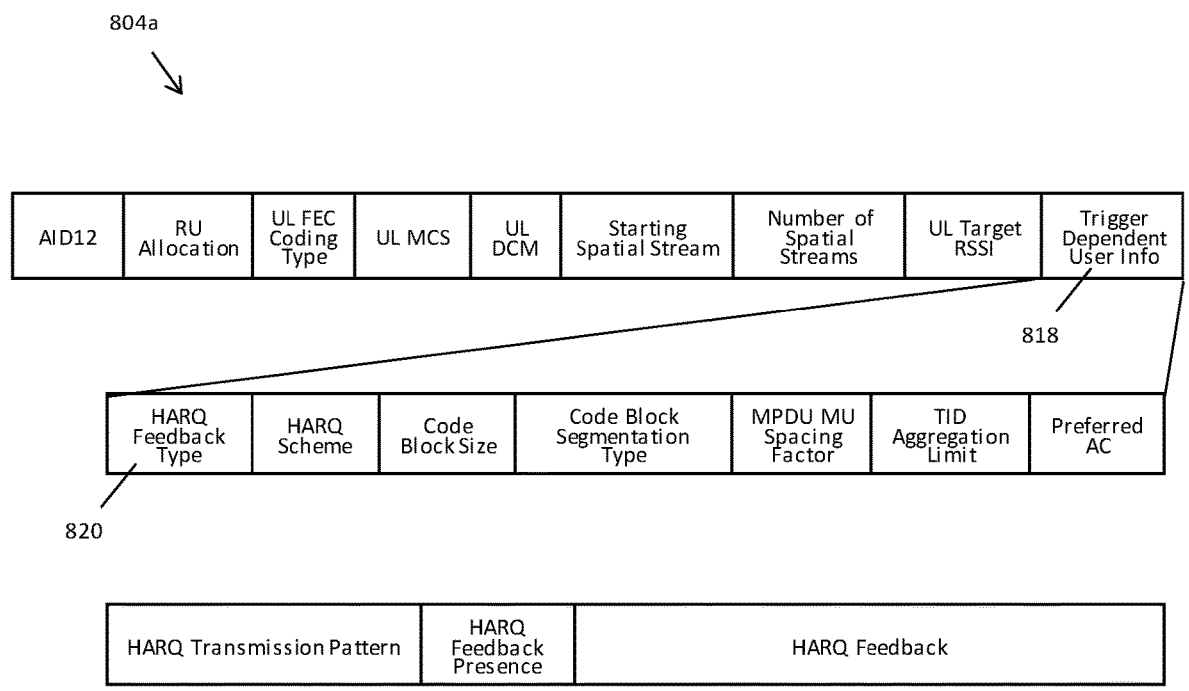
FIG. 8C depicts the User Info field in more detail.

FIG. 8C depicts the User Info field in more details. Specifically, FIG. 8C depicts an example format of Type 1 User Info field 804a in the User Info List field 804 of the EHT Basic Trigger frame 800, which is used for soliciting a HARQ mixed transmission. Type 1 User Info field 804a may comprise an AID12 field, a RU Allocation field, UL FEC Coding Type field, UL MCS field, UL DCM field, Starting Spatial Stream field, Number of Spatial Stream field, UL Target RSSI field, and a Trigger Dependent User Info field 818. The Triger Dependent User Info field 818 may further comprises a HARQ Feedback Type field 820, a HARQ Scheme field, a Code Block Size field and a Code Block Segmentation Type field a MPDU MU Spacing Factor field, a TID Aggregation Limit field, a Preferred AC field, a HARQ Transmission Pattern field, a HARQ Feedback Presence field and a HARQ Feedback field. A Type 1 User Info field 804a has a format similar to the User Info field 604a in FIG. 6C used for soliciting a HARQ mixed transmission but without the HARQ Transmission Type field because Type 1 User Info field 804a is purely used for soliciting a HARQ mixed transmission hence no control signalling like the HARQ Transmission Type field is required to indicate the HARQ mixed transmission.

Referring to an EHT TB PPDU comprising an A-MPDU (aggregate MAC protocol data unit) transmitted by a STA in uplink communications, a HARQ applicable A-MPDU is an A-MPDU that includes at least one MPDU that solicits acknowledgement, for example, an A-MPDU that is transmitted in the context of Data Enabled No Immediate Response or Control Response is not a HARQ applicable A-MPDU. In various embodiments, in a HARQ applicable A-MPDU, one or more MPDUs that solicits acknowledgement are placed consecutively so that the corresponding code blocks are numbered consecutively. This may advantageously reduce HARQ feedback overhead. A HARQ operation shall be disabled for an EHT TB PPDU if the AP does not support HARQ operation or an A-MPDU carried in the data field is not a HARQ applicable A-MPDU. Alternatively, a HARQ operation may be enabled for an EHT TB PPDU if the AP supports HARQ operation, and an A-MPDU carried in the data field is a HARQ applicable A-MPDU.

Figure 9:
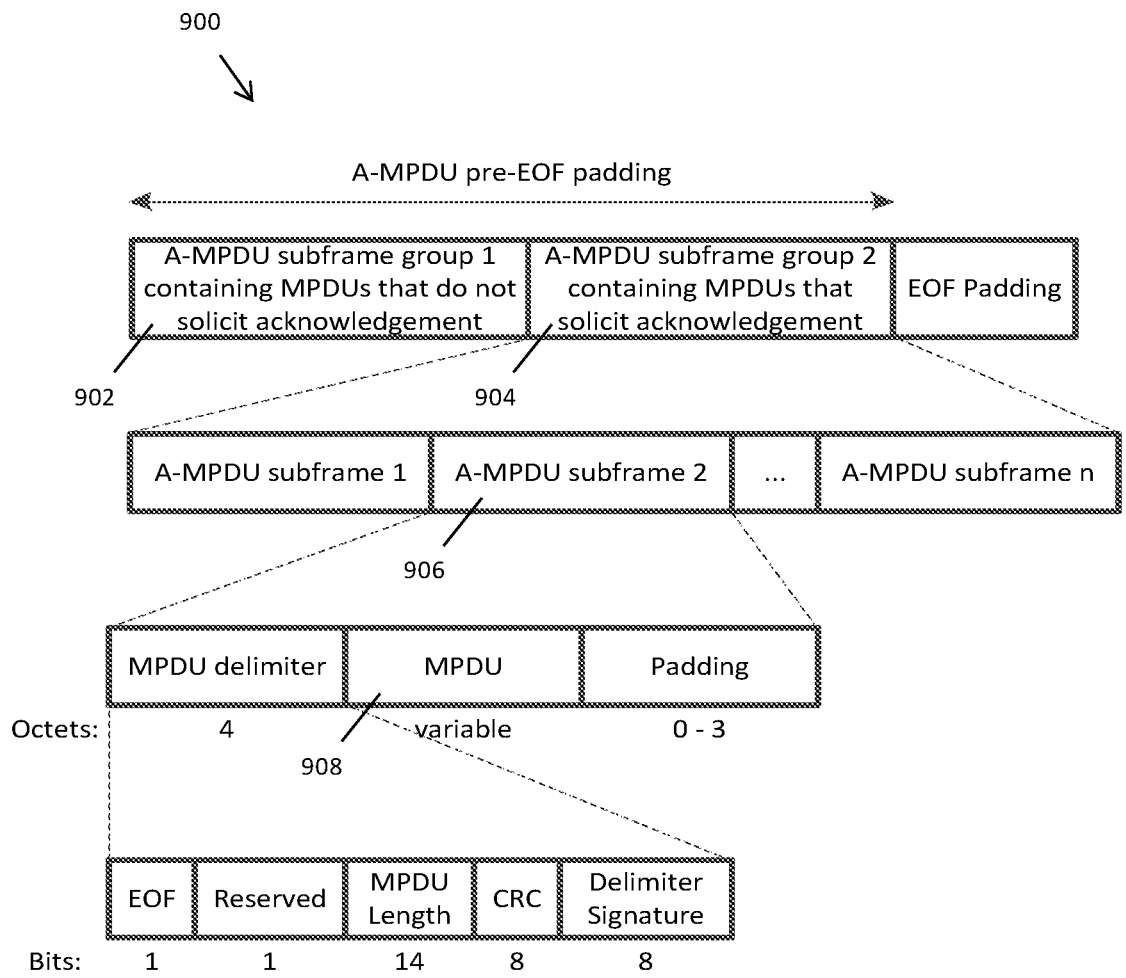
FIG. 9 shows an example format of HARQ applicable A-MPDU (aggregate MAC protocol data unit).

FIG. 9 depicts an example format of a HARQ applicable A-MPDU 900. A HARQ applicable A-MPDU 900 shall comprise one or more A-MPDU subframes, each containing a single MPDU that solicits acknowledgement. A HARQ applicable A-MPDU 900 may further comprise one or more A-MPDU subframes, each containing a single MPDU that do not solicit acknowledgement. For example, an Ack, BlockAck, or Trigger frame does not require acknowledgement. Conventionally, from a legacy STA perspective, if an Ack or BlockAck frame is present in an A-MPDU, it shall be the first MPDU in the A-MPDU; and if one or more Trigger frame is present in an A-MPDU, the one or more Trigger frame shall be the first MPDU of the A-MPDU unless the A-MPDU also carries an Ack or BlockAck frame in which case the one or more Trigger frame is included immediately after the Ack or BlockAck Frame. According to the present disclosure, an A-MPDU comprises an A-MPDU pre-EOF (end-of-frame) padding and an EOF padding, the A-MPDU pre-EOF padding comprises a plurality of A-MPDU subframes. Each of the plurality of A-MPDU subframes like 906 comprises a MPDU Delimiter field, a MPDU field 908 and a Padding field, the MPDU Delimiter field further comprises an EOF field, MPDU Length field, CRC field and Delimiter Signature field. A HARQ applicable A-MPDU 900 may have a format of categorizing the plurality of A-MPDU subframes into two A-MPDU subframe groups 902, 904, in particular A-MPDU subframe group 1 902 containing MPDUs that do not solicit acknowledgement and A-MPDU subframe group 2 904 containing MPDUs that solicit acknowledgement, and the A-MPDU subframe group 1 902 is placed before A-MPDU subframe group 2 904 in order to keep a HARQ applicable A-MPDU format compatible with legacy STAs. In an embodiment, A-MPDU subframe group 1 or 2 may include any A-MPDU subframes with 0 in the MPDU Length field (no MPDU field in the A-MPDU subframe) and 0 in the EOF field inserted in order to meet the minimum MPDU starting spacing requirement.

Figure 10B:
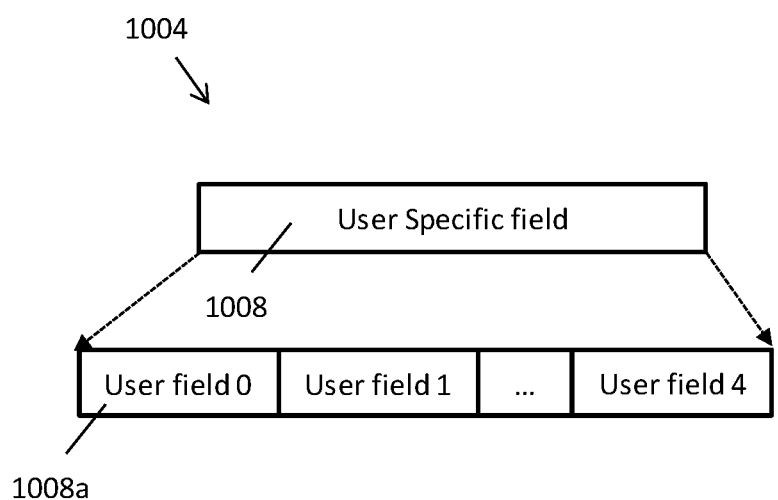
FIG. 10B depicts the EHT-SIG-B field in more detail.

According to the present disclosure, Type 1 HARQ feedback for uplink MU communications may be carried in a NDP such as a MU HARQ Feedback NDP as shown in FIG. 5A. FIG. 10A depicts a first example format of MU HARQ Feedback NDP 1000. The MU HARQ Feedback NDP 1000 has a similar format to EHT MU PPDU but without a Data field and a PE field. The MU HARQ Feedback NDP 1000 includes (or consists of) a L-STF, a L-LTF, a L-SIG field, a FIF, an EHT-SIG-A field 1002, an EHT-SIG-B field 1004, an EHT-STF and an EHT-LTF. The L-STF, L-LTF, L-SIG field, FIF, EHT-SIG-A field 1002 and EHT-SIG-B field 1004 may be grouped as pre-EHT modulated field, having durations of 8 µs, 8 µs, 4 µs, 4 µs, 8 µs, and $N_{SIGB\_SYM} \times 4$ µs respectively, where $N_{SIGB\_SYM}$ is the number of symbols in the EHT-SIG-B field 1004. The duration of the EHT-STF is 4 µs. The EHT-LTF 1006 contains two EHT-LTF symbols with a duration of 32 µs (16 µs per symbol). There is a Format field at the beginning of the EHT-SIG-A field 1002 to indicate an EHT PPDU format, where two of the field values indicate the MU HARQ Feedback NDP and EHT MU PPDU, respectively. The EHT-SIG-A field 1002 may also contain information such as bandwidth and HARQ codebook size (HARQ_CODEBOOK_SIZE). FIG. 10B depicts the EHT-SIG-B field 1004 in more detail. The EHT-SIG-B field 1004 has a similar structure to an EHT MU PPDU, which includes a User Specific field 1008 in each EHT-SIG-B content channel. In the MU HARQ Feedback NDP 1000, each EHT-SIG-B content channel does not include a Common field; and is transmitted with 20 MHz bandwidth (i.e. L=1). The number of EHT-SIG-B content channels in the EHT-SIG-B field depends on bandwidth. A User field like User field 0 1008*a* in the User Specific field 1008 may indicate information such as STA ID, RU tone set index (RU_TONE_SET_INDEX), Starting STS Number (START_STS_NUMBER) and starting code block number. In an embodiment, a User field like User field 0 1008*a* indicating one or more RU tone set of the EHT-LTF 1006 is included in an EHT-SIG-B content channel which is transmitted in a 20 MHz subchannel comprising the one or more RU tone set. This may result in the one or more RU tone set and the corresponding EHT-SIG-B content channel having a similar channel characteristic such that an intended STA which is able to receive the EHT-SIG-B content channel can also receive the corresponding one or more RU tone set.

Figure 10C:
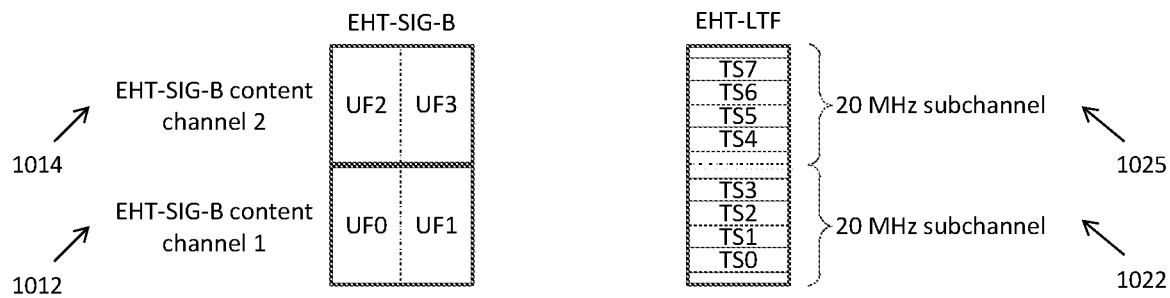
FIG. 10C depicts how user fields in EHT-SIG-B content channels of the EHT-SIG-B field indicate RU (resource unit) tone sets of the EHT-LTF (long training field) in a 40 MHz MU HARQ Feedback NDP according to an embodiment.

FIG. 10C depicts how User fields in EHT-SIG-B content channels of an EHT-SIG-B field indicates RU tone sets of an EHT-LTF of a MU HARQ Feedback NDP in a 40 MHz bandwidth according to an embodiment. The EHT-SIG-B field may comprise a plurality of User fields for example, four User fields (UFs) UF0 to UF3, in the User Specific field, and the EHT-LTF comprises a plurality of RU tone sets (TS) for example eight tone sets TS0 to TS7. Each of the plurality of User fields in the EHT-SIG-B field indicates two of the plurality of RU tone sets in the EHT-LTF. There are two EHT-SIG-B content channels (namely, EHT-SIG-B content channel 1 1012 and EHT-SIG-B content channel 2 1014) which are transmitted in a $1^{st}$ 20 MHz subchannel 1022 and a $2^{nd}$ 20 MHz subchannel 1024, respectively. A User field that indicate two RU tone sets in the $1^{st}$ 20 MHz subchannel 1024 will be included in the EHT-SIG-B content channel 1 1012 which is transmitted in the $1^{st}$ 20 MHz subchannel 1024, for example, UF0 (User Field 0) indicates TS0 and TS2 in the $1^{st}$ 20 MHz subchannel 1022 so the UF0 is included in the EHT-SIG-B content channel 1 1012. Similarly, a User field that indicate two RU tone sets in the $2^{nd}$ 20 MHz subchannel 1024 will be included in the EHT-SIG-B content channel 2 1014 which is transmitted in the $2^{nd}$ 20 MHz subchannel 1024, for example, UF2 indicates TS4 and TS6 in the $2^{nd}$ 20 MHz subchannel 1024 so the UF2 is included in the EHT-SIG-B content channel 2 1014. As such, each User field in the EHT-SIG-B field indicating two RU tone sets of the EHT-LTF will be included in the EHT-SIG-B field content channel which is transmitted in a 20 MHz subchannel comprising the two RU tone sets.

Figure 10D:
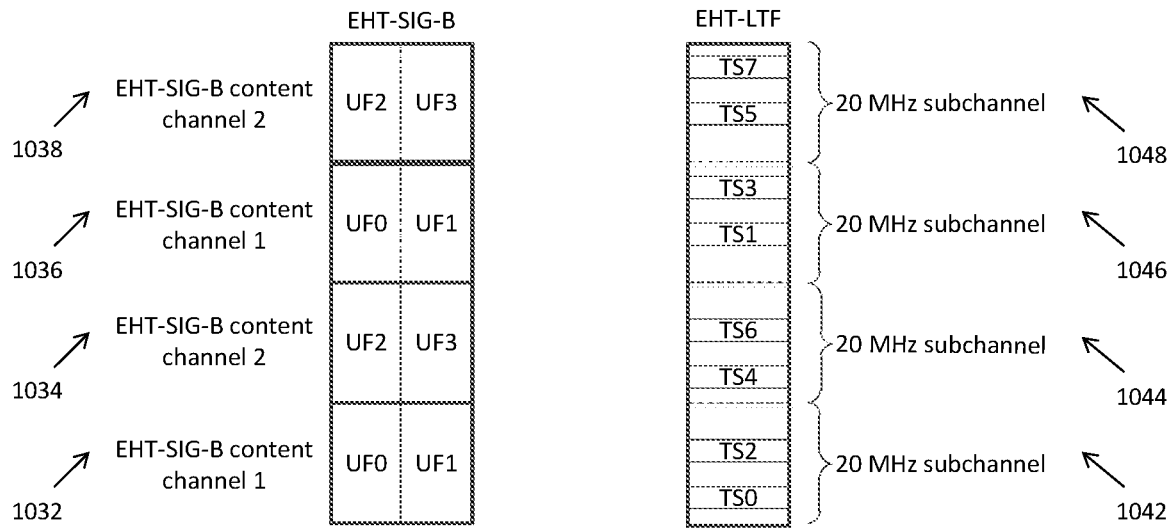
FIG. 10D depicts how user fields in EHT-SIG-B content channels of the EHT-SIG-B field indicate RU tone sets of the EHT-LTF in an 80 MHz MU HARQ Feedback NDP according to an embodiment.

FIG. 10D depicts how User fields in EHT-SIG-B content channels of the EHT-SIG-B field indicates RU tone sets of an EHT-LTF of a MU HARQ Feedback NDP in an 80 MHz bandwidth according to an embodiment. The EHT-SIG-B field may comprise a plurality of User fields for example, four User fields (UFs) UF0 to UF3, in the User Specific field, and the EHT-LTF comprises a plurality of RU tone sets (TS) for example eight tone sets TS0 to TS7. Each of the plurality of User fields in the EHT-SIG-B field indicates two of the plurality of RU tone sets in the EHT-LTF. There are four 20 MHz subchannels 1042, 1044, 1046, 1048, where EHT-SIG-B content channel 1 1032, 1036 is duplicated and transmitted in the $1^{st}$ and $3^{rd}$ 20 MHz subchannels 1042, 1046, respectively, while EHT-SIG-B content 2 1034, 1038 is duplicated and transmitted in the $2^{nd}$ and $4^{th}$ 20 MHz subchannels 1044, 1048, respectively. A User field that indicate two RU tone sets in the $1^{st}$ or $3^{rd}$ 20 MHz subchannel 1042, 1046 will be included in the EHT-SIG-B content channels 1 1032, 1036 which is transmitted in the $1^{st}$ and $3^{rd}$ 20 MHz subchannel 1042, 1046, for example, UF0 (User Field 0) indicates TS0 and TS2 in the 1st 20 MHz subchannel 1042 and UF1 indicates TS1 and TS3 in the 3rd 20 MHz subchannel 1046 so both the UF0 and the UF1 are included in the duplicated EHT-SIG-B content channels 1 1032, 1036. Similarly, a User field that indicate two RU tone sets in the 2nd or 4th 20 MHz subchannel 1044, 1048 will be included in the EHT-SIG-B content channels 2 1034, 1038 which is transmitted in the 2nd and 4th 20 MHz subchannel 1044, 1048, for example, UF2 indicates TS4 and TS6 in the 2nd 20 MHz subchannel 1044 and UF3 indicates TS5 and TS7 in the 4th 20 MHz subchannel 1048 so both the UF2 and the UF3 are included in the duplicated EHT-SIG-B content channels 2 1034, 1038. As such, each User field in the EHT-SIG-B field indicating two RU tone sets of the EHT-LTF will be included in the EHT-SIG-B field content channel which is transmitted in a 20 MHz subchannel comprising the two RU tone sets.

In an embodiment, each intended STA is assigned a tone set for each code block number (CODE_BLOCK_NUMBER), which comprises two tone subsets corresponding to two feedback statuses (FEEDBACK_STATUS "0" or "1"), respectively. The one or more tone set for each intended STA (a user u) can be determined from RU_TONE_SET_INDEX indicated in the User field for the user u in the EHT-SIG-B field of the MU HARQ Feedback NDP according to Tables 1 to 16. In an embodiment, for each code block, FEEDBACK_STATUS is set to "0" or "1" corresponding to two HARQ feedback statuses, positive acknowledgement (ACK) or negative acknowledgement (NACK), respectively. FEEDBACK_STATUS "0", or "ACK", may indicate a successful receipt of the code block by the AP, whereas FEEDBACK_STATUS "1", or "NACK" may indicate incorrectly receiving the code block by the AP. Subsequently, for each CODE_BLOCK_NUMBER of an intended STA, the AP transmits at the tone subset corresponding to the FEEDBACK_STATUS. If "NACK" for a code block is transmitted to the intended STA, the STA may retransmit the code block. In an embodiment, the retransmitted code block may combine with previously transmitted code block in the AP, and the combination may expect a HARQ combining gain suffice for correcting the transmission error.

In another embodiment, each intended STA is assigned a tone set for each code block number (CODE_BLOCK_NUMBER), which comprises two tone subsets corresponding to three feedback statuses, FEEDBACK_STATUS "0", "1" or "2". For each code block, FEEDBACK_STATUS is set to "0", "1" or "2" corresponding to HARQ feedback statuses of "ACK", "Type 1 NACK" or "Type 2 NACK", respectively. FEEDBACK_STATUS "0", or "ACK", may indicate a successful receipt of the code block by the AP; FEEDBACK_STATUS "1", or "Type 1 NACK", may indicate "NACK" for the code block but HARQ combining gain may be expected; FEEDBACK_STATUS "2", or "Type 2 NACK" may indicate "NACK" for the code block but HARQ combining gain may not be expected. HARQ combining gain may not be expected when a performance of decoding the code block in a current transmission is determined to be bad, for instance, according to the total LLR (likelihood ratio) of the code block. Subsequently, for each CODE_BLOCK_NUMBER of an intended STA, under FEEDBACK STATUS is "0" or "1" (ACK or Type 1 NACK), the AP transmits at the tone subset corresponding to the FEEDBACK_STATUS, or else under FEEDBACK_STATUS is "2" (Type 2 NACK), the AP does not transmit at both the tone subsets. If "Type 1 NACK" for the code block is transmitted to the intended STA, the STA may retransmit the code block. In an embodiment, the retransmitted code block may combine with previously transmitted code block in the AP, and the combination may expect HARQ combining gain suffice for correcting the transmission error. If "Type 2 NACK" for the code block is transmitted to the intended STA, the STA may retransmit one or more MPDUs corresponding to the code block to recover the transmission.

Figure 11:
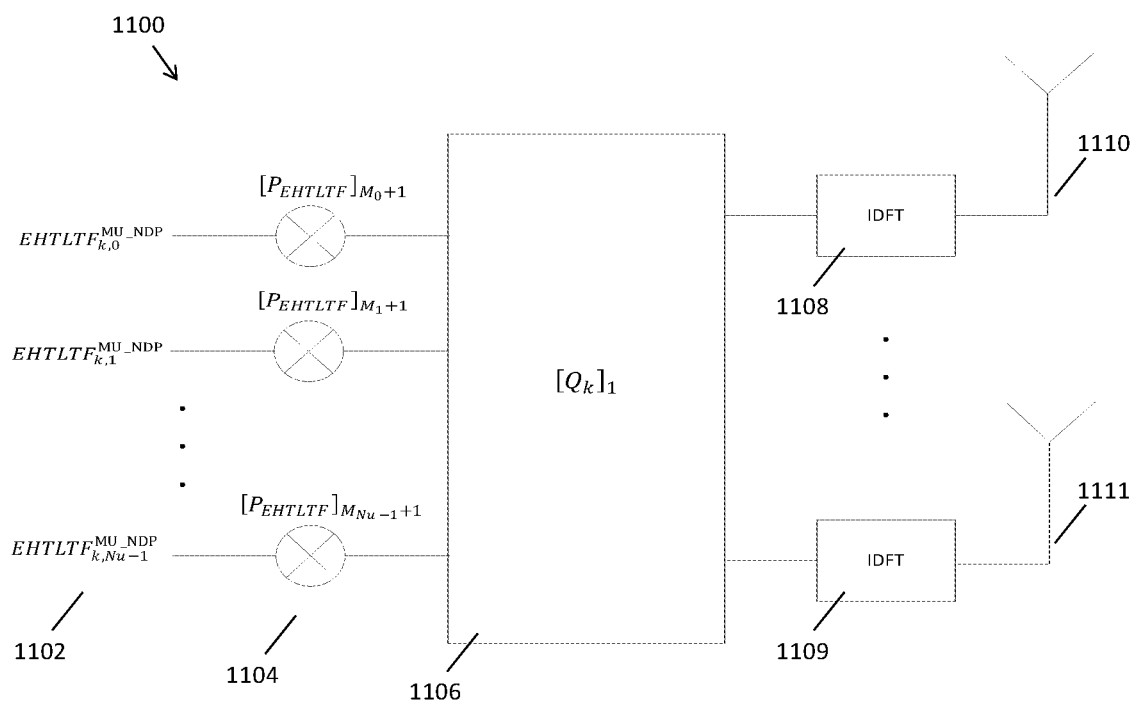
FIG. 11 illustrates generation of the EHT-LTF of a MU HARQ Feedback NDP.

As presented in Tables 1 to 16, a set of EHT-LTF subcarrier indices which are used to carry HARQ feedback information for a code book of a STA, $K_{tone\_NDP_u}$, may depend on the RU_TONE_SET_INDEX of the STA, the FEEDBACK_STATUS of the code block, the CODE_BLOCK_NUMBER of the code block. The CODE_BLOCK_NUMBER of a code block may be determined by subtracting the actual code block number with the starting code block number that is indicated in the User field for user u in the EHT-SIG-B field of the MU HARQ Feedback NDP. FIG. 11 illustrates generation of the EHT-LTF 1100 of a MU HARQ Feedback NDP. Firstly, for each subcarrier k belonging to $K_{tone\_NDP_u}$ for each of code blocks of a user u (u=0, 1, ... $N_u$−1 and $N_u$ is the number of User fields in the EHT-SIG-B field of the MU HARQ Feedback NDP), the corresponding subcarrier value 1102, $EHTLTF_{k,u}^{MU\_NDP}$, is taken from a common EHT-LTF sequence according to Equation 1.

$$EHTLTF_{k,u}^{MU\_NDP} = \begin{cases} EHTLTF_k, & \text{if } k \in K_{tone\_NDP_u} \\ 0, & \text{otherwise} \end{cases} \quad \text{(Equation 1)}$$

where $EHTLTF_k$ is the value of the common EHT-LTF sequence on subcarrier k, which depends on the bandwidth which is indicated in the EHT-SIG-A field of the MU HARQ Feedback NDP.

Secondly, the subcarrier values for all the subcarriers belonging to $K_{tone\_NDP_u}$ for each of code blocks of a user u (u=0, 1, ... $N_u$−1) are mapped to two EHT-LTF symbols using the $(M_u+1)$-th row of $P_{EHTLTF}$ 1104 which is defined in Equation 2.

$$P_{ETHLTF} = \begin{bmatrix} 1 & -1 \\ 1 & 1 \end{bmatrix} \quad \text{(Equation 2)}$$

where $M_u$ is the starting STS number (i.e. STARTING_STS_NUM) of user u indicated in the User field for the user u in the EHT-SIG-B field of the MU HARQ Feedback NDP. For instance, a STARTING_STS_NUM value of 0, corresponds to the 1st row of $P_{EHTLTF}$, which is [1 −1], whereas a STARTING_STS_NUM value of 1, corresponds to the 2nd row of $P_{EHTLTF}$, which is [1 1].

Further, the two EHT-LTF symbols may adopt a subcarrier-specific spatial multiplexing matrix Q 1106 to provide multiple transmission streams to the corresponding transmitters 1110, 1111. Each transmission stream may then adopt an inverse discrete Fourier transform (IDFT) 1108, 1109 and convert from a signal from discrete frequency domain to discrete time domain for transmission.

Figure 12:
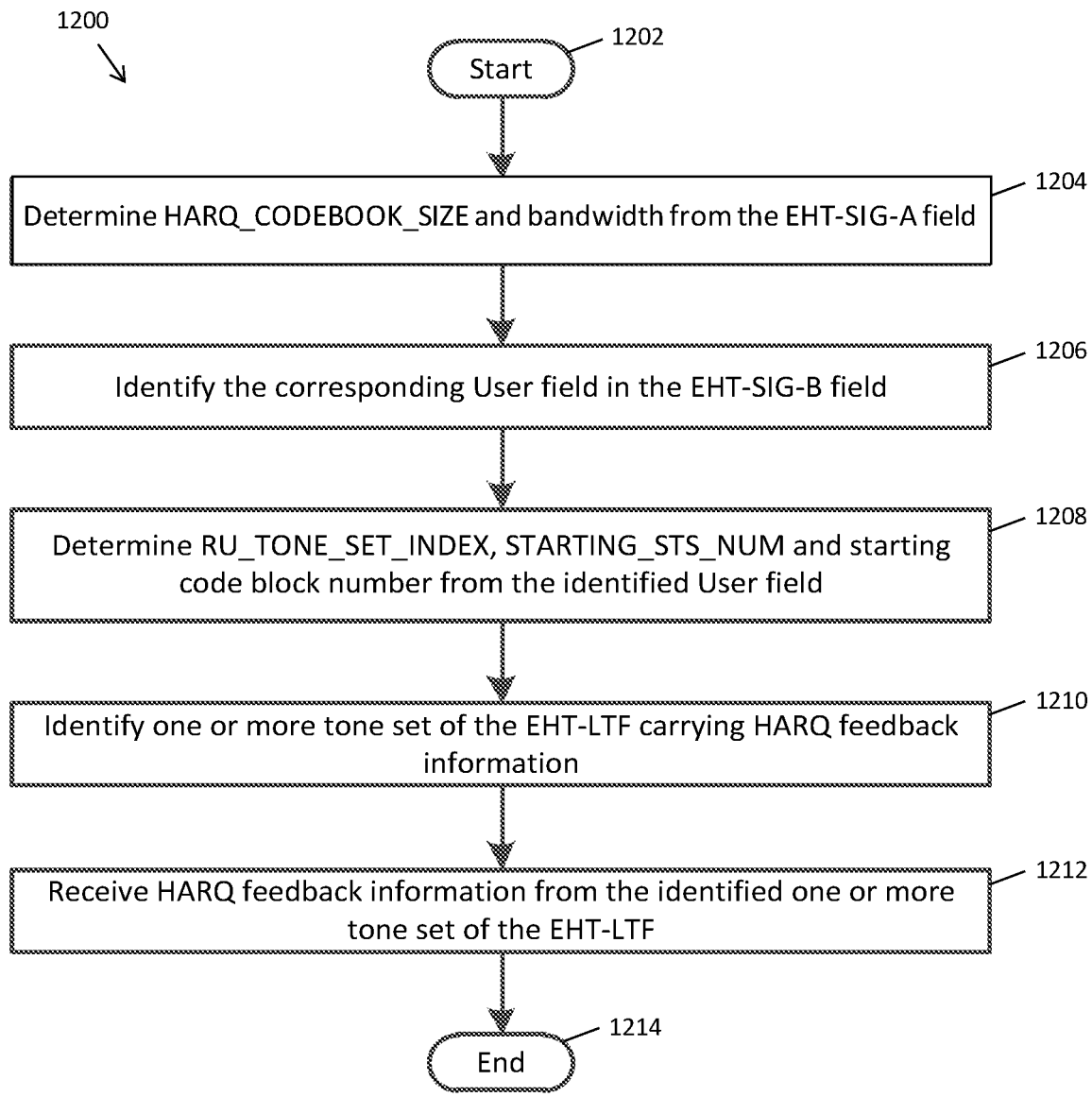
FIG. 12 depicts a flow chart illustrating processing of a received MU HARQ Feedback NDP according an embodiment.

FIG. 12 depicts a flow chart illustrating processing 1200 of a received MU HARQ Feedback NDP 1000 according an embodiment. Processing may start when an intended STA receives a MU HARQ Feedback NDP 1000 at 1202. At 1204, HARQ_CODEBOOK_SIZE and bandwidth is determined from the EHT-SIG-A field 1002. At 1206, the corresponding User field of the intended STA is identified in the EHT-SIG-B field 1004, and at 1208, RU_TONE_SET- _INDEX, STARTING_STS_NUM and starting code block number are determined from the identified User field. At 1210, one or more tone set of the EHT-LTF 1006 carrying HARQ feedback information is identified and at 1212, the intended STA receives HARQ feedback information from the identified one or more tone set of the EHT-LTF 1006, and an EHT TB PPDU may be generated and transmitted from the STA at 1214.

FIG. 13A depicts a second example format of MU HARQ Feedback NDP 1300. The MU HARQ Feedback NDP 1300 can be used as the NDP carrying HARQ Feedback for Type 1 HARQ Feedback shown in FIG. 5A. The MU HARQ Feedback NDP 1300 is similar to the first example MU HARQ Feedback NDP 1000 in FIG. 10A with a Common field included in each EHT-SIG-B content channel in which the information of HARQ codebook size (HARQ_CODEBOOK_SIZE) is indicated in the Common field of the EHT-SIG-B field rather than in the EHT-SIG-A field. The MU HARQ Feedback NDP 1300 has an advantage of having a same EHT-SIG-A format as that of an EHT MU PPDU. Specifically, the MU HARQ Feedback NDP 1300 includes (or consists of) a L-STF, a L-LTF, a L-SIG field, a FIF, an EHT-SIG-A field 1302, an EHT-SIG-B field 1304, an EHT-STF and an EHT-LTF. The L-STF, L-LTF, L-SIG field, FIF, EHT-SIG-A field 1302 and EHT-SIG-B field 1304 may be grouped as pre-EHT modulated field, having durations of 8 µs, 8 µs, 4 µs, 4 µs, 8 µs, and $N_{SIGB\_SYM} \times 4$ µs respectively, where $N_{SIGB\_SYM}$ is the number of symbols in the EHT-SIG-B field 1304. The duration of the EHT-STF is 4 µs. The EHT-LTF 1306 contains two EHT-LTF symbols with a duration of 32 µs (16 µs per symbol). There is a Format field at the beginning of the EHT-SIG-A field 1302 to indicate an EHT PPDU format, where two of the field values indicate the MU HARQ Feedback NDP and EHT MU PPDU, respectively. The EHT-SIG-A field 1002 may contain information such as bandwidth.

Figure 13B:
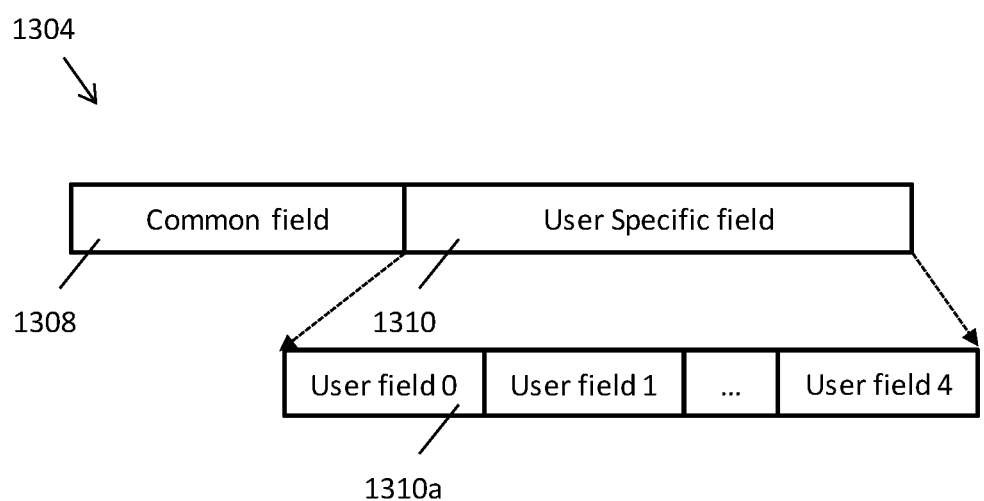
FIG. 13B depicts the EHT-SIG-B field in more detail.

FIG. 13B depicts the EHT-SIG-B field 1304 in more detail. The EHT-SIG-B field 1304 includes a Common field 1308 followed by a User Specific field 1310 which together are referred to as the EHT-SIG-B content channel. Each EHT-SIG-B content channel is transmitted with 20 MHz bandwidth (i.e. L=1). The number of EHT-SIG-B content channel in the EHT-SIG-B field 1304 depends on bandwidth. The Common field 1308 is used to indicate a HARQ codebook size (HARQ_CODEBOOK_SIZE) while a User field like User field 0 1310a in the User-Specific field 1310 may indicate information such STA ID, RU tone set index (RU_TONE_SET_INDEX), starting STS number (STARTING_STS_NUMBER) and starting code block number. In an embodiment, a User field like User field 0 1310a indicating one or more RU tone set of the EHT-LTF 1306 is included in an EHT-SIG-B content channel which is transmitted in a 20 MHz subchannel comprising the one or more RU tone set. This may result in the one or more RU tone set and the corresponding EHT-SIG-B content channel having a similar channel characteristic such that an intended STA which is able to receive the EHT-SIG-B content channel can also receive the corresponding one or more RU tone set.

Figure 14:
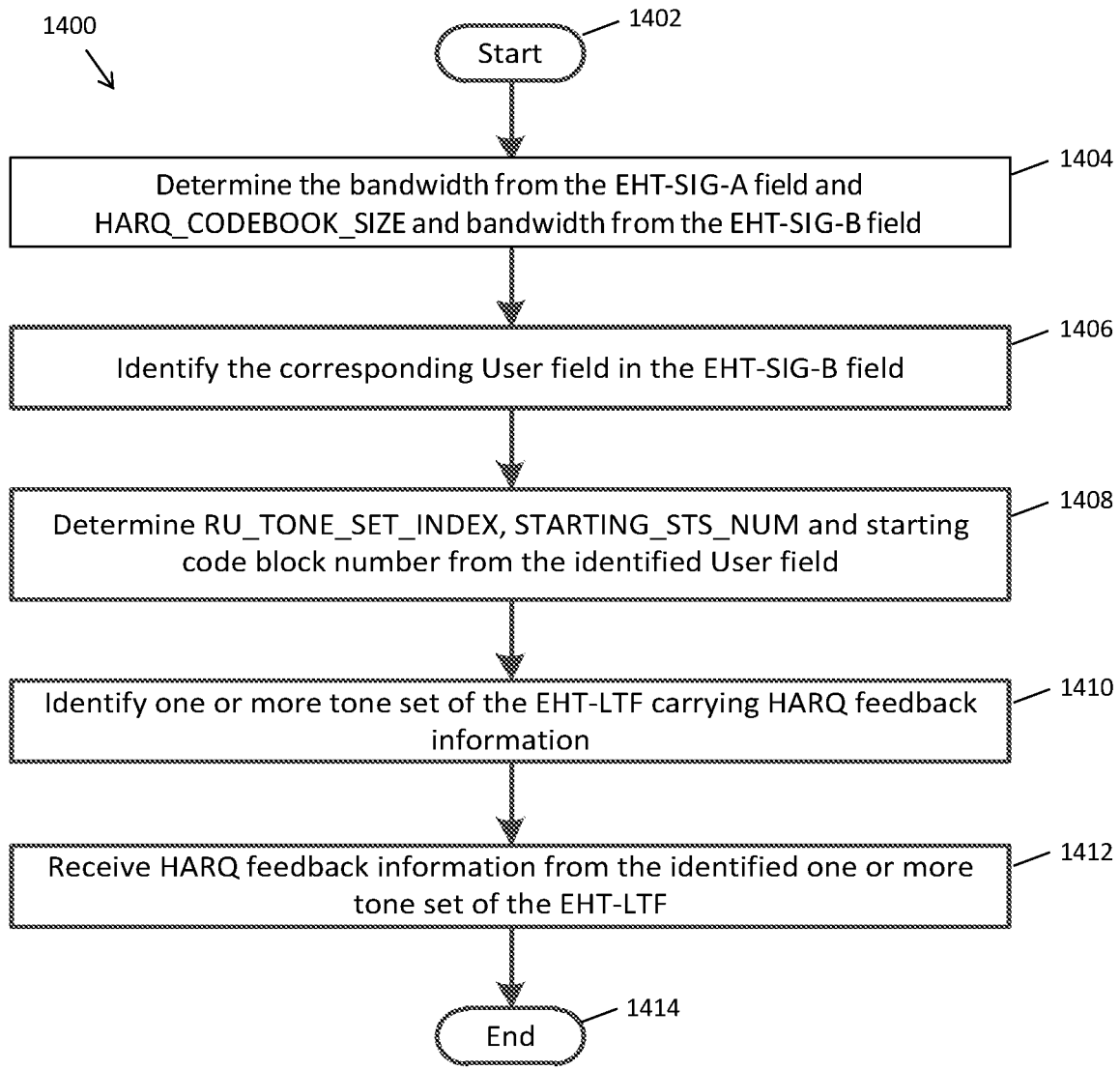
FIG. 14 depicts a flow chart illustrating processing of a received MU HARQ Feedback NDP according to another embodiment.

FIG. 14 depicts a flow chart illustrating processing 1400 of a received MU HARQ Feedback NDP 1300 according to another embodiment. Processing may start when an intended STA receives a MU HARQ Feedback NDP 1300 at 1402. At 1404, the bandwidth and HARQ_CODEBOOK_SIZE are determined from the EHT-SIG-A field 1302 and the Common field 1308 of the EHT-SIG_B field 1304, respectively. At 1406, the corresponding User field of the intended STA is identified in the EHT-SIG-B field 1304, and at 1408, RU_TONE_SET_INDEX, STARTING_STS_NUM and starting code block number are determined from the identified User field. At 1410, one or more tone set of the EHT-LTF 1306 carrying HARQ feedback information is identified and at 1412, the intended STA receives HARQ feedback information from the identified one or more tone set of the EHT-LTF 1306, and an EHT TB PPDU may be generated and transmitted from the STA at 1414.

FIG. 15A depicts a third example format of MU HARQ Feedback NDP 1500. The MU HARQ Feedback NDP can be used as the NDP carrying HARQ Feedback for Type 1 HARQ Feedback shown in FIG. 5A. The MU HARQ Feedback NDP 1500 is similar to the first example MU HARQ Feedback NDP 1000 in FIG. 10A but without the EHT-STF and the EHT-LTF. The MU HARQ Feedback NDP 1500 includes (or consists of) a L-STF, a L-LTF, a L-SIG field, a FIF, an EHT-SIG-A field 1502 and an EHT-SIG-B field 1504, having durations of 8 µs, 8 µs, 4 µs, 4 µs, 8 µs, and $N_{SIGB\_SYM} \times 4$ µs respectively, where $N_{SIGB\_SYM}$ is the number of symbols in the EHT-SIG-B field 1504. There is a format field at the beginning of the EHT-SIG-A field 1502 to indicate an EHT PPDU format, which one of the field value indicates a format of the MU HARQ Feedback NDP. The EHT-SIG-A field 1502 may contain information such as bandwidth. In absence of EHT-LTF to carry HARQ feedback information, the MU HARQ Feedback NDP 1500 carries the HARQ feedback information for each intended STA in a User field like 1508 in the User-Specific field 1506. As a result, this may advantageously lower the channel overhead. With a fixed size of User field, the NDP may only able to handle a limited number of code blocks.

Figure 15B:
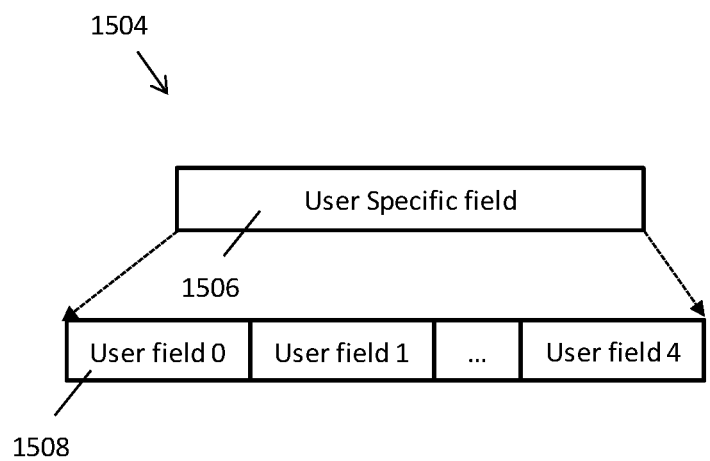
FIG. 15B depicts the EHT-SIG-B field in more detail.

FIG. 15B depicts the EHT-SIG-B field 1504 in more detail. The EHT-SIG-B field 1504 comprises a User Specific field 1506. Each EHT-SIG-B content channel is transmitted with 20 MHz bandwidth (i.e. L=1). The number of EHT-SIG-B content channels in the EHT-SIG-B field depends on bandwidth. A User field like User field 0 1508 may indicate information such STA ID, Starting Code Block Number and HARQ Feedback Bitmap with a fixed size. The fixed size of HARQ Feedback Bitmap may be related to a fixed size of the User field 1508.

Figure 16:
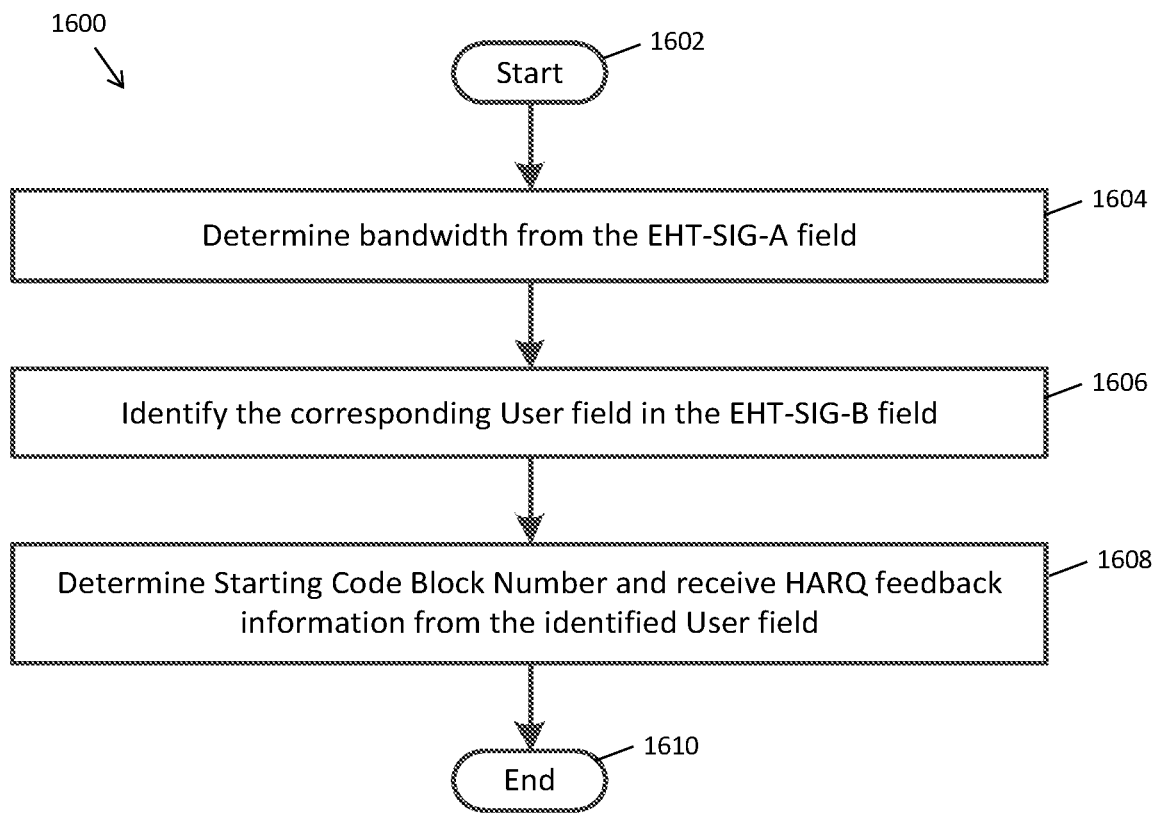
FIG. 16 depicts a flow chart illustrating processing of a received MU HARQ Feedback NDP according to yet another embodiment.

FIG. 16 depicts a flow chart illustrating processing 1600 of a received MU HARQ Feedback NDP 1500 according to yet another embodiment. Processing may start when an intended STA receives a MU HARQ Feedback NDP 1500 at 1602. At 1604, the bandwidth is determined from the EHT-SIG-A field 1502. At 1606, the corresponding User field of the intended STA is identified in the EHT-SIG-B field 1504, and at 1608, Starting Code Block Number is determined and HARQ feedback information is received from the identified User field, and an EHT TB PPDU may be generated and transmitted from the STA at 1610.

According to the present disclosure, a Type 2 HARQ feedback for uplink MU communications may be carried in a MAC frame such as a Multi-STA HARQ BlockAck frame. FIG. 17A depicts an example format of a Multi-STA HARQ BlockAck frame 1700. The Multi-STA HARQ BlockAck frame 1700 is a variant of the existing BlockAck (BA) frame with a value of BA Type (e.g. 12) referring to the Multi-STA HARQ variant. The Multi-STA HARQ BlockAck frame 1700 includes (or consists of) a Frame Control field, a Duration field, a RA field, a TA field, a BA Control field 1702, a BA information field 1704 and a FSC field. The Frame Control field, Duration field, RA field and TA field may be grouped in a MAC header of the Multi-STA HARQ BlockAck frame. The BA Control field 1702, BA Information field 1704 may be grouped in a frame body of the Multi-STA HARQ BlockAck frame. The BA Control field 1702 further comprises a BA Ack Policy subfield, a BA Type subfield, a HARQ Feedback Status subfield 1708, a MAC Feedback Presence subfield 1710 and a TID_INFO subfield. The HARQ Feedback Status subfield 1708 has a bit of either "0" or "1" to indicate two or three HARQ feedback statuses per code block, respectively. In an embodiment where the HARQ Feedback Status subfield is "0", the Multi-STA HARQ BlockAck frame 1700 can indicate two HARQ feedback statuses per code block, "ACK" or "NACK". In another embodiment where the HARQ Feedback Status subfield is "1", the HARQ BlockAck frame 1700 can indicate three HARQ feedback statuses per code block, "ACK", "Type 1 NACK" or "Type 2 NACK". The MAC Feedback Presence subfield 1710 has a bit of "1" to indicate that MPDU based MAC acknowledgement is included, or "0" to indicate otherwise.

Figure 17B:
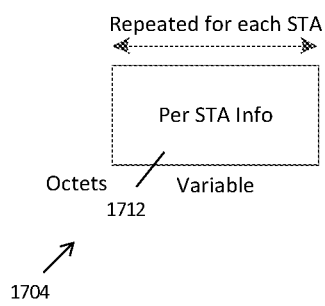
FIGS. 17B and 17C depict the BA Information field in more detail according to various embodiments.
Figure 17C:
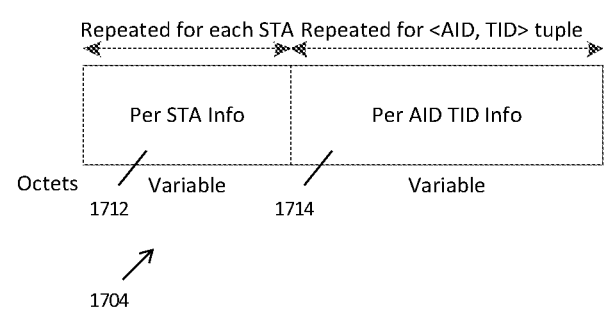

FIGS. 17B and 17C depict the BA Information field 1704 in more detail. Specifically, FIG. 17B depicts the BA Information field 1704 when MPDU based MAC acknowledgement is not included (MAC Feedback Presence subfield 1710=0). The BA Information field 1704 comprises a Per STA Info field 1712 which contains information for code block based HARQ feedback. FIG. 17B depicts the BA information field 1704 when MPDU based MAC acknowledgement is included (MAC Feedback Presence field 1710=1). The BA Information field 1704 comprises the Per STA Info subfield 1712 and a Per AID TID Info field 1714 to contain the MPDU based MAC acknowledgement. The format of the Per AID TID Info field is defined in the draft IEEE P802.11 ax standard.

Figure 17D:
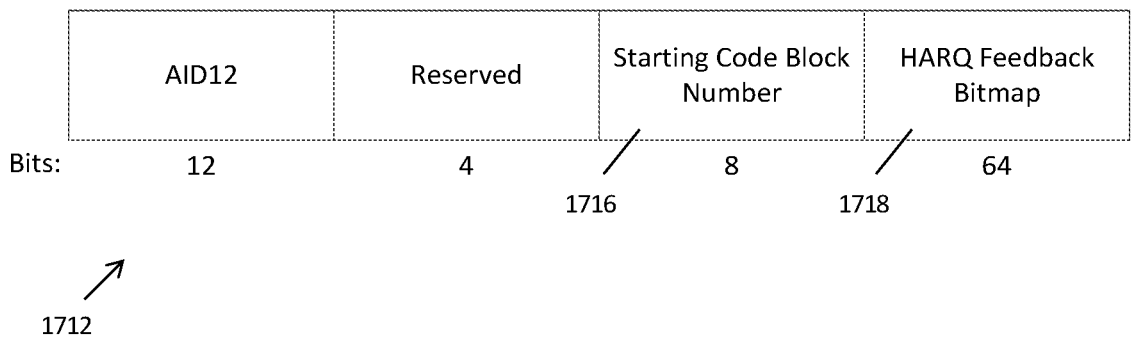
FIGS. 17D and 17E depict the Per STA Info field of the BA Information field in more detail according to various embodiments.
Figure 17E:
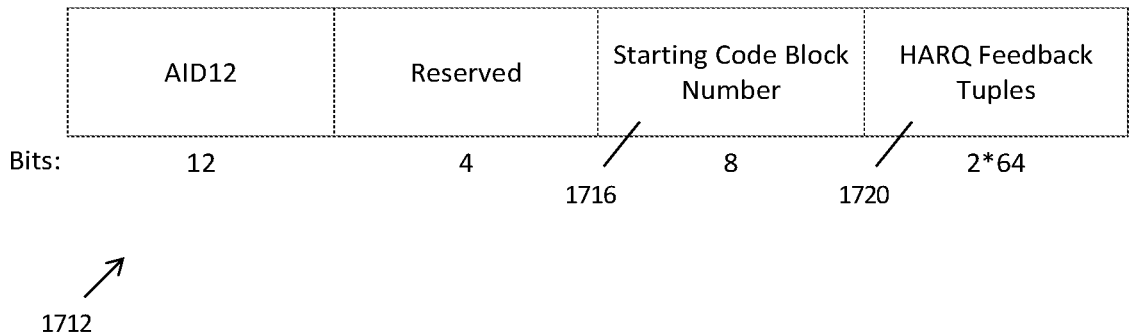

FIGS. 17C and 17D depict the Per STA Info field 1712 of BA Information field 1704 in more detail. Specifically, FIG. 17C depicts the Per STA Info field 1712 when HARQ feedback status per code block is either "ACK" or "NACK" (HARQ Feedback Status field is "1"). The Per STA Info field 1712 comprises an AID12 field which identifies the intended STA, a Starting Code Block Number field and a HARQ Feedback Bitmap field. The HARQ Feedback Bitmap field 1718 is used to indicate the HARQ feedback status of up to 64 entries, where each entry represents a code block. Each bit in the HARQ Feedback Bitmap field 1718 that is equal to 0 or 1 respectively indicates "ACK" or "NACK" for a single code block in the order of code block number, with the first bit corresponding to the code block with the code block number that matches the Starting Code Block Number field 1716. FIG. 17D depicts the Per STA Info field 1712 when HARQ feedback status per code blocks is one of "ACK", "Type 1 NACK" or "Type 2 NACK" (HARQ Feedback Status field is "1"). The Per STA Info field 1712 comprises the AID12 field, the Starting Code Block Number field 1716 and a HARQ Feedback Tuples field 1720. The HARQ Feedback Tuples field 1720 is used to indicate the HARQ feedback status of up to 64 entries, where each entry represents a code block. Each 2-bit field that is equal to 0, 1, or 2 respectively indicate "ACK", "Type 1 NACK" or "Type 2 NACK" for a single code block in the order of code block number, with the first 2-bit field corresponding to the code block with the code block number that matches the Stating Code Block Number field 1716.

Figure 18:
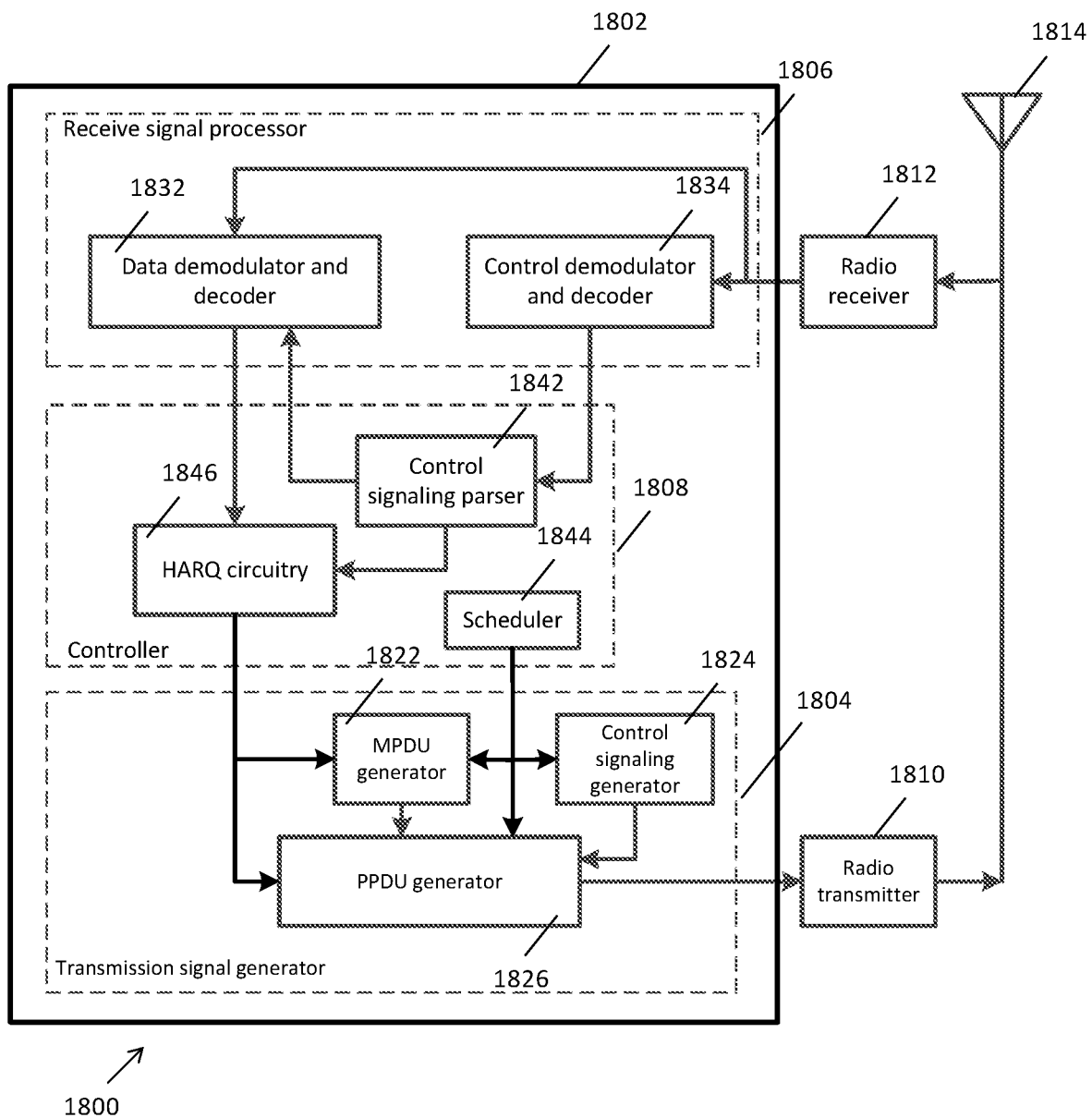
FIG. 18 shows a configuration of a communication apparatus, for example an AP according to various embodiments.

FIG. 18 shows a configuration of a communication apparatus 1800, for example an AP according to various embodiments. Similar to the schematic example of the communication apparatus 300 shown in FIG. 3, the communication apparatus 1800 in the schematic example of FIG. 18 includes circuitry 1802, at least one radio transmitter 1810, at least one radio receiver 1812, at least one antennas 1814 (for the sake of simplicity, only one antenna is depicted in FIG. 18). The circuitry 1802 may include at least one controller 1808 for use in software and hardware aided execution of tasks that the controller 1808 is designed to perform, including HARQ operations. The circuitry 1802 may further include a transmission signal generator 1804 and a receive signal processor 1806. The at least one controller 1808 may control the transmission signal generator 1804 and the receive signal processor 1806. The transmission signal generator 1804 may include an MPDU generator 1822, a control signalling generator 1824, and a PPDU generator 1826. The MPDU generator 1822 may generate MPDUs and A-MPDUs (e.g. data frames, management frames, EHT Basic Trigger frames, Multi-STA HARQ BlockAck frames). The control signalling generator 1824 may generate control signalling fields of PPDUs to be generated (e.g. EHT-SIG-A fields and EHT-SIG-B fields of EHT MU PPDUs or MU HARQ Feedback NDPs). The PPDU generator 1926 may generate PPDUs (e.g. EHT MU PPDUs or MU HARQ Feedback NDPs).

The receive signal processor 1806 may include a data demodulator and decoder 1832, which may demodulate and decode data portions of the received signals (e.g. data fields of EHT TB PPDUs). The receive signal processor 1806 may further include a control demodulator and decoder 1834, which may demodulate and decode control signalling portions of the received signals (e.g. EHT-SIG-A fields of EHT TB PPDUs).

The at least one controller 1808 may include a control signal parser 1842, a scheduler 1844 and a HARQ circuitry 1846. In MU communications, the scheduler 1844 may determine RU information and user-specific allocation information for allocations of downlink MU transmissions and trigger information for allocations of uplink MU transmissions. The control signal parser 1842 may analyse the control signalling portions of the received signals and the trigger information for allocations of uplink MU transmissions shared by the scheduler 1844 and assist the data demodulator and decoder 1832 in demodulating and decoding the data portions of the received signals. The HARQ circuitry 1846 control HARQ operations. For example, the HARQ circuitry 1846 provides control signalling for HARQ initial transmissions and retransmissions, determines HARQ feedback information for code blocks based on the results provided by the data demodulator decoder 1822, and assists the MPDU generator 1822 in generating MPDUs and A-MPDUs (e.g. EHT Basic Trigger frames, or Multi-STA HARQ BlockAck frames), or assists the PPDU generator 1834 in generating NDPs carrying HARQ feedback information (e.g. MU HARQ Feedback NDPs).

Figure 19:
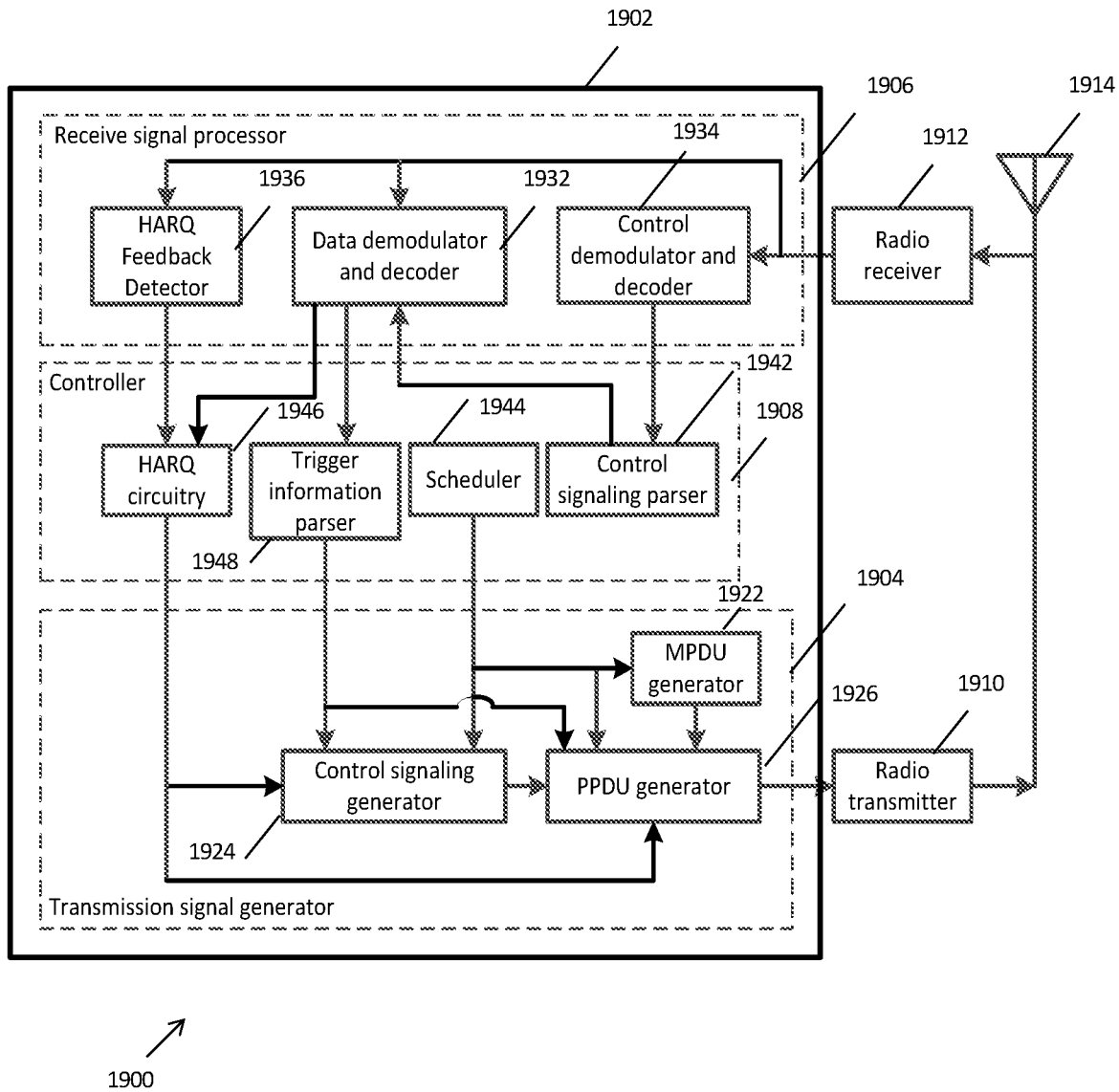
FIG. 19 shows a configuration of a communication apparatus, for example a STA according to various embodiments.

FIG. 19 shows a configuration of a communication apparatus 1900, for example a STA according to various embodiments. Similar to the schematic example of the communication apparatus 300 shown in FIG. 3, the communication apparatus 1900 in the schematic example of FIG. 19 includes circuitry 1902, at least one radio transmitter 1910, at least one radio receiver 1912, at least one antennas 1914 (for the sake of simplicity, only one antenna is depicted in FIG. 19). The circuitry 1902 may include at least one controller 1908 for use in software and hardware aided execution of tasks that the controller 1908 is designed to perform, including HARQ operations. The circuitry 1902 may further include a transmission signal generator 1904 and a receive signal processor 1906. The at least one controller 1908 may control the transmission signal generator 1904 and the receive signal processor 1906. The transmission signal generator 1904 may include an MPDU generator 1922, a control signalling generator 1924, and a PPDU generator 1926. The MPDU generator 1922 may generate MPDUs and A-MPDUs (e.g. data frames, management frames). The control signalling generator 1924 may generate control signalling fields of PPDUs to be generated (e.g. EHT-SIG-A fields of EHT TB PPDUs). The PPDU generator 1926 may generate PPDUs (e.g. EHT TB PPDUs).

The receive signal processor 1906 may include a data demodulator and decoder 1932, which may demodulate and decode data portions of the received signals (e.g. data fields of EHT MU PPDUs). The receive signal processor 1906 may further include a control demodulator and decoder 1934, which may demodulate and decode control signalling portions of the received signals (e.g. EHT-SIG-A fields and EHT-SIG-B fields of EHT MU PPDUs or MU HARQ Feedback NDPs). The receive signal processor 1906 may include a HARQ Feedback Detector 1936, which may detect HARQ feedback information for code blocks of the STA from an AP, for example from EHT-LTFs of the received MU HARQ Feedback NDPs.

The at least one controller 1908 may include a control signal parser 1942, a scheduler 1944, a HARQ circuitry 1946 and a trigger information parser 1948. The control signal parser 1942 may analyse the control signalling portions of the received signals and assist the data demodulator and decoder 1932 in demodulating and decoding the data portions of the received signals. The trigger information parser 1948 may analyse the trigger information for its own uplink allocations from the received Trigger frames (e.g. EHT Basic Trigger frame) in MU communications. The HARQ circuitry 1946 control HARQ operations. For example, based on the HARQ feedback provided by the data demodulator and decoder 1932 or the HARQ Feedback Detector 1936, the HARQ circuitry 1946 determines code blocks to be retransmitted to AP and assists the control signalling generator 1924 in generating control signalling fields of PPDUs (e.g. EHT-SIG-A fields of EHT TB PPDUs) and the PPDU generator 1926 in generating PPDUs (e.g. EHT TB PPDUs) for HARQ retransmission.

As described above, the embodiments of the present disclosure provide an advanced communication system, communication methods and communication apparatuses that enable HARQ operation in extremely high throughput WLAN networks.

The present disclosure can be realized by software, hardware, or software in cooperation with hardware. Each functional block used in the description of each embodiment described above can be partly or entirely realized by an LSI such as an integrated circuit, and each process described in each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus.

The communication apparatus may comprise a transceiver and processing/control circuitry. The transceiver may comprise and/or function as a receiver and a transmitter. The transceiver, as the transmitter and receiver, may include an RF (radio frequency) module including amplifiers, RF modulators/demodulators and the like, and one or more antennas.

Some non-limiting examples of such a communication apparatus include a phone (e.g. cellular (cell) phone, smart phone), a tablet, a personal computer (PC) (e.g. laptop, desktop, netbook), a camera (e.g. digital still/video camera), a digital player (digital audio/video player), a wearable device (e.g. wearable camera, smart watch, tracking device), a game console, a digital book reader, a telehealth/telemedicine (remote health and medicine) device, and a vehicle providing communication functionality (e.g. automotive, airplane, ship), and various combinations thereof.

The communication apparatus is not limited to be portable or movable, and may also include any kind of apparatus, device or system being non-portable or stationary, such as a smart home device (e.g. an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

Various embodiments according to the present disclosure may provide:

1. A communication apparatus comprising: circuitry, which, in operation, generates a first trigger frame that includes one or more user information fields, and a transmitter, which, in operation, transmits the generated trigger frame; wherein each of the one or more user information fields indicates one of more than one hybrid automatic repeat request (HARQ) feedback types.

2. The communication apparatus of embodiment 1, wherein one of more than one HARQ feedback types indicates that HARQ feedback information for a HARQ initial transmission is carried in a second trigger frame soliciting a HARQ retransmission; and the first trigger frame and the second trigger frame are transmitted in a same transmission opportunity (TXOP).

3. The communication apparatus of embodiment 1, wherein one of more than one HARQ feedback types indicates that HARQ feedback information for a HARQ initial transmission is carried in a second trigger frame soliciting a HARQ retransmission; and the first trigger frame and the second trigger frame are transmitted in different TXOPs.

4. The communication apparatus of embodiment 1, wherein one of more than one HARQ feedback types that indicates HARQ feedback information is carried in a null data packet (NDP).

5. The communication apparatus of embodiment 4, wherein the NDP includes a signal field and a Long Training Field (LTF), the signal field comprising a plurality of user fields and the LTF comprising a plurality of tone sets; and the HARQ feedback information is carried in the LTF of the NDP.

6. The communication apparatus of embodiment 5, wherein one of the plurality user fields of the signal field indicating one or more of the plurality of tone sets of the LTF is included in a signal field content channel which is transmitted in a 20 MHz subchannel comprising the one or more of the plurality of tone sets.

7. The communication apparatus of embodiment 4, wherein the NDP includes a signal field but does not include a LTF field; and the HARQ feedback information is carried in the signal field of the NDP.

8. A communication apparatus comprising: a receiver, which, in operation, receives a first trigger frame that includes one or more user information fields; circuitry, which, in operation, generates a trigger-based PPDU (physical layer protocol data unit) based on information of the received first trigger frame; and a transmitter, which, in operation, transmits the generated trigger-based PPDU; wherein each of the one or more user information fields indicates one of more than one HARQ feedback types.

9. The communication apparatus of embodiment 8, wherein one of more than one HARQ feedback types indicates that HARQ feedback information for a HARQ initial transmission is carried in a second trigger frame soliciting a HARQ retransmission; and the first trigger frame and the second trigger frame are transmitted in a same transmission opportunity (TXOP).

10. The communication apparatus of embodiment 8, wherein one of more than one HARQ feedback type indicates that HARQ feedback information for a HARQ initial transmission is carried in a second trigger frame soliciting a HARQ retransmission; and the first trigger frame and the second trigger frame are transmitted in different TXOPs.

11. The communication apparatus of embodiment 8, wherein one of more than one HARQ feedback type indicates that HARQ feedback information is carried in a null data packet (NDP).

12. The communication apparatus of embodiment 11, wherein the NDP includes a signal field and a Long Training Field (LTF), the signal field comprising a plurality of user fields and the LTF comprising a plurality of tone sets; and the HARQ feedback information is carried in the LTF of the NDP.

13. The communication apparatus of embodiment 12, wherein one of the plurality of user fields of the signal field indicating one or more of the plurality of tone sets of the LTF is included in a signal field content channel which is transmitted in a 20 MHz subchannel comprising the one or more of the plurality of tone sets.

14. The communication apparatus of embodiment 11, wherein the NDP includes a signal field but does not include a LTF; and the HARQ feedback information is carried in the signal field of the NDP.

15. A communication method comprising: generating a first trigger frame that includes one or more user information fields, and transmitting the generated trigger frame; wherein each of the one or more user information fields indicates one of more than one hybrid automatic repeat request (HARQ) feedback types.

16. The communication method of embodiment 15, wherein one of more than one HARQ feedback types indicates HARQ feedback information for a HARQ initial transmission is carried in a second trigger frame soliciting a HARQ retransmission; and the first trigger frame and the second trigger frame are transmitted in a same transmission opportunity (TXOP).

17. The communication method of embodiment 15, wherein one of more than one HARQ feedback types indicates HARQ feedback information for a HARQ initial transmission is carried in a second trigger frame soliciting a HARQ retransmission; and the first trigger frame and the second trigger frame are transmitted in different TXOPs.

18. The communication method of embodiment 15, further comprising generating a null data packet (NDP), wherein one of more than one HARQ feedback types indicates HARQ feedback information is carried in the NDP.

19. The communication method of embodiment 18, wherein the NDP includes a signal field and a Long Training Field (LTF), the signal field comprising a plurality of user fields and the LTF comprising a plurality of tone sets; and the HARQ feedback information is carried in the LTF of the NDP.

20. The communication method of embodiment 19, wherein one of the plurality of user fields of the signal field indicating one or more of the plurality of tone sets of the LTF is included in a signal field content channel which is transmitted in a 20 MHz subchannel comprising the one or more of the plurality of tone sets.

21. The communication method of embodiment 18, wherein the NDP includes a signal field but does not include a LTF field; and the HARQ feedback information is carried in the signal field of the NDP.

22. A communication method comprising: receiving a first trigger frame that includes one or more user information fields; wherein each of the one or more user information fields indicates one of more than one HARQ feedback types.

23. The communication method of embodiment 8, wherein one of more than one HARQ feedback types indicates HARQ feedback information for a HARQ initial transmission is carried in a second trigger frame soliciting a HARQ retransmission; and the first trigger frame and the second trigger frame are transmitted in a same transmission opportunity (TXOP).

24. The communication method of embodiment 22, wherein one of more than one HARQ feedback types indicates HARQ feedback information for a HARQ initial transmission is carried in a second trigger frame soliciting a HARQ retransmission; and the first trigger frame and the second trigger frame are transmitted in different TXOPs.

25. The communication method of embodiment 22, further comprising receiving a null data packet (NDP), wherein one of more than one HARQ feedback types indicates HARQ feedback information is carried in the NDP.

26. The communication method of embodiment 25, wherein the NDP includes a signal field and a Long Training Field (LTF), the signal field comprising a plurality of user fields and the LTF comprising a plurality of tone sets; and the HARQ feedback information is carried in the LTF of the NDP.

27. The communication method of embodiment 26, wherein one of the plurality of user fields of the signal field indicating one or more of the plurality of tone sets of the LTF is included in a signal field content channel which is transmitted in a 20 MHz subchannel comprising the one or more of the plurality of tone sets.

28. The communication method of embodiment 25, wherein the NDP includes a signal field but does not include a LTF; and the HARQ feedback information is carried in the signal field of the NDP.

TABLE 1

EHT-LTF subcarrier mapping for the MU HARQ Feedback NDP when HARQ_CODEBOOK_SIZE is 1 and Code_Block_Number is 0.

| RU_TONE_SET_INDEX | 80 MHz | | 40 MHz | | 20 MHz | | CODE_BLOCK_NUMBER is 0 |
|---|---|---|---|---|---|---|---|
| | $K_{tone\_NDPu}$ if FEEDBACK_STATUS is 1 | $K_{tone\_NDPu}$ if FEEDBACK_STATUS is 0 | $K_{tone\_NDPu}$ if FEEDBACK_STATUS is 1 | $K_{tone\_NDPu}$ if FEEDBACK_STATUS is 0 | $K_{tone\_NDPu}$ if FEEDBACK_STATUS is 1 | $K_{tone\_NDPu}$ if FEEDBACK_STATUS is 0 | |
| 1 | Use 20 MHz FEEDBACK_STATUS = 1 Subcarrier Indices − 128 | Use 20 MHz FEEDBACK_STATUS = 0 Subcarrier Indices − 384 | Use 20 MHz FEEDBACK_STATUS = 1 Subcarrier Indices − 128 | Use 20 MHz FEEDBACK_STATUS = 0 Subcarrier Indices − 128 | −113, −77, −41, 6, 42, 78 | −112, −76, −40, 7, 43, 79 | |
| 2 | | | | | −111, −75, −39, 8, 44, 80 | −110, −74, −38, 9, 45, 81 | |
| 3 | | | | | −109, −73, −37, 10, 46, 82 | −108, −72, −36, 11, 47, 83 | |
| 4 | | | | | −107, −71, −35, 12, 48, 84 | −106, −70, −34, 13, 49, 85 | |
| 5 | | | | | −105, −69, −33, 14, 50, 86 | −104, −68, −32, 15, 51, 87 | |
| 6 | | | | | −103, −67, −31, 16, 52, 88 | −102, −66, −30, 17, 53, 89 | |
| 7 | | | | | −101, −65, −29, 18, 54, 90 | −100, −64, −28, 19, 55, 91 | |
| 8 | | | | | −99, −63, −27, 20, 56, 92 | −98, −62, −26, 21, 57, 93 | |
| 9 | | | | | −97, −61, −25, 22, 58, 94 | −96, −60, −24, 23, 59, 95 | |
| 10 | | | | | −95, −59, −23, 24, 60, 96 | −94, −58, −22, 25, 61, 97 | |
| 11 | | | | | −93, −57, −21, 26, 62, 98 | −92, −56, −20, 27, 63, 99 | |
| 12 | | | | | −91, −55, −19, 28, 64, 100 | −90, −54, −18, 29, 65, 101 | |
| 13 | | | | | −89, −53, −17, 30, 66, 102 | −88, −52, −16, 31, 67, 103 | |
| 14 | | | | | −87, −51, −15, 32, 68, 104 | −86, −50, −14, 33, 69, 105 | |
| 15 | | | | | −85, −49, −13, 34, 70, 106 | −84, −48, −12, 35, 71, 107 | |
| 16 | | | | | −83, −47, −11, 36, 72, 108 | −82, −46, −10, 37, 73, 109 | |
| 17 | | | | | −81, −45, −9, 38, 74, 110 | −80, −44, −8, 39, 75, 111 | |
| 18 | | | | | −79, −43, −7, 40, 76, 112 | −78, −42, −6, 41, 77, 113 | |
| 19-36 | Use 20 MHz FEEDBACK_STATUS = 1 Subcarrier Indices + 128 | Use 20 MHz FEEDBACK_STATUS = 0 Subcarrier Indices − 128 | Use 20 MHz FEEDBACK_STATUS = 1 Subcarrier Indices + 128 | Use 20 MHz FEEDBACK_STATUS = 0 Subcarrier Indices + 128 | | | |
| 37-54 | Use 20 MHz FEEDBACK_STATUS = 1 Subcarrier Indices − 128 | Use 20 MHz FEEDBACK_STATUS = 0 Subcarrier Indices + 128 | | | | | |
| 55-72 | Use 20 MHz FEEDBACK_STATUS = 1 Subcarrier Indices + 384 | Use 20 MHz FEEDBACK_STATUS = 0 Subcarrier Indices + 384 | | | | | |

NOTE 1: The RU_TONE_SET_INDEX definition for the lower and upper 80 MHz shall use the 80 MHz RU_TONE_SET_INDEX definition for the lower and upper 80 MHz and the RU_TONE_SET_INDEX values 1-72 are mapped to the lower 80 MHz and the RU_TONE_SET_INDEX values 73-144 are mapped to the upper 80 MHz.

NOTE 2: The RU_TONE_SET_INDEX definition for 80 + 160 MHz, 80 + 80 + 80 MHz and 160 + 80 MHz shall use the 80 MHz RU_TONE_SET_INDEX definition for the lower, middle and upper 80 MHz. The RU_TONE_SET_INDEX values 1-72 are mapped to the lower 80 MHz, the RU_TONE_SET_INDEX values 73-144 are mapped to the middle 80 MHz; and the RU_TONE_SET_INDEX values 145-216 are mapped to the upper 80 MHz.

NOTE 3: The RU_TONE_SET_INDEX definition for the lower and upper 160 MHz and 320 MHz shall use the 160 MHz RU_TONE_SET_INDEX definition for the lower and upper 160 MHz. The RU_TONE_SET_INDEX values 1-144 are mapped to the lower 160 MHz and the RU_TONE_SET_INDEX values 145-288 are mapped to the upper 160 MHz.

TABLE 2

EHT-LTF subcarrier mapping for the MU HARQ Feedback NDP when HARQ_CODEBOOK_SIZE is 2 and Code_Block_Number is 0.

| RU_TONE_SET_INDEX | 80 MHz | | 40 MHz | | 20 MHz |
|---|---|---|---|---|---|
| | $K_{tone\_NDPu}$ if FEEDBACK_STATUS is 1 | $K_{tone\_NDPu}$ if FEEDBACK_STATUS is 0 | $K_{tone\_NDPu}$ if FEEDBACK_STATUS is 1 | $K_{tone\_NDPu}$ if FEEDBACK_STATUS is 0 | $K_{tone\_NDPu}$ if FEEDBACK_STATUS is 1 |
| 1 | Use 20 MHz FEEDBACK_STATUS = 1 Subcarrier Indices − 384 | Use 20 MHz FEEDBACK_STATUS = 0 Subcarrier Indices − 384 | Use 20 MHz FEEDBACK_STATUS = 1 Subcarrier Indices − 128 | Use 20 MHz FEEDBACK_STATUS = 0 Subcarrier Indices − 128 | −113, −77, −41, 6, 42, 78 |
| 2 | | | | | −111, −75, −39, 8, 44, 80 |
| 3 | | | | | −109, −73, −37, 10, 46, 82 |
| 4 | | | | | −107, −71, −35, 12, 48, 84 |
| 5 | | | | | −105, −69, −33, 14, 50, 86 |
| 6 | | | | | −103, −67, −31, 16, 52, 88 |
| 7 | | | | | −101, −65, −29, 18, 54, 90 |
| 8 | | | | | −99, −63, −27, 20, 56, 92 |
| 9 | | | | | −97, −61, −25, 22, 58, 94 |
| 10-18 | Use 20 MHz FEEDBACK_STATUS = 1 Subcarrier Indices − 128 | Use 20 MHz FEEDBACK_STATUS = 0 Subcarrier Indices − 128 | Use 20 MHz FEEDBACK_STATUS = 1 Subcarrier Indices + 128 | Use 20 MHz FEEDBACK_STATUS = 0 Subcarrier Indices + 128 | |
| 19-27 | Use 20 MHz FEEDBACK_STATUS = 1 Subcarrier Indices + 128 | Use 20 MHz FEEDBACK_STATUS = 0 Subcarrier Indices + 128 | | | |
| 28-36 | Use 20 MHz FEEDBACK_STATUS = 1 Subcarrier Indices + 384 | Use 20 MHz FEEDBACK_STATUS = 0 Subcarrier Indices + 384 | | | |

| RU_TONE_SET_INDEX | 20 MHz $K_{tone\_NDPu}$ if FEEDBACK_STATUS is 0 | |
|---|---|---|
| 1 | −112, −76, −40, 7, 43, 79 | if CODE_BLOCK_NUMBER is 0 |
| 2 | −110, −74, −38, 9, 45, 81 | |
| 3 | −108, −72, −36, 11, 47, 83 | |
| 4 | −106, −70, −34, 13, 49, 85 | |
| 5 | −104, −68, −32, 15, 51, 87 | |
| 6 | −102, −66, −30, 17, 53, 89 | |
| 7 | −100, −64, −28, 19, 55, 91 | |
| 8 | −98, −62, −26, 21, 57, 93 | |
| 9 | −96, −60, −24, 23, 59, 95 | |
| 10-18 | | |
| 19-27 | | |
| 28-36 | | |

NOTE 1:
The RU_TONE_SET_INDEX for 80 + 80 MHz and 160 MHz shall use the 80 MHz RU_TONE_SET_INDEX definition for the lower and upper 80 MHz. The RU_TONE_SET_INDEX values 1-36 are mapped to the lower 80 MHz and the RU_TONE_SET_INDEX values 37-72 are mapped to the upper 80 MHz.

NOTE 2:
The RU_TONE_SET_INDEX for 80 + 160 MHz, 80 + 80 + 80 MHz and 160 + 80 MHz shall use the 80 MHz RU_TONE_SET_INDEX definition for the lower, middle and upper 80 MHz. The RU_TONE_SET_INDEX values 1-36 are mapped to the lower 80 MHz, the RU_TONE_SET_INDEX values 37-72 are mapped to the middle 80 MHz; and the RU_TONE_SET_INDEX values 73-108 are mapped to the upper 80 MHz.

NOTE 3:
The RU_TONE_SET_INDEX for 160 + 160 MHz and 320 MHz shall use the 160 MHz RU_TONE_SET_INDEX definition for the lower and upper 160 MHz. The RU_TONE_SET_INDEX values 1-72 are mapped to the lower 160 MHz and the RU_TONE_SET_INDEX values 73-144 are mapped to the upper 160 MHz.

TABLE 3

EHT-LTF subcarrier mapping for the MU HARQ Feedback NDP when HARQ_CODEBOOK_SIZE is 2 and Code_Block_Number is 1.

| RU_TONE_SET_INDEX | 80 MHz $K_{tone\_NDPu}$ if FEEDBACK_STATUS is 1 | 80 MHz $K_{tone\_NDPu}$ if FEEDBACK_STATUS is 0 | 40 MHz $K_{tone\_NDPu}$ if FEEDBACK_STATUS is 1 | 40 MHz $K_{tone\_NDPu}$ if FEEDBACK_STATUS is 0 | 20 MHz $K_{tone\_NDPu}$ if FEEDBACK_STATUS is 1 |
|---|---|---|---|---|---|
| 1 | Use 20 MHz FEEDBACK_STATUS = 1 Subcarrier Indices − 384 | Use 20 MHz FEEDBACK_STATUS = 0 Subcarrier Indices − 384 | Use 20 MHz FEEDBACK_STATUS = 1 Subcarrier Indices − 128 | Use 20 MHz FEEDBACK_STATUS = 0 Subcarrier Indices − 128 | −95, −59, −23, 24, 60, 96 |
| 2 | | | | | −93, −57, −21, 26, 62, 98 |
| 3 | | | | | −91, −55, −19, 28, 64, 100 |
| 4 | | | | | −89, −53, −17, 30, 66, 102 |
| 5 | | | | | −87, −51, −15, 32, 68, 104 |
| 6 | | | | | −85, −49, −13, 34, 70, 106 |
| 7 | | | | | −83, −47, −11, 36, 72, 108 |
| 8 | | | | | −81, −45, −9, 38, 74, 110 |
| 9 | | | | | −79, −43, −7, 40, 76, 112 |
| 10-18 | Use 20 MHz FEEDBACK_STATUS = 1 Subcarrier Indices − 128 | Use 20 MHz FEEDBACK_STATUS = 0 Subcarrier Indices − 128 | Use 20 MHz FEEDBACK_STATUS = 1 Subcarrier Indices + 128 | Use 20 MHz FEEDBACK_STATUS = 0 Subcarrier Indices + 128 | |
| 19-27 | Use 20 MHz FEEDBACK_STATUS = 1 Subcarrier Indices + 128 | Use 20 MHz FEEDBACK_STATUS = 0 Subcarrier Indices + 128 | | | |
| 28-36 | Use 20 MHz FEEDBACK_STATUS = 1 Subcarrier Indices + 384 | Use 20 MHz FEEDBACK_STATUS = 0 Subcarrier Indices + 384 | | | |

| RU_TONE_SET_INDEX | 20 MHz $K_{tone\_NDPu}$ if FEEDBACK_STATUS is 0 | |
|---|---|---|
| 1 | −94, −58, −22, 25, 61, 97 | if CODE_BLOCK_NUMBER is 1 |
| 2 | −92, −56, −20, 27, 63, 99 | |
| 3 | −90, −54, −18, 29, 65, 101 | |
| 4 | −88, −52, −16, 31, 67, 103 | |
| 5 | −86, −50, −14, 33, 69, 105 | |
| 6 | −84, −48, −12, 35, 71, 107 | |
| 7 | −82, −46, −10, 37, 73, 109 | |
| 8 | −80, −44, −8, 39, 75, 111 | |
| 9 | −78, −42, −6, 41, 77, 113 | |
| 10-18 | | |
| 19-27 | | |
| 28-36 | | |

NOTE 1:
The RU_TONE_SET_INDEX for 80 + 80 MHz and 160 MHz shall use the 80 MHz RU_TONE_SET_INDEX definition for the lower and upper 80 MHz. The RU_TONE_SET_INDEX values 1-36 are mapped to the lower 80 MHz and the RU_TONE_SET_INDEX values 37-72 are mapped to the upper 80 MHz.

NOTE 2:
The RU_TONE_SET_INDEX for 80 + 160 MHz, 80 + 80 + 80 MHz and 160 + 80 MHz shall use the 80 MHz RU_TONE_SET_INDEX definition for the lower, middle and upper 80 MHz. The RU_TONE_SET_INDEX values 1-36 are mapped to the lower 80 MHz, the RU_TONE_SET_INDEX values 37-72 are mapped to the middle 80 MHz; and the RU_TONE_SET_INDEX values 73-108 are mapped to the upper 80 MHz.

NOTE 3:
The RU_TONE_SET_INDEX for 160 + 160 MHz and 320 MHz shall use the 160 MHz RU_TONE_SET_INDEX definition for the lower and upper 160 MHz. The RU_TONE_SET_INDEX values 1-72 are mapped to the lower 160 MHz and the RU_TONE_SET_INDEX values 73-144 are mapped to the upper 160 MHz.

TABLE 4

EHT-LTF subcarrier mapping for the MU HARQ Feedback NDP when HARQ_CODEBOOK_SIZE is 3 and Code_Block_Number is 0.

| RU_TONE_SET_INDEX | 80 MHz $K_{tone\_NDPu}$ if FEEDBACK_STATUS is 1 | 80 MHz $K_{tone\_NDPu}$ if FEEDBACK_STATUS is 0 | 40 MHz $K_{tone\_NDPu}$ if FEEDBACK_STATUS is 1 | 40 MHz $K_{tone\_NDPu}$ if FEEDBACK_STATUS is 0 | 20 MHz $K_{tone\_NDPu}$ if FEEDBACK_STATUS is 1 |
|---|---|---|---|---|---|
| 1 | Use 20 MHz FEEDBACK_STATUS = 1 Subcarrier Indices − 384 | Use 20 MHz FEEDBACK_STATUS = 0 Subcarrier Indices − 384 | Use 20 MHz FEEDBACK_STATUS = 1 Subcarrier Indices − 128 | Use 20 MHz FEEDBACK_STATUS = 0 Subcarrier Indices − 128 | −113, −77, −41, 6, 42, 78 |
| 2 | | | | | −111, −75, −39, 8, 44, 80 |
| 3 | | | | | −109, −73, −37, 10, 46, 82 |
| 4 | | | | | −107, −71, −35, 12, 48, 84 |
| 5 | | | | | −105, −69, −33, 14, 50, 86 |
| 6 | | | | | −103, −67, −31, 16, 52, 88 |
| 7-12 | Use 20 MHz FEEDBACK_STATUS = 1 Subcarrier Indices − 128 | Use 20 MHz FEEDBACK_STATUS = 0 Subcarrier Indices − 128 | Use 20 MHz FEEDBACK_STATUS = 1 Subcarrier Indices + 128 | Use 20 MHz FEEDBACK_STATUS = 0 Subcarrier Indices + 128 | |
| 13-18 | Use 20 MHz FEEDBACK_STATUS = 1 Subcarrier Indices + 128 | Use 20 MHz FEEDBACK_STATUS = 0 Subcarrier Indices + 128 | | | |
| 19-24 | Use 20 MHz FEEDBACK_STATUS = 1 Subcarrier Indices + 384 | Use 20 MHz FEEDBACK_STATUS = 0 Subcarrier Indices + 384 | | | |

| RU_TONE_SET_INDEX | 20 MHz $K_{tone\_NDPu}$ if FEEDBACK_STATUS is 0 | |
|---|---|---|
| 1 | −112, −76, −40, 7, 43, 79 | if CODE_BLOCK_NUMBER is 0 |
| 2 | −110, −74, −38, 9, 45, 81 | |
| 3 | −108, −72, −36, 11, 47, 83 | |
| 4 | −106, −70, −34, 13, 49, 85 | |
| 5 | −104, −68, −32, 15, 51, 87 | |
| 6 | −102, −66, −30, 17, 53, 89 | |
| 7-12 | | |
| 13-18 | | |
| 19-24 | | |

NOTE 1:
The RU_TONE_SET_INDEX for 80 + 80 MHz and 160 MHz shall use the 80 MHz RU_TONE_SET_INDEX definition for the lower and upper 80 MHz. The RU_TONE_SET_INDEX values 1-24 are mapped to the lower 80 MHz and the RU_TONE_SET_INDEX values 25-48 are mapped to the upper 80 MHz.
NOTE 2:
The RU_TONE_SET_INDEX for 80 + 160 MHz, 80 + 80 + 80 MHz and 160 + 80 MHz shall use the 80 MHz RU_TONE_SET_INDEX definition for the lower, middle and upper 80 MHz. The RU_TONE_SET_INDEX values 1-24 are mapped to the lower 80 MHz, the RU_TONE_SET_INDEX values 25-48 are mapped to the middle 80 MHz; and the RU_TONE_SET_INDEX values 49-72 are mapped to the upper 80 MHz.
NOTE 3:
The RU_TONE_SET_INDEX for 160 + 160 MHz and 320 MHz shall use the 160 MHz RU_TONE_SET_INDEX definition for the lower and upper 160 MHz. The RU_TONE_SET_INDEX values 1-48 are mapped to the lower 160 MHz and the RU_TONE_SET_INDEX values 49-96 are mapped to the upper 160 MHz.

TABLE 5

EHT-LTF subcarrier mapping for the MU HARQ Feedback NDP when HARQ_CODEBOOK_SIZE is 3 and Code_Block_Number is 1.

| RU_TONE_SET_INDEX | 80 MHz $K_{tone\_NDPu}$ if FEEDBACK_STATUS is 1 | 80 MHz $K_{tone\_NDPu}$ if FEEDBACK_STATUS is 0 | 40 MHz $K_{tone\_NDPu}$ if FEEDBACK_STATUS is 1 | 40 MHz $K_{tone\_NDPu}$ if FEEDBACK_STATUS is 0 | 20 MHz $K_{tone\_NDPu}$ if FEEDBACK_STATUS is 1 |
|---|---|---|---|---|---|
| 1 | Use 20 MHz FEEDBACK_STATUS = 1 Subcarrier | Use 20 MHz FEEDBACK_STATUS = 0 Subcarrier | Use 20 MHz FEEDBACK_STATUS = 1 Subcarrier | Use 20 MHz FEEDBACK_STATUS = 0 Subcarrier | −101, −65, −29, 18, 54, 90 |
| 2 | | | | | −99, −63, −27, 20, 56, 92 |
| 3 | | | | | −97, −61, −25, 22, 58, 94 |
| 4 | | | | | −95, −59, −23, 24, 60, 96 |
| 5 | | | | | −93, −57, −21, 26, 62, 98 |

TABLE 5-continued

EHT-LTF subcarrier mapping for the MU HARQ Feedback NDP when HARQ_CODEBOOK_SIZE is 3 and Code_Block_Number is 1.

| | | | | | |
|---|---|---|---|---|---|
| 6 | Indices − 384 | Indices − 384 | Indices − 128 | Indices − 128 | −91, −55, −19, 28, 64, 100 |
| 7-12 | Use 20 MHz FEEDBACK_STATUS = 1 Subcarrier Indices − 128 | Use 20 MHz FEEDBACK_STATUS = 0 Subcarrier Indices − 128 | Use 20 MHz FEEDBACK_STATUS = 1 Subcarrier Indices + 128 | Use 20 MHz FEEDBACK_STATUS = 0 Subcarrier Indices + 128 | |
| 13-18 | Use 20 MHz FEEDBACK_STATUS = 1 Subcarrier Indices + 128 | Use 20 MHz FEEDBACK_STATUS = 0 Subcarrier Indices + 128 | | | |
| 19-24 | Use 20 MHz FEEDBACK_STATUS = 1 Subcarrier Indices + 384 | Use 20 MHz FEEDBACK_STATUS = 0 Subcarrier Indices + 384 | | | |

| RU_TONE_SET_INDEX | 20 MHz $K_{tone\_NDPu}$ if FEEDBACK_STATUS is 0 | |
|---|---|---|
| 1 | −100, −64, −28, 19, 55, 91 | if CODE_BLOCK_NUMBER is 1 |
| 2 | −98, −62, −26, 21, 57, 93 | |
| 3 | −96, −60, −24, 23, 59, 95 | |
| 4 | −94, −58, −22, 25, 61, 97 | |
| 5 | −92, −56, −20, 27, 63, 99 | |
| 6 | −90, −54, −18, 29, 65, 101 | |
| 7-12 | | |
| 13-18 | | |
| 19-24 | | |

NOTE 1:
The RU_TONE_SET_INDEX for 80 + 80 MHz and 160 MHz shall use the 80 MHz RU_TONE_SET_INDEX definition for the lower and upper 80 MHz. The RU_TONE_SET_INDEX values 1-24 are mapped to the lower 80 MHz and the RU_TONE_SET_INDEX values 25-48 are mapped to the upper 80 MHz.

NOTE 2:
The RU_TONE_SET_INDEX for 80 + 160 MHz, 80 + 80 + 80 MHz and 160 + 80 MHz shall use the 80 MHz RU_TONE_SET_INDEX definition for the lower, middle and upper 80 MHz. The RU_TONE_SET_INDEX values 1-24 are mapped to the lower 80 MHz, the RU_TONE_SET_INDEX values 25-48 are mapped to the middle 80 MHz; and the RU_TONE_SET_INDEX values 49-72 are mapped to the upper 80 MHz.

NOTE 3:
The RU_TONE_SET_INDEX for 160 + 160 MHz and 320 MHz shall use the 160 MHz RU_TONE_SET_INDEX definition for the lower and upper 160 MHz. The RU_TONE_SET_INDEX values 1-48 are mapped to the lower 160 MHz and the RU_TONE_SET_INDEX values 49-96 are mapped to the upper 160 MHz.

TABLE 6

EHT-LTF subcarrier mapping for the MU HARQ Feedback NDP when HARQ_CODEBOOK_SIZE is 3 and Code_Block_Number is 2.

| | 80 MHz | | 40 MHz | | 20 MHz |
|---|---|---|---|---|---|
| RU_TONE_SET_INDEX | $K_{tone\_NDPu}$ if FEEDBACK_STATUS is 1 | $K_{tone\_NDPu}$ if FEEDBACK_STATUS is 0 | $K_{tone\_NDPu}$ if FEEDBACK_STATUS is 1 | $K_{tone\_NDPu}$ if FEEDBACK_STATUS is 0 | $K_{tone\_NDPu}$ if FEEDBACK_STATUS is 1 |
| 1 | Use 20 MHz FEEDBACK_STATUS = 1 Subcarrier Indices − 384 | Use 20 MHz FEEDBACK_STATUS = 0 Subcarrier Indices − 384 | Use 20 MHz FEEDBACK_STATUS = 1 Subcarrier Indices − 128 | Use 20 MHz FEEDBACK_STATUS = 0 Subcarrier Indices − 128 | −89, −53, −17, 30, 66, 102 |
| 2 | | | | | −87, −51, −15, 32, 68, 104 |
| 3 | | | | | −85, −49, −13, 34, 70, 106 |
| 4 | | | | | −83, −47, −11, 36, 72, 108 |
| 5 | | | | | −81, −45, −9, 38, 74, 110 |
| 6 | | | | | −79, −43, −7, 40, 76, 112 |
| 7-12 | Use 20 MHz FEEDBACK_STATUS = 1 Subcarrier Indices − 128 | Use 20 MHz FEEDBACK_STATUS = 0 Subcarrier Indices − 128 | Use 20 MHz FEEDBACK_STATUS = 1 Subcarrier Indices + 128 | Use 20 MHz FEEDBACK_STATUS = 0 Subcarrier Indices + 128 | |
| 13-18 | Use 20 MHz FEEDBACK_STA- | Use 20 MHz FEEDBACK_STA- | | | |

TABLE 6-continued

EHT-LTF subcarrier mapping for the MU HARQ Feedback NDP when HARQ_CODEBOOK_SIZE is 3 and Code_Block_Number is 2.

| | TUS = 1 Subcarrier Indices + 128 | TUS = 0 Subcarrier Indices + 128 | |
|---|---|---|---|
| 19-24 | Use 20 MHz FEED-BACK_STA-TUS = 1 Subcarrier Indices + 384 | Use 20 MHz FEED-BACK_STA-TUS = 0 Subcarrier Indices + 384 | |

| RU_TONE_SET_INDEX | 20 MHz $K_{tone\_NDPu}$ if FEED-BACK_STATUS is 0 | |
|---|---|---|
| 1 | −88, −52, −16, 31, 67, 103 | if |
| 2 | −86, −50, −14, 33, 69, 105 | CODE_BLOCK_NUMBER is 2 |
| 3 | −84, −48, −12, 35, 71, 107 | |
| 4 | −82, −46, −10, 37, 73, 109 | |
| 5 | −80, −44, −8, 39, 75, 111 | |
| 6 | −78, −42, −6, 41, 77, 113 | |
| 7-12 | | |
| 13-18 | | |
| 19-24 | | |

NOTE 1:
The RU_TONE_SET_INDEX for 80 + 80 MHz and 160 MHz shall use the 80 MHz RU_TONE_SET_INDEX definition for the lower and upper 80 MHz. The RU_TONE_SET_INDEX values 1-24 are mapped to the lower 80 MHz and the RU_TONE_SET_INDEX values 25-48 are mapped to the upper 80 MHz.
NOTE 2:
The RU_TONE_SET_INDEX for 80 + 160 MHz, 80 + 80 + 80 MHz and 160 + 80 shall use the 80 MHz RU_TONE_SET_INDEX definition for the lower, middle and upper 80 MHz. The RU_TONE_SET_INDEX values 1-24 are mapped to the lower 80 MHz, the RU_TONE_SET_INDEX values 25-48 are mapped to the middle 80 MHz; and the RU_TONE_SET_INDEX values 49-72 are mapped to the upper 80 MHz.
NOTE 3:
The RU_TONE_SET_INDEX for 160 + 160 MHz and 320 MHz shall use the 160 MHz RU_TONE_SET_INDEX definition for the lower and upper 160 MHz. The RU_TONE_SET_INDEX values 1-48 are mapped to the lower 160 MHz and the RU_TONE_SET_INDEX values 49-96 are mapped to the upper 160 MHz.

TABLE 7

EHT-LTF subcarrier mapping for the MU HARQ Feedback NDP when HARQ_CODEBOOK_SIZE is 4 and Code_Block_Number is 0 or 1.

| | 80 MHz | | 40 MHz | | 20 MHz |
|---|---|---|---|---|---|
| RU_TONE_SET_INDEX | $K_{tone\_NDPu}$ if FEED-BACK_STA-TUS is 1 | $K_{tone\_NDPu}$ if FEED-BACK_STA-TUS is 0 | $K_{tone\_NDPu}$ if FEED-BACK_STA-TUS is 1 | $K_{tone\_NDPu}$ if FEED-BACK_STA-TUS is 0 | $K_{tone\_NDPu}$ if FEED-BACK_STA-TUS is 1 |
| 1 | Use 20 MHz FEED-BACK_STA-TUS = 1 Subcarrier Indices − 384 | Use 20 MHz FEED-BACK_STA-TUS = 0 Subcarrier Indices − 384 | Use 20 MHz FEED-BACK_STA-TUS = 1 Subcarrier Indices − 128 | Use 20 MHz FEED-BACK_STA-TUS = 0 Subcarrier Indices − 128 | −113, −77, −41, 6, 42, 78 |
| 2 | | | | | −111, −75, −39, 8, 44, 80 |
| 3 | | | | | −109, −73, −37, 10, 46, 82 |
| 4 | | | | | −107, −71, −35, 12, 48, 84 |
| 5-8 | Use 20 MHz FEED-BACK_STA-TUS = 1 Subcarrier Indices − 128 | Use 20 MHz FEED-BACK_STA-TUS = 0 Subcarrier Indices − 128 | Use 20 MHz FEED-BACK_STA-TUS = 1 Subcarrier Indices + 128 | Use 20 MHz FEED-BACK_STA-TUS = 0 Subcarrier Indices + 128 | |
| 9-12 | Use 20 MHz FEED-BACK_STA-TUS = 1 Subcarrier Indices + 128 | Use 20 MHz FEED-BACK_STA-TUS = 0 Subcarrier Indices + 128 | | | |
| 13-16 | Use 20 MHz FEED-BACK_STA-TUS = 1 Subcarrier Indices + 384 | Use 20 MHz FEED-BACK_STA-TUS = 0 Subcarrier Indices + 384 | | | |
| 1 | Use 20 MHz FEED-BACK_STA- | Use 20 MHz FEED-BACK_STA- | Use 20 MHz FEED-BACK_STA- | Use 20 MHz FEED-BACK_STA- | −105, −69, −33, 14, 50, 86 |
| 2 | | | | | −103, −67, −31, 16, 52, 88 |
| 3 | | | | | −101, −65, −29, 18, 54, 90 |

TABLE 7-continued

EHT-LTF subcarrier mapping for the MU HARQ Feedback NDP when HARQ_CODEBOOK_SIZE is 4 and Code_Block_Number is 0 or 1.

| | | | | | |
|---|---|---|---|---|---|
| 4 | TUS = 1 Subcarrier Indices − 384 | TUS = 0 Subcarrier Indices − 384 | TUS = 1 Subcarrier Indices − 128 | TUS = 0 Subcarrier Indices − 128 | −99, −63, −27, 20, 56, 92 |
| 5-8 | Use 20 MHz FEEDBACK_STATUS = 1 Subcarrier Indices − 128 | Use 20 MHz FEEDBACK_STATUS = 0 Subcarrier Indices − 128 | Use 20 MHz FEEDBACK_STATUS = 1 Subcarrier Indices + 128 | Use 20 MHz FEEDBACK_STATUS = 0 Subcarrier Indices + 128 | |
| 9-12 | Use 20 MHz FEEDBACK_STATUS = 1 Subcarrier Indices + 128 | Use 20 MHz FEEDBACK_STATUS = 0 Subcarrier Indices + 128 | | | |
| 13-16 | Use 20 MHz FEEDBACK_STATUS = 1 Subcarrier Indices + 384 | Use 20 MHz FEEDBACK_STATUS = 0 Subcarrier Indices + 384 | | | |

| RU_TONE_SET_INDEX | 20 MHz $K_{tone\_NDPu}$ if FEEDBACK_STATUS is 0 | |
|---|---|---|
| 1 | −112, −76, −40, 7, 43, 79 | if CODE_BLOCK_NUMBER is 0 |
| 2 | −110, −74, −38, 9, 45, 81 | |
| 3 | −108, −72, −36, 11, 47, 83 | |
| 4 | −106, −70, −34, 13, 49, 85 | |
| 5-8 | | |
| 9-12 | | |
| 13-16 | | |
| 1 | −104, −68, −32, 15, 51, 87 | if CODE_BLOCK_NUMBER is 1 |
| 2 | −102, −66, −30, 17, 53, 89 | |
| 3 | −100, −64, −28, 19, 55, 91 | |
| 4 | −98, −62, −26, 21, 57, 93 | |
| 5-8 | | |
| 9-12 | | |
| 13-16 | | |

NOTE 1:
The RU_TONE_SET_INDEX for 80 + 80 MHz and 160 MHz shall use the 80 MHz RU_TONE_SET_INDEX definition for the lower and upper 80 MHz. The RU_TONE_SET_INDEX values 1-16 are mapped to the lower 80 MHz and the RU_TONE_SET_INDEX values 17-32 are mapped to the upper 80 MHz.

NOTE 2:
The RU_TONE_SET_INDEX for 80 + 160 MHz, 80 + 80 + 80 MHz and 160 + 80 MHz shall use the 80 MHz RU_TONE_SET_INDEX definition for the lower, middle and upper 80 MHz. The RU_TONE_SET_INDEX values 1-16 are mapped to the lower 80 MHz, the RU_TONE_SET_INDEX values 17-32 are mapped to the middle 80 MHz; and the RU_TONE_SET_INDEX values 33-48 are mapped to the upper 80 MHz.

NOTE 3:
The RU_TONE_SET_INDEX for 160 + 160 MHz and 320 MHz shall use the 160 MHz RU_TONE_SET_INDEX definition for the lower and upper 160 MHz. The RU_TONE_SET_INDEX values 1-32 are mapped to the lower 160 MHz and the RU_TONE_SET_INDEX values 33-64 are mapped to the upper 160 MHz.

TABLE 8

EHT-LTF subcarrier mapping for the MU HARQ Feedback NDP when HARQ_CODEBOOK_SIZE is 4 and Code_Block_Number is 2 or 3.

| | 80 MHz | | 40 MHz | | 20 MHz |
|---|---|---|---|---|---|
| RU_TONE_SET_INDEX | $K_{tone\_NDPu}$ if FEEDBACK_STATUS is 1 | $K_{tone\_NDPu}$ if FEEDBACK_STATUS is 0 | $K_{tone\_NDPu}$ if FEEDBACK_STATUS is 1 | $K_{tone\_NDPu}$ if FEEDBACK_STATUS is 0 | $K_{tone\_NDPu}$ if FEEDBACK_STATUS is 1 |
| 1 | Use 20 MHz FEEDBACK_STATUS = 1 Subcarrier Indices − 384 | Use 20 MHz FEEDBACK_STATUS = 0 Subcarrier Indices − 384 | Use 20 MHz FEEDBACK_STATUS = 1 Subcarrier Indices − 128 | Use 20 MHz FEEDBACK_STATUS = 0 Subcarrier Indices − 128 | −97, −61, −25, 22, 58, 94 |
| 2 | | | | | −95, −59, −23, 24, 60, 96 |
| 3 | | | | | −93, −57, −21, 26, 62, 98 |
| 4 | | | | | −91, −55, −19, 28, 64, 100 |
| 5-8 | Use 20 MHz FEEDBACK_STATUS = 1 | Use 20 MHz FEEDBACK_STATUS = 0 | Use 20 MHz FEEDBACK_STATUS = 1 | Use 20 MHz FEEDBACK_STATUS = 0 | |

TABLE 8-continued

EHT-LTF subcarrier mapping for the MU HARQ Feedback NDP when
HARQ_CODEBOOK_SIZE is 4 and Code_Block_Number is 2 or 3.

| | | | | | |
|---|---|---|---|---|---|
| 9-12 | Subcarrier Indices − 128 Use 20 MHz FEED-BACK_STATUS = 1 | Subcarrier Indices − 128 Use 20 MHz FEED-BACK_STATUS = 0 | Subcarrier Indices + 128 | Subcarrier Indices + 128 | |
| 13-16 | Subcarrier Indices + 128 Use 20 MHz FEED-BACK_STATUS = 1 | Subcarrier Indices + 128 Use 20 MHz FEED-BACK_STATUS = 0 | | | |
| | Subcarrier Indices + 384 | Subcarrier Indices + 384 | | | |
| 1 | Use 20 MHz | Use 20 MHz | Use 20 MHz | Use 20 MHz | −89, −53, −17, 30, 66, 102 |
| 2 | FEED- | FEED- | FEED- | FEED- | −87, −51, −15, 32, 68, 104 |
| 3 | BACK_STA- | BACK_STA- | BACK_STA- | BACK_STA- | −85, −49, −13, 34, 70, 106 |
| 4 | TUS = 1 | TUS = 0 | TUS = 1 | TUS = 0 | −83, −47, −11, 36, 72, 108 |
| | Subcarrier Indices − 384 | Subcarrier Indices − 384 | Subcarrier Indices − 128 | Subcarrier Indices − 128 | |
| 5-8 | Use 20 MHz FEED-BACK_STATUS = 1 | Use 20 MHz FEED-BACK_STATUS = 0 | Use 20 MHz FEED-BACK_STATUS = 1 | Use 20 MHz FEED-BACK_STATUS = 0 | |
| 9-12 | Subcarrier Indices − 128 Use 20 MHz FEED-BACK_STATUS = 1 | Subcarrier Indices − 128 Use 20 MHz FEED-BACK_STATUS = 0 | Subcarrier Indices + 128 | Subcarrier Indices + 128 | |
| 13-16 | Subcarrier Indices + 128 Use 20 MHz FEED-BACK_STATUS = 1 | Subcarrier Indices + 128 Use 20 MHz FEED-BACK_STATUS = 0 | | | |
| | Subcarrier Indices + 384 | Subcarrier Indices + 384 | | | |

| RU_TONE_SET_INDEX | 20 MHz $K_{tone\_NDPu}$ if FEED-BACK_STATUS is 0 | |
|---|---|---|
| 1 | −96, −60, −24, 23, 59, 95 | if CODE_BLOCK_NUMBER is 2 |
| 2 | −94, −58, −22, 25, 61, 97 | |
| 3 | −92, −56, −20, 27, 63, 99 | |
| 4 | −90, −54, −18, 29, 65, 101 | |
| 5-8 | | |
| 9-12 | | |
| 13-16 | | |
| 1 | −88, −52, −16, 31, 67, 103 | if CODE_BLOCK_NUMBER is 3 |
| 2 | −86, −50, −14, 33, 69, 105 | |
| 3 | −84, −48, −12, 35, 71, 107 | |
| 4 | −82, −46, −10, 37, 73, 109 | |
| 5-8 | | |
| 9-12 | | |
| 13-16 | | |

NOTE 1:
The RU_TONE_SET_INDEX for 80 + 80 MHz and 160 MHz shall use the 80 MHz RU_TONE_SET_INDEX definition for the lower and upper 80 MHz. The RU_TONE_SET_INDEX values 1-16 are mapped to the lower 80 MHz and the RU_TONE_SET_INDEX values 17-32 are mapped to the upper 80 MHz.
NOTE 2:
The RU_TONE_SET_INDEX for 80 + 160 MHz, 80 + 80 + 80 MHz and 160 + 80 MHz shall use the 80 MHz RU_TONE_SET_INDEX definition for the lower, middle and upper 80 MHz. The RU_TONE_SET_INDEX values 1-16 are mapped to the lower 80 MHz, the RU_TONE_SET_INDEX values 17-32 are mapped to the middle 80 MHz; and the RU_TONE_SET_INDEX values 33-48 are mapped to the upper 80 MHz.
NOTE 3:
The RU_TONE_SET_INDEX for 160 + 160 MHz and 320 MHz shall use the 160 MHz RU_TONE_SET_INDEX definition for the lower and upper 160 MHz. The RU_TONE_SET_INDEX values 1-32 are mapped to the lower 160 MHz and the RU_TONE_SET_INDEX values 33-64 are mapped to the upper 160 MHz.

TABLE 9

EHT-LTF subcarrier mapping for the MU HARQ Feedback NDP when HARQ_CODEBOOK_SIZE is 6 and Code_Block_Number is 0 or 1.

| RU_TONE_SET_INDEX | 80 MHz $K_{tone\_NDPu}$ if FEEDBACK_STATUS is 1 | 80 MHz $K_{tone\_NDPu}$ if FEEDBACK_STATUS is 0 | 40 MHz $K_{tone\_NDPu}$ if FEEDBACK_STATUS is 1 | 40 MHz $K_{tone\_NDPu}$ if FEEDBACK_STATUS is 0 | 20 MHz $K_{tone\_NDPu}$ if FEEDBACK_STATUS is 1 |
|---|---|---|---|---|---|
| 1 | Use 20 MHz FEEDBACK_STATUS = 1 Subcarrier Indices − 384 | Use 20 MHz FEEDBACK_STATUS = 0 Subcarrier Indices − 384 | Use 20 MHz FEEDBACK_STATUS = 1 Subcarrier Indices − 128 | Use 20 MHz FEEDBACK_STATUS = 0 Subcarrier Indices − 128 | −113, −77, −41, 6, 42, 78 |
| 2 | | | | | −111, −75, −39, 8, 44, 80 |
| 3 | | | | | −109, −73, −37, 10, 46, 82 |
| 4-6 | Use 20 MHz FEEDBACK_STATUS = 1 Subcarrier Indices − 128 | Use 20 MHz FEEDBACK_STATUS = 0 Subcarrier Indices − 128 | Use 20 MHz FEEDBACK_STATUS = 1 Subcarrier Indices + 128 | Use 20 MHz FEEDBACK_STATUS = 0 Subcarrier Indices + 128 | |
| 7-9 | Use 20 MHz FEEDBACK_STATUS = 1 Subcarrier Indices + 128 | Use 20 MHz FEEDBACK_STATUS = 0 Subcarrier Indices + 128 | | | |
| 10-12 | Use 20 MHz FEEDBACK_STATUS = 1 Subcarrier Indices + 384 | Use 20 MHz FEEDBACK_STATUS = 0 Subcarrier Indices + 384 | | | |
| 1 | Use 20 MHz FEEDBACK_STATUS = 1 Subcarrier Indices − 384 | Use 20 MHz FEEDBACK_STATUS = 0 Subcarrier Indices − 384 | Use 20 MHz FEEDBACK_STATUS = 1 Subcarrier Indices − 128 | Use 20 MHz FEEDBACK_STATUS = 0 Subcarrier Indices − 128 | −105, −69, −33, 14, 50, 86 |
| 2 | | | | | −103, −67, −31, 16, 52, 88 |
| 3 | | | | | −101, −65, −29, 18, 54, 90 |
| 4-6 | Use 20 MHz FEEDBACK_STATUS = 1 Subcarrier Indices − 128 | Use 20 MHz FEEDBACK_STATUS = 0 Subcarrier Indices − 128 | Use 20 MHz FEEDBACK_STATUS = 1 Subcarrier Indices + 128 | Use 20 MHz FEEDBACK_STATUS = 0 Subcarrier Indices + 128 | |
| 7-9 | Use 20 MHz FEEDBACK_STATUS = 1 Subcarrier Indices + 128 | Use 20 MHz FEEDBACK_STATUS = 0 Subcarrier Indices + 128 | | | |
| 10-12 | Use 20 MHz FEEDBACK_STATUS = 1 Subcarrier Indices + 384 | Use 20 MHz FEEDBACK_STATUS = 0 Subcarrier Indices + 384 | | | |

| RU_TONE_SET_INDEX | 20 MHz $K_{tone\_NDPu}$ if FEEDBACK_STATUS is 0 | |
|---|---|---|
| 1 | −112, −76, −40, 7, 43, 79 | if CODE_BLOCK_NUMBER is 0 |
| 2 | −110, −74, −38, 9, 45, 81 | |
| 3 | −108, −72, −36, 11, 47, 83 | |
| 4-6 | | |
| 7-9 | | |
| 10-12 | | |
| 1 | −104, −68, −32, 15, 51, 87 | if CODE_BLOCK_NUMBER is 1 |
| 2 | −102, −66, −30, 17, 53, 89 | |

TABLE 9-continued

EHT-LTF subcarrier mapping for the MU HARQ Feedback NDP when HARQ_CODEBOOK_SIZE is 6 and Code_Block_Number is 0 or 1.

| | |
|---|---|
| 3 | −100, −64, −28, 19, 55, 91 |
| 4-6 | |
| 7-9 | |
| 10-12 | |

NOTE 1:

The RU_TONE_SET_INDEX for 80 + 80 MHz and 160 MHz shall use the 80 MHz RU_TONE_SET_INDEX definition for the lower and upper 80 MHz. The RU_TONE_SET_INDEX values 1-12 are mapped to the lower 80 MHz and the RU_TONE_SET_INDEX values 13-24 are mapped to the upper 80 MHz.

NOTE 2:

The RU_TONE_SET_INDEX for 80 + 160 MHz, 80 + 80 + 80 MHz and 160 + 80 MHz shall use the 80 MHz RU_TONE_SET_INDEX definition for the lower, middle and upper 80 MHz. The RU_TONE_SET_INDEX values 1-12 are mapped to the lower 80 MHz, the RU_TONE_SET_INDEX values 13-24 are mapped to the middle 80 MHz; and the RU_TONE_SET_INDEX values 25-36 are mapped to the upper 80 MHz.

NOTE 3:

The RU_TONE_SET_INDEX for 160 + 160 MHz and 320 MHz shall use the 160 MHz RU_TONE_SET_INDEX definition for the lower and upper 160 MHz. The RU_TONE_SET_INDEX values 1-24 are mapped to the lower 160 MHz and the RU_TONE_SET_INDEX values 25-48 are mapped to the upper 160 MHz.

TABLE 10

EHT-LTF subcarrier mapping for the MU HARQ Feedback NDP when HARQ_CODEBOOK_SIZE is 6 and Code_Block_Number is 2 or 3.

| | 80 MHz | | 40 MHz | | 20 MHz |
|---|---|---|---|---|---|
| RU_TONE_SET_INDEX | $K_{tone\_NDPu}$ if FEED-BACK_STA-TUS is 1 | $K_{tone\_NDPu}$ if FEED-BACK_STA-TUS is 0 | $K_{tone\_NDPu}$ if FEED-BACK_STA-TUS is 1 | $K_{tone\_NDPu}$ if FEED-BACK_STA-TUS is 0 | $K_{tone\_NDPu}$ if FEED-BACK_STA-TUS is 1 |
| 1 | Use 20 MHz FEED-BACK_STA-TUS = 1 Subcarrier Indices − 384 | Use 20 MHz FEED-BACK_STA-TUS = 0 Subcarrier Indices − 384 | Use 20 MHz FEED-BACK_STA-TUS = 1 Subcarrier Indices − 128 | Use 20 MHz FEED-BACK_STA-TUS = 0 Subcarrier Indices − 128 | −101, −65, −29, 18, 54, 90 |
| 2 | | | | | −99, −63, −27, 20, 56, 92 |
| 3 | | | | | −97, −61, −25, 22, 58, 94 |
| 4-6 | Use 20 MHz FEED-BACK_STA-TUS = 1 Subcarrier Indices − 128 | Use 20 MHz FEED-BACK_STA-TUS = 0 Subcarrier Indices − 128 | Use 20 MHz FEED-BACK_STA-TUS = 1 Subcarrier Indices + 128 | Use 20 MHz FEED-BACK_STA-TUS = 0 Subcarrier Indices + 128 | |
| 7-9 | Use 20 MHz FEED-BACK_STA-TUS = 1 Subcarrier Indices + 128 | Use 20 MHz FEED-BACK_STA-TUS = 0 Subcarrier Indices + 128 | | | |
| 10-12 | Use 20 MHz FEED-BACK_STA-TUS = 1 Subcarrier Indices + 384 | Use 20 MHz FEED-BACK_STA-TUS = 0 Subcarrier Indices + 384 | | | |
| 1 | Use 20 MHz FEED-BACK_STA-TUS = 1 Subcarrier Indices − 384 | Use 20 MHz FEED-BACK_STA-TUS = 0 Subcarrier Indices − 384 | Use 20 MHz FEED-BACK_STA-TUS = 1 Subcarrier Indices − 128 | Use 20 MHz FEED-BACK_STA-TUS = 0 Subcarrier Indices − 128 | −95, −59, −23, 24, 60, 96 |
| 2 | | | | | −93, −57, −21, 26, 62, 98 |
| 3 | | | | | −91, −55, −19, 28, 64, 100 |
| 4-6 | Use 20 MHz FEED-BACK_STA-TUS = 1 Subcarrier Indices − 128 | Use 20 MHz FEED-BACK_STA-TUS = 0 Subcarrier Indices − 128 | Use 20 MHz FEED-BACK_STA-TUS = 1 Subcarrier Indices + 128 | Use 20 MHz FEED-BACK_STA-TUS = 0 Subcarrier Indices + 128 | |
| 7-9 | Use 20 MHz FEED-BACK_STA-TUS = 1 Subcarrier Indices + 128 | Use 20 MHz FEED-BACK_STA-TUS = 0 Subcarrier Indices + 128 | | | |
| 10-12 | Use 20 MHz FEED-BACK_STA- | Use 20 MHz FEED-BACK_STA- | | | |

TABLE 10-continued

EHT-LTF subcarrier mapping for the MU HARQ Feedback NDP when HARQ_CODEBOOK_SIZE is 6 and Code_Block_Number is 2 or 3.

| RU_TONE_SET_INDEX | 20 MHz $K_{tone\_NDPu}$ if FEEDBACK_STATUS is 0 | |
|---|---|---|
| 1 | −100, −64, −28, 19, 55, 91 | if |
| 2 | −98, −62, −26, 21, 57, 93 | CODE_BLOCK_NUMBER is 2 |
| 3 | −96, −60, −24, 23, 59, 95 | |
| 4-6 | | |
| 7-9 | | |
| 10-12 | | |
| 1 | −94, −58, −22, 25, 61, 97 | if |
| 2 | −92, −56, −20, 27, 63, 99 | CODE_BLOCK_NUMBER is 3 |
| 3 | −90, −54, −18, 29, 65, 101 | |
| 4-6 | | |
| 7-9 | | |
| 10-12 | | |

Additional columns above also include: TUS = 1 Subcarrier Indices + 384; TUS = 0 Subcarrier Indices + 384.

NOTE 1:
The RU_TONE_SET_INDEX for 80 + 80 MHz and 160 MHz shall use the 80 MHz RU_TONE_SET_INDEX definition for the lower and upper 80 MHz. The RU_TONE_SET_INDEX values 1-12 are mapped to the lower 80 MHz and the RU_TONE_SET_INDEX values 13-24 are mapped to the upper 80 MHz.

NOTE 2:
The RU_TONE_SET_INDEX for 80 + 160 MHz, 80 + 80 + 80 MHz and 160 + 80 MHz shall use the 80 MHz RU_TONE_SET_INDEX definition for the lower, middle and upper 80 MHz. The RU_TONE_SET _INDEX values 1-12 are mapped to the lower 80 MHz, the RU_TONE_SET_INDEX values 13-24 are mapped to the middle 80 MHz; and the RU_TONE_SET_INDEX values 25-36 are mapped to the upper 80 MHz.

NOTE 3:
The RU_TONE_SET_INDEX for 160 + 160 MHz and 320 MHz shall use the 160 MHz RU_TONE_SET_INDEX definition for the lower and upper 160 MHz. The RU_TONE_SET_INDEX values 1-24 are mapped to the lower 160 MHz and the RU_TONE_SET_INDEX values 25-48 are mapped to the upper 160 MHz.

TABLE 11

EHT-LTF subcarrier mapping for the MU HARQ Feedback NDP when HARQ_CODEBOOK_SIZE is 6 and Code_Block_Number is 4 or 5.

| RU_TONE_SET_INDEX | 80 MHz $K_{tone\_NDPu}$ if FEEDBACK_STATUS is 1 | 80 MHz $K_{tone\_NDPu}$ if FEEDBACK_STATUS is 0 | 40 MHz $K_{tone\_NDPu}$ if FEEDBACK_STATUS is 1 | 40 MHz $K_{tone\_NDPu}$ if FEEDBACK_STATUS is 0 | 20 MHz $K_{tone\_NDPu}$ if FEEDBACK_STATUS is 1 |
|---|---|---|---|---|---|
| 1 | Use 20 MHz FEEDBACK_STATUS = 1 Subcarrier Indices − 384 | Use 20 MHz FEEDBACK_STATUS = 0 Subcarrier Indices − 384 | Use 20 MHz FEEDBACK_STATUS = 1 Subcarrier Indices − 128 | Use 20 MHz FEEDBACK_STATUS = 0 Subcarrier Indices − 128 | −89, −53, −17, 30, 66, 102 |
| 2 | | | | | −87, −51, −15, 32, 68, 104 |
| 3 | | | | | −85, −49, −13, 34, 70, 106 |
| 4-6 | Use 20 MHz FEEDBACK_STATUS = 1 Subcarrier Indices − 128 | Use 20 MHz FEEDBACK_STATUS = 0 Subcarrier Indices − 128 | Use 20 MHz FEEDBACK_STATUS = 1 Subcarrier Indices + 128 | Use 20 MHz FEEDBACK_STATUS = 0 Subcarrier Indices + 128 | |
| 7-9 | Use 20 MHz FEEDBACK_STATUS = 1 Subcarrier Indices + 128 | Use 20 MHz FEEDBACK_STATUS = 0 Subcarrier Indices + 128 | | | |
| 10-12 | Use 20 MHz FEEDBACK_STATUS = 1 Subcarrier Indices + 384 | Use 20 MHz FEEDBACK_STATUS = 0 Subcarrier Indices + 384 | | | |
| 1 | Use 20 MHz FEEDBACK_STATUS = 1 Subcarrier Indices − 384 | Use 20 MHz FEEDBACK_STATUS = 0 Subcarrier Indices − 384 | Use 20 MHz FEEDBACK_STATUS = 1 Subcarrier Indices − 128 | Use 20 MHz FEEDBACK_STATUS = 0 Subcarrier Indices − 128 | −83, −47, −11, 36, 72, 108 |
| 2 | | | | | −81, −45, −9, 38, 74, 110 |
| 3 | | | | | −79, −43, −7, 40, 76, 112 |

TABLE 11-continued

EHT-LTF subcarrier mapping for the MU HARQ Feedback NDP when HARQ_CODEBOOK_SIZE is 6 and Code_Block_Number is 4 or 5.

| | | | | |
|---|---|---|---|---|
| 4-6 | Use 20 MHz FEED-BACK_STA-TUS = 1 Subcarrier Indices − 128 | Use 20 MHz FEED-BACK_STA-TUS = 0 Subcarrier Indices − 128 | Use 20 MHz FEED-BACK_STA-TUS = 1 Subcarrier Indices + 128 | Use 20 MHz FEED-BACK_STA-TUS = 0 Subcarrier Indices + 128 |
| 7-9 | Use 20 MHz FEED-BACK_STA-TUS = 1 Subcarrier Indices + 128 | Use 20 MHz FEED-BACK_STA-TUS = 0 Subcarrier Indices + 128 | | |
| 10-12 | Use 20 MHz FEED-BACK_STA-TUS = 1 Subcarrier Indices + 384 | Use 20 MHz FEED-BACK_STA-TUS = 0 Subcarrier Indices + 384 | | |

| RU_TONE_SET_INDEX | 20 MHz $K_{tone\_NDPu}$ if FEEDBACK_STATUS is 0 | |
|---|---|---|
| 1 | −88, −52, −16, 31, 67, 103 | if CODE_BLOCK_NUMBER is 4 |
| 2 | −86, −50, −14, 33, 69, 105 | |
| 3 | −84, −48, −12, 35, 71, 107 | |
| 4-6 | | |
| 7-9 | | |
| 10-12 | | |
| 1 | −82, −46, −10, 37, 73, 109 | if CODE_BLOCK_NUMBER is 5 |
| 2 | −80, −44, −8, 39, 75, 111 | |
| 3 | −78, −42, −6, 41, 77, 113 | |
| 4-6 | | |
| 7-9 | | |
| 10-12 | | |

NOTE 1:
The RU_TONE_SET_INDEX for 80 + 80 MHz and 160 MHz shall use the 80 MHz RU_TONE_SET_INDEX definition for the lower and upper 80 MHz. The RU_TONE_SET_INDEX values 1-12 are mapped to the lower 80 MHz and the RU_TONE_SET_INDEX values 13-24 are mapped to the upper 80 MHz.
NOTE 2:
The RU_TONE_SET_INDEX for 80 + 160 MHz, 80 + 80 + 80 MHz and 160 + 80 MHz shall use the 80 MHz RU_TONE_SET_INDEX definition for the lower, middle and upper 80 MHz. The RU_TONE_SET_INDEX values 1-12 are mapped to the lower 80 MHz, the RU_TONE_SET_INDEX values 13-24 are mapped to the middle 80 MHz; and the RU_TONE_SET_INDEX values 25-36 are mapped to the upper 80 MHz.
NOTE 3:
The RU_TONE_SET_INDEX for 160 + 160 MHz and 320 MHz shall use the 160 MHz RU_TONE_SET_INDEX definition for the lower and upper 160 MHz. The RU_TONE_SET_INDEX values 1-24 are mapped to the lower 160 MHz and the RU_TONE_SET_INDEX values 25-48 are mapped to the upper 160 MHz.

TABLE 12

EHT-LTF subcarrier mapping for the MU HARQ Feedback NDP when HARQ_CODEBOOK_SIZE is 9 and Code_Block_Number is 0 or 1.

| | 80 MHz | | 40 MHz | | 20 MHz |
|---|---|---|---|---|---|
| RU_TONE_SET_INDEX | $K_{tone\_NDPu}$ if FEEDBACK_STATUS is 1 | $K_{tone\_NDPu}$ if FEEDBACK_STATUS is 0 | $K_{tone\_NDPu}$ if FEEDBACK_STATUS is 1 | $K_{tone\_NDPu}$ if FEEDBACK_STATUS is 0 | $K_{tone\_NDPu}$ if FEEDBACK_STATUS is 1 |
| 1 | Use 20 MHz FEED-BACK_STA-TUS = 1 Subcarrier Indices − 384 | Use 20 MHz FEED-BACK_STA-TUS = 0 Subcarrier Indices − 384 | Use 20 MHz FEED-BACK_STA-TUS = 1 Subcarrier Indices − 128 | Use 20 MHz FEED-BACK_STA-TUS = 0 Subcarrier Indices − 128 | −113, −77, −41, 6, 42, 78 |
| 2 | | | | | −111, −75, −39, 8, 44, 80 |
| 3-4 | Use 20 MHz FEED-BACK_STA-TUS = 1 Subcarrier Indices − 128 | Use 20 MHz FEED-BACK_STA-TUS = 0 Subcarrier Indices − 128 | Use 20 MHz FEED-BACK_STA-TUS = 1 Subcarrier Indices + 128 | Use 20 MHz FEED-BACK_STA-TUS = 0 Subcarrier Indices + 128 | |
| 5-6 | Use 20 MHz FEED-BACK_STA- | Use 20 MHz FEED-BACK_STA- | | | |

TABLE 12-continued

EHT-LTF subcarrier mapping for the MU HARQ Feedback NDP when
HARQ_CODEBOOK_SIZE is 9 and Code_Block_Number is 0 or 1.

| | | | | | |
|---|---|---|---|---|---|
| 7-8 | Use 20 MHz FEED-BACK_STA-TUS = 1 Subcarrier Indices + 384 | Use 20 MHz FEED-BACK_STA-TUS = 0 Subcarrier Indices + 384 | | | |
| 1 | Use 20 MHz FEED-BACK_STA-TUS = 1 Subcarrier Indices − 384 | Use 20 MHz FEED-BACK_STA-TUS = 0 Subcarrier Indices − 384 | Use 20 MHz FEED-BACK_STA-TUS = 1 Subcarrier Indices − 128 | Use 20 MHz FEED-BACK_STA-TUS = 0 Subcarrier Indices − 128 | −109, −73, −37, 10, 46, 82 |
| 2 | | | | | −107, −71, −35, 12, 48, 84 |
| 3-4 | Use 20 MHz FEED-BACK_STA-TUS = 1 Subcarrier Indices − 128 | Use 20 MHz FEED-BACK_STA-TUS = 0 Subcarrier Indices − 128 | Use 20 MHz FEED-BACK_STA-TUS = 1 Subcarrier Indices + 128 | Use 20 MHz FEED-BACK_STA-TUS = 0 Subcarrier Indices + 128 | |
| 5-6 | Use 20 MHz FEED-BACK_STA-TUS = 1 Subcarrier Indices + 128 | Use 20 MHz FEED-BACK_STA-TUS = 0 Subcarrier Indices + 128 | | | |
| 7-8 | Use 20 MHz FEED-BACK_STA-TUS = 1 Subcarrier Indices + 384 | Use 20 MHz FEED-BACK_STA-TUS = 0 Subcarrier Indices + 384 | | | |

| RU_TONE_SET_INDEX | 20 MHz $K_{tone\_NDPu}$ if FEED-BACK_STA-TUS is 0 | |
|---|---|---|
| 1 | −112, −76, −40, 7, 43, 79 | if CODE_BLOCK_NUMBER is 0 |
| 2 | −110, −74, −38, 9, 45, 81 | |
| 3-4 | | |
| 5-6 | | |
| 7-8 | | |
| 1 | −108, −72, −36, 11, 47, 83 | if CODE_BLOCK_NUMBER is 1 |
| 2 | −106, −70, −34, 13, 49, 85 | |
| 3-4 | | |
| 5-6 | | |
| 7-8 | | |

NOTE 1:
The RU_TONE_SET_INDEX for 80 + 80 MHz and 160 MHz shall use the 80 MHz RU_TONE_SET_INDEX definition for the lower and upper 80 MHz. The RU_TONE_SET_INDEX values 1-8 are mapped to the lower 80 MHz and the RU_TONE_SET_INDEX values 9-16 are mapped to the upper 80 MHz.
NOTE 2:
The RU_TONE_SET_INDEX for 80 + 160 MHz, 80 + 80 + 80 MHz and 160 + 80 MHz shall use the 80 MHz RU_TONE_SET_INDEX definition for the lower, middle and upper 80 MHz. The RU_TONE_SET_INDEX values 1-8 are mapped to the lower 80 MHz, the RU_TONE_SET_INDEX values 9-16 are mapped to the middle 80 MHz; and the RU_TONE_SET_INDEX values 17-24 are mapped to the upper 80 MHz.
NOTE 3:
The RU_TONE_SET_INDEX for 160 + 160 MHz and 320 MHz shall use the 160 MHz RU_TONE_SET_INDEX definition for the lower and upper 160 MHz. The RU_TONE_SET_INDEX values 1-16 are mapped to the lower 160 MHz and the RU_TONE_SET_INDEX values 17-32 are mapped to the upper 160 MHz.

TABLE 13

EHT-LTF subcarrier mapping for the MU HARQ Feedback NDP when
HARQ_CODEBOOK_SIZE is 9 and Code_Block_Number is 2 or 3.

| | 80 MHz | | 40 MHz | | 20 MHz |
|---|---|---|---|---|---|
| RU_TONE_SET_INDEX | $K_{tone\_NDPu}$ if FEED-BACK_STA-TUS is 1 | $K_{tone\_NDPu}$ if FEED-BACK_STA-TUS is 0 | $K_{tone\_NDPu}$ if FEED-BACK_STA-TUS is 1 | $K_{tone\_NDPu}$ if FEED-BACK_STA-TUS is 0 | $K_{tone\_NDPu}$ if FEED-BACK_STA-TUS is 1 |
| 1 | Use 20 MHz FEED- | Use 20 MHz FEED- | Use 20 MHz FEED- | Use 20 MHz FEED- | −105, −69, −33, 14, 50, 86 |
| 2 | | | | | −103, −67, −31, 16, 52, 88 |

TABLE 13-continued

EHT-LTF subcarrier mapping for the MU HARQ Feedback NDP when HARQ_CODEBOOK_SIZE is 9 and Code_Block_Number is 2 or 3.

| | | | | | |
|---|---|---|---|---|---|
| 3-4 | BACK_STATUS = 1 Subcarrier Indices − 384 Use 20 MHz | BACK_STATUS = 0 Subcarrier Indices − 384 Use 20 MHz | BACK_STATUS = 1 Subcarrier Indices − 128 Use 20 MHz | BACK_STATUS = 0 Subcarrier Indices − 128 Use 20 MHz | |
| 5-6 | FEEDBACK_STATUS = 1 Subcarrier Indices − 128 Use 20 MHz | FEEDBACK_STATUS = 0 Subcarrier Indices − 128 Use 20 MHz | FEEDBACK_STATUS = 1 Subcarrier Indices + 128 | FEEDBACK_STATUS = 0 Subcarrier Indices + 128 | |
| 7-8 | FEEDBACK_STATUS = 1 Subcarrier Indices + 128 Use 20 MHz | FEEDBACK_STATUS = 0 Subcarrier Indices + 128 Use 20 MHz | | | |
| 1 2 | FEEDBACK_STATUS = 1 Subcarrier Indices + 384 Use 20 MHz | FEEDBACK_STATUS = 0 Subcarrier Indices + 384 Use 20 MHz | Use 20 MHz FEEDBACK_STATUS = 1 Subcarrier Indices − 128 | Use 20 MHz FEEDBACK_STATUS = 0 Subcarrier Indices − 128 | −101, −65, −29, 18, 54, 90 −99, −63, −27, 20, 56, 92 |
| 3-4 | FEEDBACK_STATUS = 1 Subcarrier Indices − 384 Use 20 MHz | FEEDBACK_STATUS = 0 Subcarrier Indices − 384 Use 20 MHz | Use 20 MHz FEEDBACK_STATUS = 1 Subcarrier Indices + 128 | Use 20 MHz FEEDBACK_STATUS = 0 Subcarrier Indices + 128 | |
| 5-6 | FEEDBACK_STATUS = 1 Subcarrier Indices − 128 Use 20 MHz | FEEDBACK_STATUS = 0 Subcarrier Indices − 128 Use 20 MHz | | | |
| 7-8 | FEEDBACK_STATUS = 1 Subcarrier Indices + 128 Use 20 MHz | FEEDBACK_STATUS = 0 Subcarrier Indices + 128 Use 20 MHz | | | |
| | FEEDBACK_STATUS = 1 Subcarrier Indices + 384 | FEEDBACK_STATUS = 0 Subcarrier Indices + 384 | | | |

| RU_TONE_SET_INDEX | 20 MHz $K_{tone\_NDPu}$ if FEEDBACK_STATUS is 0 | |
|---|---|---|
| 1 | −104, −68, −32, 15, 51, 87 | if |
| 2 | −102, −66, −30, 17, 53, 89 | CODE_BLOCK_NUMBER is 2 |
| 3-4 | | |
| 5-6 | | |
| 7-8 | | |
| 1 | −100, −64, −28, 19, 55, 91 | if |
| 2 | −98, −62, −26, 21, 57, 93 | CODE_BLOCK_NUMBER is 3 |
| 3-4 | | |
| 5-6 | | |
| 7-8 | | |

NOTE 1:
The RU_TONE_SET_INDEX for 80 + 80 MHz and 160 MHz shall use the 80 MHz RU_TONE_SET_INDEX definition for the lower and upper 80 MHz. The RU_TONE_SET_INDEX values 1-8 are mapped to the lower 80 MHz and the RU_TONE_SET_INDEX values 9-16 are mapped to the upper 80 MHz.

NOTE 2:
The RU_TONE_SET_INDEX for 80 + 160 MHz, 80 + 80 + 80 MHz and 160 + 80 MHz shall use the 80 MHz RU_TONE_SET_INDEX definition for the lower, middle and upper 80 MHz. The RU_TONE_SET values 1-8 are mapped to the lower 80 MHz, the RU_TONE_SET_INDEX values 9-16 are mapped to the middle 80 MHz; and the RU_TONE_SET_INDEX values 17-24 are mapped to the upper 80 MHz.

NOTE 3:
The RU_TONE_SET_INDEX for 160 + 160 MHz and 320 MHz shall use the 160 MHz RU_TONE_SET_INDEX definition for the lower and upper 160 MHz. The RU_TONE_SET_INDEX values 1-16 are mapped to the lower 160 MHz and the RU_TONE_SET_INDEX values 17-32 are mapped to the upper 160 MHz.

TABLE 14

EHT-LTF subcarrier mapping for the MU HARQ Feedback NDP when HARQ_CODEBOOK_SIZE is 9 and Code_Block_Number is 4 or 5.

| | 80 MHz | | 40 MHz | | 20 MHz |
| --- | --- | --- | --- | --- | --- |
| RU_TONE_SET_INDEX | $K_{tone\_NDPu}$ if FEEDBACK_STATUS is 1 | $K_{tone\_NDPu}$ if FEEDBACK_STATUS is 0 | $K_{tone\_NDPu}$ if FEEDBACK_STATUS is 1 | $K_{tone\_NDPu}$ if FEEDBACK_STATUS is 0 | $K_{tone\_NDPu}$ if FEEDBACK_STATUS is 1 |
| 1 | Use 20 MHz | Use 20 MHz | Use 20 MHz | Use 20 MHz | −97, −61, −25, 22, 58, 94 |
| 2 | FEEDBACK_STATUS = 1 Subcarrier Indices − 384 | FEEDBACK_STATUS = 0 Subcarrier Indices − 384 | FEEDBACK_STATUS = 1 Subcarrier Indices − 128 | FEEDBACK_STATUS = 0 Subcarrier Indices − 128 | −95, −59, −23, 24, 60, 96 |
| 3-4 | Use 20 MHz FEEDBACK_STATUS = 1 Subcarrier Indices − 128 | Use 20 MHz FEEDBACK_STATUS = 0 Subcarrier Indices − 128 | Use 20 MHz FEEDBACK_STATUS = 1 Subcarrier Indices + 128 | Use 20 MHz FEEDBACK_STATUS = 0 Subcarrier Indices + 128 | |
| 5-6 | Use 20 MHz FEEDBACK_STATUS = 1 Subcarrier Indices + 128 | Use 20 MHz FEEDBACK_STATUS = 0 Subcarrier Indices + 128 | | | |
| 7-8 | Use 20 MHz FEEDBACK_STATUS = 1 Subcarrier Indices + 384 | Use 20 MHz FEEDBACK_STATUS = 0 Subcarrier Indices + 384 | | | |
| 1 | Use 20 MHz | Use 20 MHz | Use 20 MHz | Use 20 MHz | −93, −57, −21, 26, 62, 98 |
| 2 | FEEDBACK_STATUS = 1 Subcarrier Indices − 384 | FEEDBACK_STATUS = 0 Subcarrier Indices − 384 | FEEDBACK_STATUS = 1 Subcarrier Indices − 128 | FEEDBACK_STATUS = 0 Subcarrier Indices − 128 | −91, −55, −19, 28, 64, 100 |
| 3-4 | Use 20 MHz FEEDBACK_STATUS = 1 Subcarrier Indices − 128 | Use 20 MHz FEEDBACK_STATUS = 0 Subcarrier Indices − 128 | Use 20 MHz FEEDBACK_STATUS = 1 Subcarrier Indices + 128 | Use 20 MHz FEEDBACK_STATUS = 0 Subcarrier Indices + 128 | |
| 5-6 | Use 20 MHz FEEDBACK_STATUS = 1 Subcarrier Indices + 128 | Use 20 MHz FEEDBACK_STATUS = 0 Subcarrier Indices + 128 | | | |
| 7-8 | Use 20 MHz FEEDBACK_STATUS = 1 Subcarrier Indices + 384 | Use 20 MHz FEEDBACK_STATUS = 0 Subcarrier Indices + 384 | | | |

| RU_TONE_SET_INDEX | 20 MHz $K_{tone\_NDPu}$ if FEEDBACK_STATUS is 0 | |
| --- | --- | --- |
| 1 | −96, −60, −24, 23, 59, 95 | if CODE_BLOCK_NUMBER is 4 |
| 2 | −94, −58, −22, 25, 61, 97 | |
| 3-4 | | |
| 5-6 | | |
| 7-8 | | |

TABLE 14-continued

EHT-LTF subcarrier mapping for the MU HARQ Feedback NDP when HARQ_CODEBOOK_SIZE is 9 and Code_Block_Number is 4 or 5.

| | | |
|---|---|---|
| 1 | −92, −56, −20, 27, 63, 99 | if |
| 2 | −90, −54, −18, 29, 65, 101 | CODE_BLOCK_NUMBER is 5 |
| 3-4 | | |
| 5-6 | | |
| 7-8 | | |

NOTE 1:
The RU_TONE_SET_INDEX for 80 + 80 MHz and 160 MHz shall use the 80 MHz RU_TONE_SET_INDEX definition for the lower and upper 80 MHz. The RU_TONE_SET_INDEX values 1-8 are mapped to the lower 80 MHz and the RU_TONE_SET_INDEX values 9-16 are mapped to the upper 80 MHz.

NOTE 2:
The RU_TONE_SET_INDEX for 80 + 160 MHz, 80 + 80 + 80 MHz and 160 + 80 MHz shall use the 80 MHz RU_TONE_SET_INDEX definition for the lower, middle and upper 80 MHz. The RU_TONE_SET_INDEX values 1-8 are mapped to the lower 80 MHz, the RU_TONE_SET_INDEX values 9-16 are mapped to the middle 80 MHz; and the RU_TONE_SET_INDEX values 17-24 are mapped to the upper 80 MHz.

NOTE 3:
The RU_TONE_SET_INDEX for 160 + 160 MHz and 320 MHz shall use the 160 MHz RU_TONE_SET_INDEX definition for the lower and upper 160 MHz. The RU_TONE_SET_INDEX values 1-16 are mapped to the lower 160 MHz and the RU_TONE_SET_INDEX values 17-32 are mapped to the upper 160 MHz.

TABLE 15

EHT-LTF subcarrier mapping for the MU HARQ Feedback NDP when HARQ_CODEBOOK_SIZE is 9 and Code_Block_Number is 6 or 7.

| | 80 MHz | | 40 MHz | | 20 MHz |
|---|---|---|---|---|---|
| RU_TONE_SET_INDEX | $K_{tone\_NDPu}$ if FEEDBACK_STATUS is 1 | $K_{tone\_NDPu}$ if FEEDBACK_STATUS is 0 | $K_{tone\_NDPu}$ if FEEDBACK_STATUS is 1 | $K_{tone\_NDPu}$ if FEEDBACK_STATUS is 0 | $K_{tone\_NDPu}$ if FEEDBACK_STATUS is 1 |
| 1 | Use 20 MHz FEEDBACK_STATUS = 1 Subcarrier Indices − 384 | Use 20 MHz FEEDBACK_STATUS = 0 Subcarrier Indices − 384 | Use 20 MHz FEEDBACK_STATUS = 1 Subcarrier Indices − 128 | Use 20 MHz FEEDBACK_STATUS = 0 Subcarrier Indices − 128 | −89, −53, −17, 30, 66, 102 |
| 2 | | | | | −87, −51, −15, 32, 68, 104 |
| 3-4 | Use 20 MHz FEEDBACK_STATUS = 1 Subcarrier Indices − 128 | Use 20 MHz FEEDBACK_STATUS = 0 Subcarrier Indices − 128 | Use 20 MHz FEEDBACK_STATUS = 1 Subcarrier Indices + 128 | Use 20 MHz FEEDBACK_STATUS = 0 Subcarrier Indices + 128 | |
| 5-6 | Use 20 MHz FEEDBACK_STATUS = 1 Subcarrier Indices + 128 | Use 20 MHz FEEDBACK_STATUS = 0 Subcarrier Indices + 128 | | | |
| 7-8 | Use 20 MHz FEEDBACK_STATUS = 1 Subcarrier Indices + 384 | Use 20 MHz FEEDBACK_STATUS = 0 Subcarrier Indices + 384 | | | |
| 1 | Use 20 MHz FEEDBACK_STATUS = 1 Subcarrier Indices − 384 | Use 20 MHz FEEDBACK_STATUS = 0 Subcarrier Indices − 384 | Use 20 MHz FEEDBACK_STATUS = 1 Subcarrier Indices − 128 | Use 20 MHz FEEDBACK_STATUS = 0 Subcarrier Indices − 128 | −85, −49, −13, 34, 70, 106 |
| 2 | | | | | −83, −7, −11, 36, 72, 108 |
| 3-4 | Use 20 MHz FEEDBACK_STATUS = 1 Subcarrier Indices − 128 | Use 20 MHz FEEDBACK_STATUS = 0 Subcarrier Indices − 128 | Use 20 MHz FEEDBACK_STATUS = 1 Subcarrier Indices + 128 | Use 20 MHz FEEDBACK_STATUS = 0 Subcarrier Indices + 128 | |
| 5-6 | Use 20 MHz FEEDBACK_STATUS = 1 Subcarrier Indices + 128 | Use 20 MHz FEEDBACK_STATUS = 0 Subcarrier Indices + 128 | | | |
| 7-8 | Use 20 MHz FEEDBACK_STATUS = | Use 20 MHz FEEDBACK_STATUS = | | | |

TABLE 15-continued

EHT-LTF subcarrier mapping for the MU HARQ Feedback NDP when HARQ_CODEBOOK_SIZE is 9 and Code_Block_Number is 6 or 7.

| | TUS = 1 Subcarrier Indices + 384 | TUS = 0 Subcarrier Indices + 384 | |
|---|---|---|---|
| RU_TONE_SET_INDEX | | 20 MHz $K_{tone\_NDPu}$ if FEEDBACK_STATUS is 0 | |
| 1 | | −88, −52, −16, 31, 67, 103 | if |
| 2 | | −86, −50, −14, 33, 69, 105 | CODE_BLOCK_NUMBER is 6 |
| 3-4 | | | |
| 5-6 | | | |
| 7-8 | | | |
| 1 | | −84, −48, −12, 35, 71, 107 | if |
| 2 | | −82, −46, −10, 37, 73, 109 | CODE_BLOCK_NUMBER is 7 |
| 3-4 | | | |
| 5-6 | | | |
| 7-8 | | | |

NOTE 1:
The RU_TONE_SET_INDEX for 80 + 80 MHz and 160 MHz shall use the 80 MHz RU_TONE_SET_INDEX definition for the lower and upper 80 MHz. The RU_TONE_SET_INDEX values 1-8 are mapped to the lower 80 MHz and the RU_TONE_SET_INDEX values 9-16 are mapped to the upper 80 MHz.

NOTE 2:
The RU_TONE_SET_INDEX for 80 + 160 MHz, 80 + 80 + 80 MHz and 160 + 80 MHz shall use the 80 MHz RU_TONE_SET_INDEX definition for the lower, middle and upper 80 MHz. The RU_TONE_SET_INDEX values 1-8 are mapped to the lower 80 MHz, the RU_TONE_SET_INDEX values 9-16 are mapped to the middle 80 MHz; and the RU_TONE_SET_INDEX values 17-24 are mapped to the upper 80 MHz.

NOTE 3:
The RU_TONE_SET_INDEX for 160 + 160 MHz and 320 MHz shall use the 160 MHz RU_TONE_SET_INDEX definition for the lower and upper 160 MHz. The RU_TONE_SET_INDEX values 1-16 are mapped to the lower 160 MHz and the RU_TONE_SET_INDEX values 17-32 are mapped to the upper 160 MHz.

TABLE 16

EHT-LTF subcarrier mapping for the MU HARQ Feedback NDP when HARQ_CODEBOOK_SIZE is 9 and Code_Block_Number is 8.

| | 80 MHz | | 40 MHz | | 20 MHz |
|---|---|---|---|---|---|
| RU_TONE_SET_INDEX | $K_{tone\_NDPu}$ if FEEDBACK_STATUS is 1 | $K_{tone\_NDPu}$ if FEEDBACK_STATUS is 0 | $K_{tone\_NDPu}$ if FEEDBACK_STATUS is 1 | $K_{tone\_NDPu}$ if FEEDBACK_STATUS is 0 | $K_{tone\_NDPu}$ if FEEDBACK_STATUS is 1 |
| 1 | Use 20 MHz FEEDBACK_STATUS = 1 Subcarrier Indices − 384 | Use 20 MHz FEEDBACK_STATUS = 0 Subcarrier Indices − 384 | Use 20 MHz FEEDBACK_STATUS = 1 Subcarrier Indices − 128 | Use 20 MHz FEEDBACK_STATUS = 0 Subcarrier Indices − 128 | −81, −45, −9, 38, 74, 110 |
| 2 | | | | | −79, −43, −7, 40, 76, 112 |
| 3-4 | Use 20 MHz FEEDBACK_STATUS = 1 Subcarrier Indices − 128 | Use 20 MHz FEEDBACK_STATUS = 0 Subcarrier Indices − 128 | Use 20 MHz FEEDBACK_STATUS = 1 Subcarrier Indices + 128 | Use 20 MHz FEEDBACK_STATUS = 0 Subcarrier Indices + 128 | |
| 5-6 | Use 20 MHz FEEDBACK_STATUS = 1 Subcarrier Indices + 128 | Use 20 MHz FEEDBACK_STATUS = 0 Subcarrier Indices + 128 | | | |
| 7-8 | Use 20 MHz FEEDBACK_STATUS = 1 Subcarrier Indices + 384 | Use 20 MHz FEEDBACK_STATUS = 0 Subcarrier Indices + 384 | | | |

TABLE 16-continued

EHT-LTF subcarrier mapping for the MU HARQ Feedback NDP when HARQ_CODEBOOK_SIZE is 9 and Code_Block_Number is 8.

| RU_TONE_SET_INDEX | 20 MHz $K_{tone\_NDPu}$ if FEEDBACK_STATUS is 0 | |
|---|---|---|
| 1 | −80, −44, −8, 39, 75, 111 | if CODE_BLOCK_NUMBER is 8 |
| 2 | −78, −42, −6, 41, 77, 113 | |
| 3-4 | | |
| 5-6 | | |
| 7-8 | | |

NOTE 1:
The RU_TONE_SET_INDEX for 80 + 80 MHz and 160 MHz shall use the 80 MHz RU_TONE_SET_INDEX definition for the lower and upper 80 MHz. The RU_TONE_SET_INDEX values 1-8 are mapped to the lower 80 MHz and the RU_TONE_SET_INDEX values 9-16 are mapped to the upper 80 MHz.

NOTE 2:
The RU_TONE_SET_INDEX for 80 + 160 MHz, 80 + 80 + 80 MHz and 160 + 80 MHz shall use the 80 MHz RU_TONE_SET_INDEX definition for the lower, middle and upper 80 MHz. The RU_TONE_SET_INDEX values 1-8 are mapped to the lower 80 MHz, the RU_TONE_SET_INDEX values 9-16 are mapped to the middle 80 MHz; and the RU_TONE_SET_INDEX values 17-24 are mapped to the upper 80 MHz.

NOTE 3:
The RU_TONE_SET_INDEX for 160 + 160 MHz and 320 MHz shall use the 160 MHz RU_TONE_SET_INDEX definition for the lower and upper 160 MHz. The RU_TONE_SET_INDEX values 1-16 are mapped to the lower 160 MHz and the RU_TONE_SET_INDEX values 17-32 are mapped to the upper 160 MHz.

The invention claimed is:

1. A communication apparatus comprising:
circuitry, which, in operation, generates a first trigger frame that includes one or more user information fields for triggering a transmission of a physical protocol data unit (PPDU) from a remote device, wherein each of the one or more user information fields indicates one of more than one hybrid automatic repeat request (HARQ) feedback types;
a transmitter, which, in operation, transmits the generated first trigger frame; and
a receiver, which, in operation, receives the PPDU from the remote device,
wherein the transmitter, in operation, transmits, in response to receiving the PPDU, a HARQ feedback to the remote device according to the HARQ feedback types,
wherein a first HARQ feedback type of the more than one HARQ feedback types indicates that HARQ feedback information is carried in a second trigger frame soliciting a retransmission of at least a part of data included in the PPDU in a same transmission opportunity (TXOP) in which the first trigger frame is transmitted, and
wherein a second HARQ feedback type of the more than one HARQ feedback types indicates that HARQ feedback information is carried in the second trigger frame soliciting the retransmission in a different TXOP in which the first trigger frame is not transmitted.

2. A communication method comprising:
generating a first trigger frame that includes one or more user information fields for triggering a transmission of a physical protocol data unit (PPDU) from a remote device, wherein each of the one or more user information fields indicates one hybrid automatic repeat request HARQ) feedback types;
transmitting the generated first trigger frame;
receiving the PPDU from the remote device; and
transmitting, in response to receiving the PPDU, a HARQ feedback to the remote device according to the HARQ feedback types,
wherein:
a first HARQ feedback type of the HARQ feedback types indicates that HARQ feedback information is carried in a second trigger frame soliciting a retransmission of at least a part of data included in the PPDU in a same transmission opportunity (TXOP) in which the first trigger frame is transmitted, and
a second HARQ feedback type of the HARQ feedback types indicates that the HARQ feedback information is carried in the second trigger frame soliciting the retransmission of the data PDU in a different TXOP in which the first trigger frame is not transmitted.

* * * * *